United States Patent [19]

Salazar et al.

[11] Patent Number: 4,631,681

[45] Date of Patent: Dec. 23, 1986

[54] MICROPROCESSOR CONTROLLED D.C. MOTOR AND APPLICATION THEREFOR

[75] Inventors: Edilberto I. Salazar, Brookfield; Wallace Kirschner, Trumbull; John L. Lorenzo, Southbury; Keith E. Schubert, West Norwalk; Philip Pollak, Jr., Westport, all of Conn.

[73] Assignee: Pitney Bowes Inc., Stamford, Conn.

[21] Appl. No.: 657,569

[22] Filed: Oct. 4, 1984

[51] Int. Cl.[4] .......................... G06F 15/20; H02P 5/06; H02K 37/00

[52] U.S. Cl. .................................... 364/464; 364/174; 318/604; 318/696; 318/327; 101/91

[58] Field of Search ........................ 364/466, 464, 174; 340/680; 101/91, 235; 318/604, 696, 327

[56] References Cited

U.S. PATENT DOCUMENTS

| | | | |
|---|---|---|---|
| 4,016,467 | 4/1977 | Hallenbeck | 318/604 |
| 4,023,489 | 5/1977 | Beery | 101/235 |
| 4,156,170 | 5/1979 | Strunc | 318/696 |
| 4,226,546 | 10/1980 | Hoffman | 400/144.2 |
| 4,234,830 | 11/1980 | Cannon | 318/39 |
| 4,250,544 | 2/1981 | Alley | 364/110 |
| 4,283,721 | 8/1981 | Eckert et al. | 340/680 |
| 4,287,825 | 9/1981 | Eckert, Jr. et al. | 101/91 |
| 4,301,507 | 11/1981 | Soderberg et al. | 364/464 |
| 4,340,848 | 7/1982 | Hanagata | 318/561 |
| 4,506,201 | 3/1985 | Tsuneki | 318/696 X |
| 4,525,785 | 6/1985 | Soderberg et al. | 364/464 |
| 4,584,647 | 4/1986 | Eckert | 364/464 |

*Primary Examiner*—Edward J. Wise

*Attorney, Agent, or Firm*—Donald P. Walker; Melvin J. Scolnick; David E. Pitchenik

[57] ABSTRACT

An improvement in combination with a postage meter including a rotary drum having a periphery adapted for feeding a sheet in a path of travel. The improvement comprises: a first device for sensing a time interval during which a sheet is linearly displaced a predetermined distance in the path of travel; a d.c. motor coupled to the drum for rotation of the drum; a second device for sensing angular displacement of the drum; and a computer coupled to the first and second sensing devices and to the d.c. motor; wherein the computer responds to the first sensing device for providing respective amounts representative of desired angular displacements of the drum during successive sampling time periods, responds to the second sensing device for providing respective amounts representative of actual angular displacements of the drum during successive sampling time periods, compensates for the difference between desired and actual angular displacements and generates a d.c. motor control signal for controlling rotation of the motor to cause the linear displacement of the periphery of the drum to substantially match the linear displacement of the sheet during respective sampling time periods.

25 Claims, 27 Drawing Figures

| MOTOR ROTATION | Q1 | Q2 | Q3 | Q4 | T1 | T2 | T3 | T4 | A | B | C | D | 302 | 304 |
|---|---|---|---|---|---|---|---|---|---|---|---|---|---|---|
| CW | ON | OFF | OFF | ON | ON | OFF | OFF | ON | HIGH | LOW | LOW | HIGH | + | — |
| CCW | OFF | ON | ON | OFF | OFF | ON | ON | OFF | LOW | HIGH | HIGH | LOW | — | + |

FIG. 12

(a) $$H_1(S) = ZOH\,(K_v)\,(K_a)\,\frac{K_m}{S\left(\frac{S}{f_1}+1\right)\left(\frac{S}{f_2}+1\right)}\,K_p$$

(b) $$H_2(S) = ZOH\,(K_v)\,(K_a)\,\frac{K_m}{S\left(\frac{S}{f_1}+1\right)\left(\frac{S}{f_2}+1\right)}\,(K_p)\,(K_c)$$

$$= \frac{e^{S\frac{T}{2}}\,(K_v)\,(K_a)\,(K_m)\,(K_p)\,(K_c)}{S\left(\frac{S}{f_1}+1\right)\left(\frac{S}{f_2}+1\right)}$$

$$= \frac{K_0\,e^{S\frac{T}{2}}}{S\left(\frac{S}{f_1}+1\right)\left(\frac{S}{f_2}+1\right)} = \frac{400\,e^{-0.001\frac{S}{2}}}{S\left(\frac{S}{48}+1\right)\left(\frac{S}{733}+1\right)}$$

FIG. 13

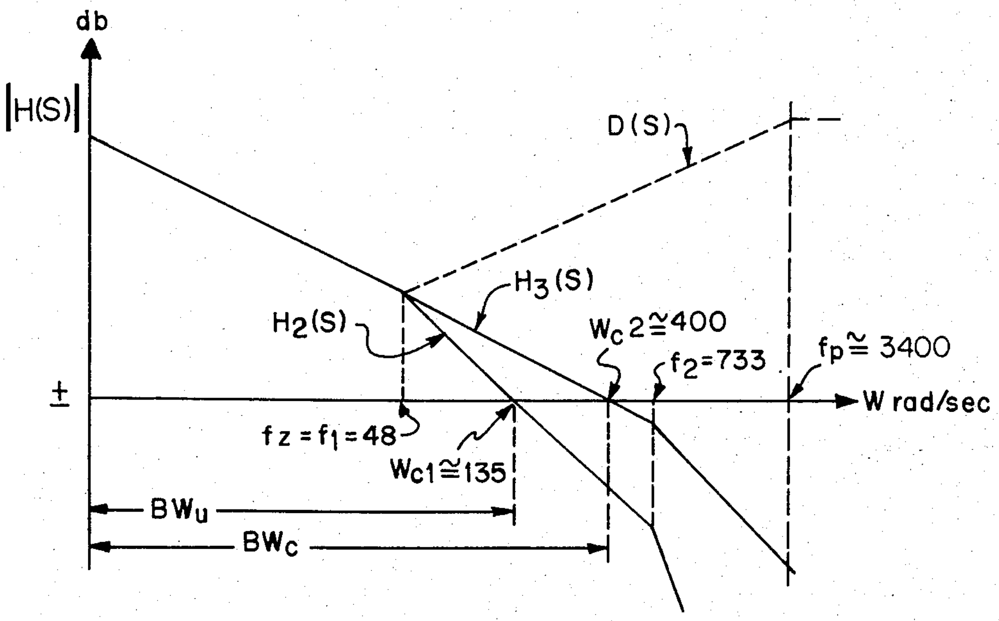

FIG. 14

$$D(S) = K_C \frac{\left(\frac{S}{f_z} + 1\right)}{\left(\frac{S}{f_p} + 1\right)}$$

$$= 13.64 \frac{\frac{S}{48} + 1}{\frac{S}{3400} + 1} = 966 \frac{(S+48)}{(S+3400)}$$

FIG. 15

(a) $d_f = \theta m \frac{\pi}{360°}$ (b) $O_S = 100 \frac{e^{\frac{\pi}{d_f}}}{\sqrt{1-d_f^2}}$ (c) $t_x = \frac{1}{d_f}(W_n) \approx \frac{1}{d_f}(W_c)$ (d) $t_s \approx 5 t_x$

FIG. 16

$$S = \frac{2}{T} \times \frac{Z-1}{Z+1}$$

FIG. 17

$$D(Z) \approx 366 \left(\frac{Z-0.953}{Z+0.259}\right)$$

$$= 366 \left(\frac{1-0.953Z^{-1}}{1+0.259Z^{-1}}\right)$$

FIG. 18

(a) $D(Z) = \frac{G(Z)}{E(Z)} = 366 \left(\frac{1-0.953Z^{-1}}{1+0.259Z^{-1}}\right)$ (b) $G(Z) = 366E(Z) - 348E(Z)Z^{-1} - 0.259G(Z)Z^{-1}$

FIG. 19

$$G(Tn) = 366E(Tn) - 348E(Tn-1) - 0.259G(Tn-1)$$

$$= K_1E(Tn) - K_2E(Tn-1) - K_3G(Tn-1)$$

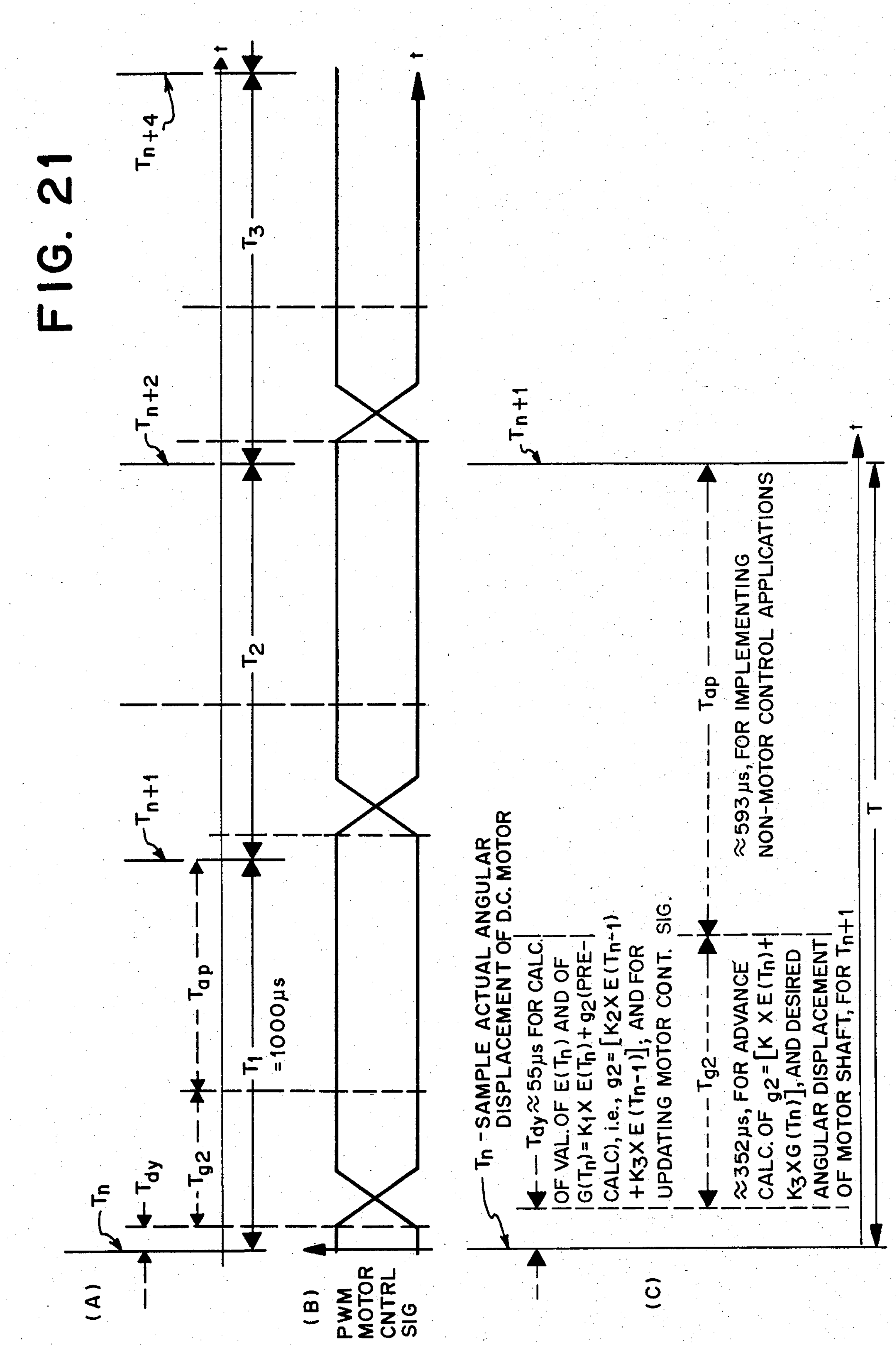

FIG. 21
(A)
(B) PWM MOTOR CNTRL SIG
(C)
Tn
Tdy
Tg2
Tap
T1 =1000μs
T2
T3
Tn+1
Tn+2
Tn+4
t
Tn - SAMPLE ACTUAL ANGULAR DISPLACEMENT OF D.C. MOTOR
Tdy ≈ 55μs FOR CALC. OF VAL. OF E(Tn) AND OF G(Tn) = K1 X E(Tn) + g2 (PRE-CALC), i.e., g2 = [K2 X E(Tn-1) + K3 X E(Tn-1)]; AND FOR UPDATING MOTOR CONT. SIG.
Tg2
≈352μs, FOR ADVANCE CALC. OF g2 = [K X E(Tn) + K3 X G(Tn)], AND DESIRED ANGULAR DISPLACEMENT OF MOTOR SHAFT, FOR Tn+1
Tap
≈593μs, FOR IMPLEMENTING NON-MOTOR CONTROL APPLICATIONS
T

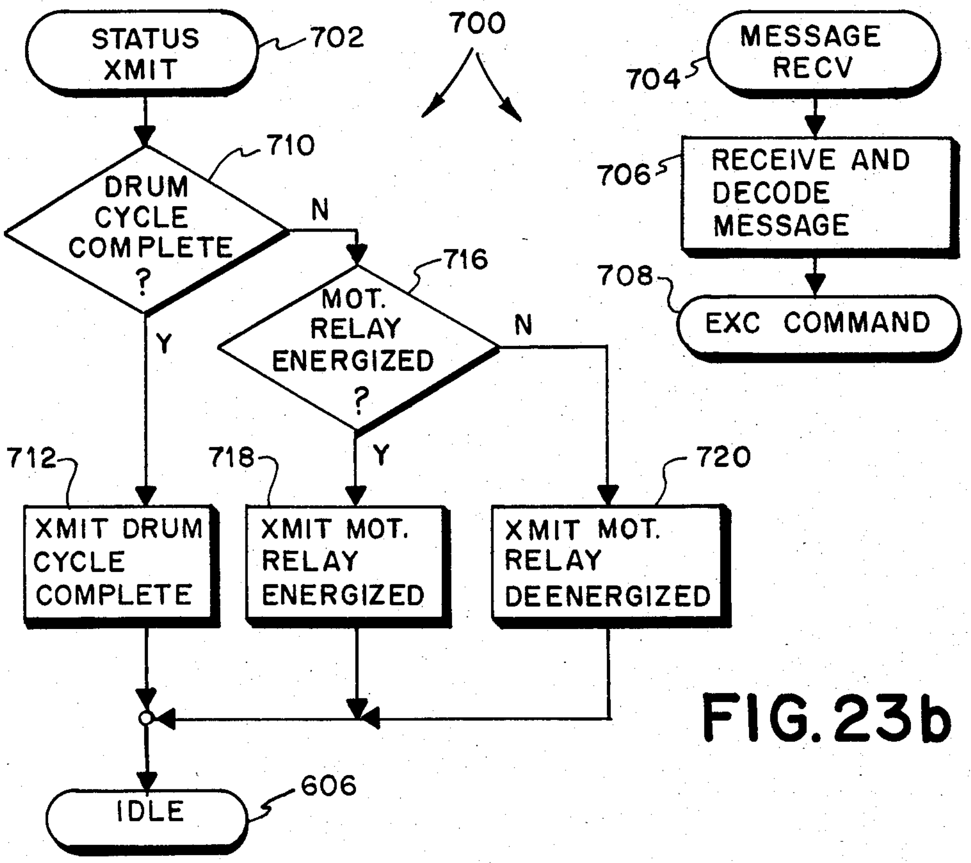
FIG. 23b
FIG. 23c
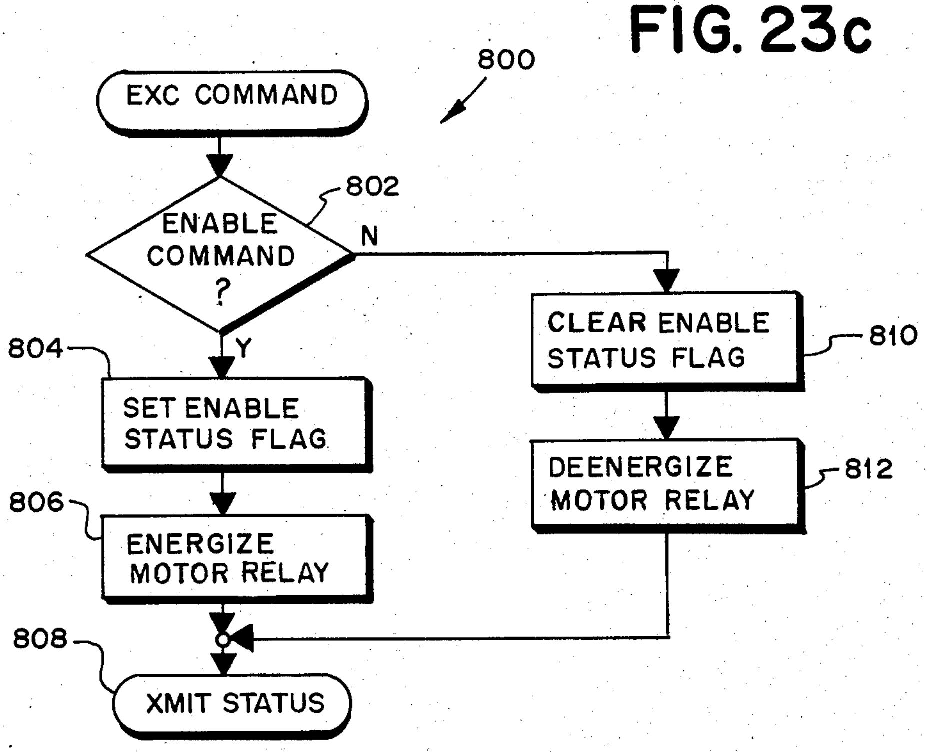

MICROPROCESSOR CONTROLLED D.C. MOTOR AND APPLICATION THEREFOR

BACKGROUND OF THE INVENTION

The present invention is generally concerned with postage meters and mailing machines, and more particularly with improvements therein including apparatus for driving a postage meter drum.

In U.S. Pat. No. 2,934,009 issued Apr. 26, 1960 to Bach, et al. and assigned to the assignee of the present invention there is described a postage meter which includes a drive mechanism connected by means of a drive train to a postage meter drum. The drive mechanism includes a single revolution clutch for rotating the drum from a home position and into engagement with a letter fed to the drum. The drum prints a postage value on the letter while feeding the same downstream beneath the drum as the drum returns to the home position. Each revolution of the single revolution clutch and thus the drum, is initiated by the letter engaging a trip lever to release the helical spring of the single revolution clutch. The velocity versus time profile of the peripherary of a drum driven by the clutch approximates a trapezoidal configuration, having acceleration, constant velocity and deceleration portions, fixed by the particular clutch and drive train used in the application. This being the case, the throughput rate of any mailing machine associated with the meter is dictated by the cycling speed of the postage meter rather than by the speed with which the individual mailpieces are fed to the postage meter. Further, although the single revolution clutch structure has served as the workhorse of the industry for many years it has long been recognized that it is a complex mechanism which is relatively expensive to construct and maintain, does not precisely follow the ideal trapezoidal velocity vs. time motion profile which is preferred for drum motion, tends to be unreliable in high volume applications, and is noisy and thus irritating to customers.

Accordingly, an object of the invention is to replace the postage meter drum drive mechanism of the prior art with the combination of a D.C. motor and a computer, and program the computer for causing the D.C. motor to drive the drum in accordance with an ideal trapezoidal-shaped velocity versus time profile which is a function of the input velocity of a mailpiece; and Another object is to replace the trip lever as the drive initiating device and utilize in its place a pair of spaced apart sensing devices in the path of travel of a mailpiece fed to the postage meter, and program the computer to calculate the input velocity of a mailpiece, based upon the time taken for the mailpiece to traverse the distance between the sensing devices, and adjust the time delay and acceleration of the drum before arrival of the mailpiece at a position at which drum rotation is commenced to cause the drum to timely engage the leading edge of the mailpiece.

SUMMARY OF THE INVENTION

In combination with a postage meter including a rotary drum having a periphery adapted for feeding a sheet in a path of travel, there is provided an improvement comprising: first means for sensing a time interval during which a sheet is linearly displaced a predetermined distance in the path of travel; a d.c. motor coupled to the drum for rotation thereof; second means for sensing angular displacement of the drum; and computer means coupled to the first and second sensing means and to the d.c. motor, the computer means comprising: means responsive to the first sensing means for providing respective amounts representative of desired angular displacements of the drum during successive sampling time periods, means responsive to the second sensing means for providing respective amounts representative of actual angular displacements of the drum during successive sampling time periods, and means for compensating for the difference between desired and actual angular displacements and generating a d.c. motor control signal for controlling rotation of the motor to cause the linear displacement of the periphery of the drum to substantially match the linear displacement of the sheet during respective sampling time periods.

BRIEF DESCRIPTION OF THE DRAWINGS

As shown in the drawings wherein like reference numerals designate like or corresponding parts throughout the several views:

FIG. 12 shows the equations for calculating the overall gain of the closed loop servo system of FIG. 10 before (FIG. **12*a*) and after (FIG. 12**) including a gain factor corresponding to the system friction at motor start up;

FIG. 13 is a bode diagram including plots for the closed loop servo system before and after compensation to provide for system stability and maximization of the system's bandwidth;

FIG. 14 shows the equation for calculating, in the frequency domain, the value of the system compensator;

FIG. 15 shows the equation for calculating the damping factor, overshoot and settling time of the servo controlled system;

FIG. 16 (comprised of a–d) shows the equation for the laplace operator expressed in terms of the Z-transform operator;

FIG. 17 shows the equation for calculating the value of the system compensator in the position domain;

FIG. 18 (comprised of a–b) shows the equations for converting the system compensator of FIG. 17 to the position domain;

FIG. 19 shows the equation of the output of the system compensator in the time domain;

FIG. 21 (comprised of a–c) shows the time intervals during which the motor control signal and its separable components are calculated to permit early application of the signal to the motor;

FIG. 23 (including FIGS. 23*a*-1, 23*a*-2, 23*b*and 23*c*) shows the flow charts portraying the processing steps of the computer.

DESCRIPTION OF THE PREFERRED EMBODIMENTS

Figure 1:
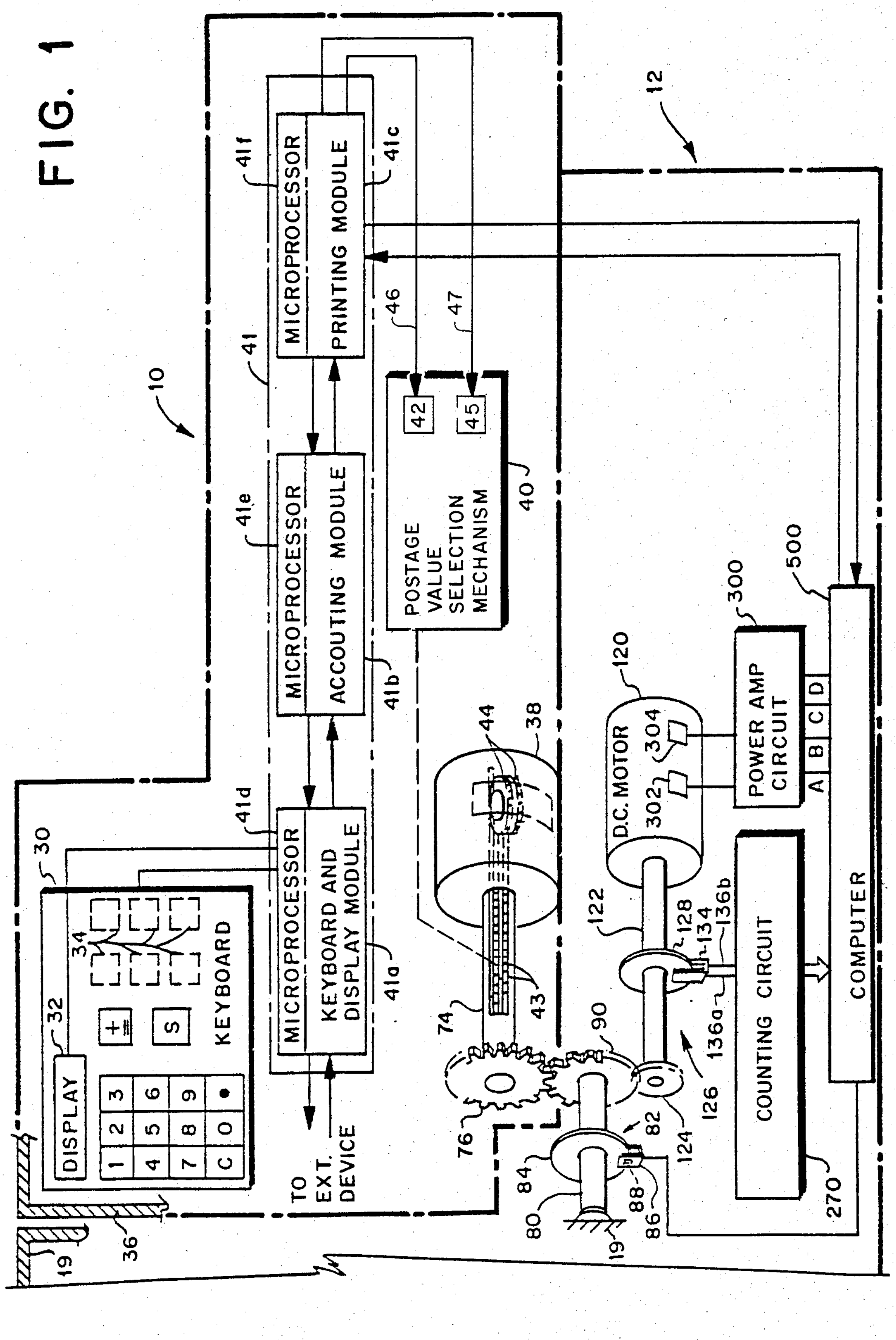
FIG. 1 is a schematic view of a postage meter mounted on mailing machine in accordance with the invention.

As shown in FIG. 1, the apparatus in which the invention may be incorporated generally includes an electronic postage meter 10 which is suitably removably mounted on a conventional mailing machine 12, so as to form therewith a slot 14 (FIG. 2) through which sheets, including mailpieces 16, such as envelopes, cards or other sheet-like materials, may be fed in a downstream path of travel 18.

The postage meter 10 (FIG. 1) includes a keyboard 30 and display 32. The keyboard 30 includes a plurality of numeric keys, labeled 0–9 inclusive, a clear key, labeled "c" and a decimal point key, labeled ".", for selecting postage values to be entered; a set postage key, labeled "s", for entering selected postage values; and an arithmetic function key, labeled "±", for adding subsequently selected charges (such as special delivery costs) to a previously selected postage value before entry of the total value. In addition, there is provided a plurality of display keys, designated 34, each of which are provided with labels well known in the art for identifying information stored in the meter 10, and shown on the display 32 in response to depression of the particular key 34, such as the "postage used", "postage unused", "control sum", "piece count", "batch value" and "batch count" values. A more detailed description of the keys of the keyboard 30 and the display 32, and their respective functions may be found in U.S. Pat. No. 4,283,721 issued Aug. 11, 1981 to Eckert et al. and assigned to the assignee of the present invention.

In addition, the meter 10 (FIG. 1) includes a casing 36, on which the keyboard 30 and display 32 are conventionally mounted, and which is adapted by well known means for carrying a cyclically operable, rotary, postage printing drum 38. The drum 38 (FIG. 2) is conventionally constructed and arranged for feeding the respective mailpieces 16 in the path of travel 18, which extends beneath the drum 38, and for printing entered postage on the upwardly disposed surface of each mailpiece 16. For postage value selecting purposes, the meter 10 (FIG. 1) also includes a conventional postage value selection mechanism 40, for example, of the type shown in U.S. Pat. No. 4,287,825 issued Sept. 8, 1981 to Eckert, et al. and assigned to the assignee of the present invention. The mechanism 40 which is operably electrically coupled via the postage meter's computer 41 to the keyboard 30 and display 32, includes a first stepper motor 42 for selecting any one of a plurality of racks 43, associated on a one for one basis with each of the print wheels 44, and a second stepper motor 45 for actuating each selected rack 43 for positioning the appropriate printing element of the associated print wheel 44. The rack selection stepper motor 42, which is referred to by skilled artisans as a bank selector motor, is appropriately energized via power lines 46 from the computer 41 for selecting the appropriate rack; and the rack actuating stepper motor 45, which is referred to by skilled artisans as a digit selector motor, is appropriately energized via power lines 47 from the computer 41 to move the selected rack for selecting the appropriate digit element of the associated print wheel 44. A more detailed description of the value selection mechanism 40 may be found in the aforesaid U.S. Pat. No. 4,287,825.

The computer 41 for the postage meter 10 generally comprises a conventional, microcomputer system having a plurality of microcomputer modules including a control or keyboard and display module, 41*a*, an accounting module 41*b* and a printing module 41*c*. The control module 41*a* is both operably electrically connected to the accounting module 41*b* and adapted to be operably electrically connected to an external device via respective two-way serial communications channels, and the accounting module 41*b* is operably electrically connected to the printing module 41*c* via a corresponding two-way serial communication channel. In general, each of the modules 41*a*, 41*b* and 41*c* includes a dedicated microprocessor 41*d*, 41*e* or 41*f*, respectively, having a separately controlled clock and programs. And two-way communications are conducted via the respective serial communication channels utilizing the echoplex communication discipline, wherein communications are in the form of serially transmitted single byte header-only messages, consisting of ten bits including a start bit followed by an 8 bit byte which is in turn followed by a stop bit, or in the form of a multibyte message consisting of a header and one or more additional bytes of information. Further, all transmitted messages are followed by a no error pulse if the message was received error free. In operation, each of the modules 41*a*, 41*b* and 41*c* is capable of processing data independently and asynchronously of the other. In addition, to allow for compatibility between the postage meter 10 and any external apparatus, all operational data transmitted to, from and between each of the three modules 41*a*, 41*b* and 41*c*, and all stored operator information, is accessible to the external device via the two-way communication channel, as a result of which the external apparatus (if any) may be adapted to have complete control of the postage meter 10 as well as access to all current operational information in the postage meter 10. In addition, the flow of messages to, from and between the three internal modules 41*a*, 41*b* and 41*c* is in a predetermined, hierarchical direction. For example, any command message from the control module 41*a* is communicated to the accounting module 41*b*, where it is processed either for local action in the accounting module 41*b* and/or as a command message for the printing module 41*c*. On the other hand, any message from the printing module 41c is communicated to the accounting module 41b where it is either used as internal information or merged with additional data and communicated to the control module 41c. And, any message from the accounting module 41b is initially directed to the printing module 41c or to the control module 41a. A more detailed description of the various prior art modules 41a, 41b and 41c, and various modifications thereof, may be found in U.S. Pat. Nos. 4,280,180; 4,280,179; 4,283,721 and 4,301,507; each of which patents is assigned to the assignee of the present invention.

The mailing machine 12 (FIG. 2), which has a casing 19, includes a A.C. power supply 20 which is adapted by means of a power line 22 to be connected to a local source of supply of A.C. power via a normally open main power switch 24 which may be closed by the operator. Upon such closure, the mailing machine's D.C. power supply 26 is energized via the power line 28. In addition, the mailing machine 12 includes a conventional belt-type conveyor 49, driven by an A.C. motor 50, which is connected for energization from the A.C. power supply 20 via a conventional, normally open solid state, A.C. motor, relay 52, which is timely energized by a computer 500 for closing the relay 52. Upon such closure the A.C. motor 50 drives the conveyor 49 for feeding mailpieces 16 to the drum 38. To facilitate operator control of the switch 24, the mailing machine preferably includes a keyboard 53 having a "start" key 53a and a "stop" key 53b, which are conventionally coupled to the main power switch 24 to permit the operator to selectively close and open the switch 24. Assuming the computer 500 has timely energized the relay 52, the A.C. motor 50 is energized from the A.C. power supply 20. Whereupon the conveyor 49 transports the individual mailpieces 16, at a velocity corresponding to the angular velocity of the motor 50, in the path of travel 18 to the postage printing platen 54.

Figure 3:
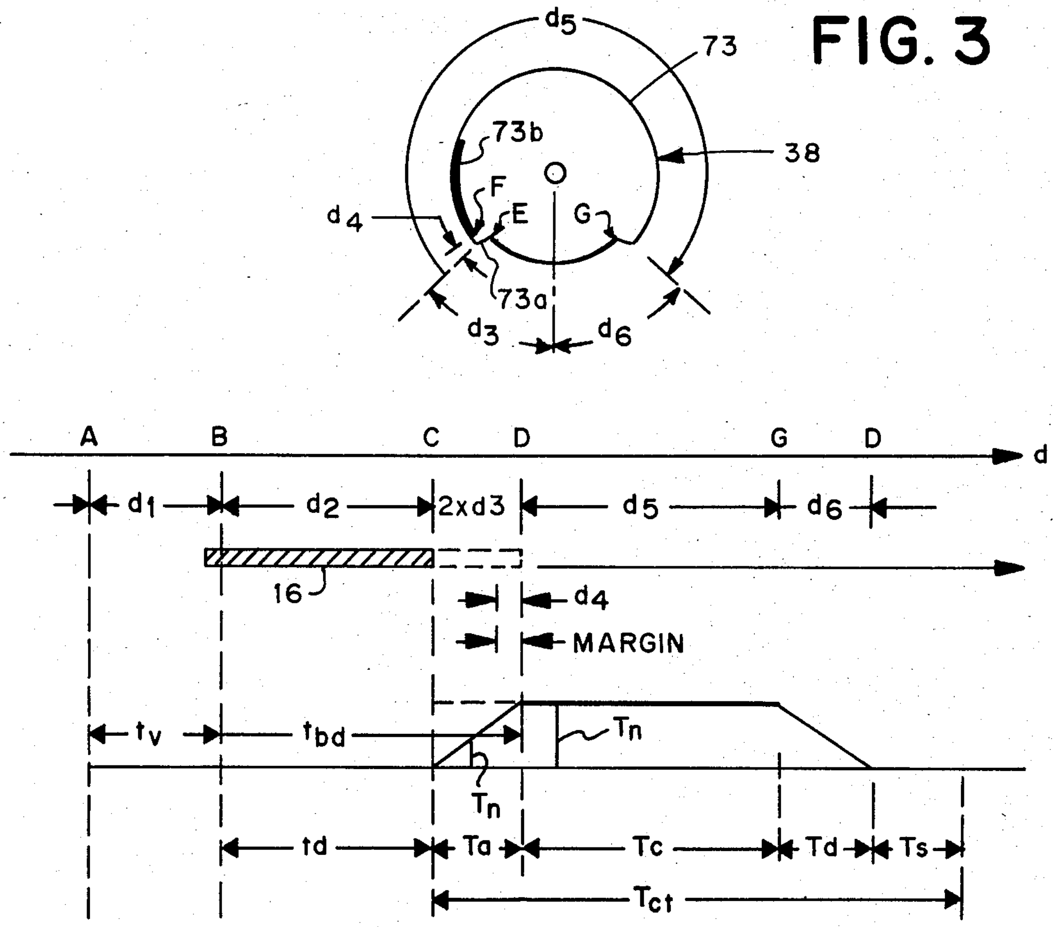
FIG. 3 shows the relationship between the position of a sheet and the postage meter drum as a function of time, and an ideal velocity versus time profile of the periphery of the drum.

According to the invention, the machine 12 includes first and second sensing devices respectively designated 56 and 58, which are spaced apart from each other a predetermined distance $d_1$, i.e., the distance between points A and B in the path of travel 18. Preferably, each of the sensing devices 56 and 58, is an electro-optical device which is suitably electrically coupled to the computer 500; sensing device 56 being connected via communication line 60 and sensing device 58 being connected via communication line 62. The sensing devices 56, 58 respectively respond to the arrival of a mailpiece 16 at points A and B by providing a signal to the computer 500 on communication line 60 from sensing device 56 and on communication line 62 from sensing device 58. Thus, the rate of movement or velocity V1 of any mailpiece 16 may be calculated by counting the elapsed time $t_v$ (FIG. 3) between arrivals of the mailpiece 16 at points A and B, and dividing the distance $d_1$, by the elapsed time $t_v$. To that end, the computer 500 is programmed for continuously polling the communications lines 60 and 62 each time instant $T_n$ at the end of a predetermined sampling time period, T, preferably T=1 millisecond, and to commence counting the number of time instants $T_n$ when the leading edge of a given mailpiece 16 is detected at point A, as evidenced by a transition signal on communication line 60, and to end counting the time instants $T_n$ when the given mailpiece 16 is detected at point B, as evidenced by a transition signal on communication line 62. Since the distance $d_1$, is a mechanical constant of the mailing machine 12, the velocity of the mailpiece may be expressed in terms of the total number $N_t$ of time instants $T_n$ which elapse as the given mailpiece traverses the distance d. For example, assuming a maximum velocity of 61 inches per second, $d_1=2.75$ inches and T=1 millisecond; the total number $N_t$ of elapsed time instants $T_n$ may be found by dividing $d_1=2.75$ inches by V1=61 inches per second to obtain $N_t=45$, i.e., the total number of time instants $T_n$ *which elapse between arrivals of the mailpiece at points A and B. Thus, the number* $N_t=45$ corresponds to and is representative of a mailpiece velocity of V1=61 inches per second.

Assuming normal operation of the transport system and calculation of the value of V1 having been made, the time delay $t_d$ (FIG. 3) before arrival of the mailpiece 16 at point C may be calculated by dividing the distance $d_2$ between points B and C by the mailpiece's velocity V1, provided the distance $d_2$ is known. Since the integral of the initial, triangularly-shaped, portion of the velocity versus time profile is equal to one-half of the value of the product of $T_a$ and $V_1$, and is equal to the arc $d_3$ described by point E on the drum 38, as the drum 38 is rotated counter-clockwise to point D, the distance between points C and D is equal to twice the arcuate distance $d_3$. Accordingly, $d_2$ may be conventionally calculated, as may be the time delay $t_d$ for the maximum throughput velocity. Assuming rotation of the drum 38 is commenced at the end of the time delay $t_d$ and the drum 38 is linearly accelerated to the velocity V1 to match that of the mailpiece 16 in the time interval $T_a$ during which point E on the drum 38 arcuately traverses the distance $d_3$ to point D, Ta may be conventionally calculated. In addition, assuming commencement of rotation at the end of the time delay $t_d$ and that the drum 38 is linearly accelerated to the velocity V1 during the time interval Ta, the mailpiece 16 will arrive at point D coincident with the rotation of point E of the outer periphery 73 the drum 38 to point D, with the result that the leading edge 73a of the drum's outer periphery 73, which edge 73a extends transverse to the path of travel 18 of the mailpiece 16, will engage substantially the leading edge of the mailpiece 16 for feeding purposes and the indicia printing portion 73b of the periphery 73 will be marginally spaced from the leading edge of the mailpiece 16 by a distance $d_4$ which is equal to the circumferential distance between points E and F on the drum 38. Since the circumferential distance $d_5$ on the drum 38 between points E and G is fixed, the time interval Tc during which the drum 38 is rotated at the constant velocity V1 may also be calculated. When point G on the drum 38 is rotated out of engagement with the mailpiece 16, the drum 38 commences deceleration and continues to decelerate to rest during the time interval Td. The distance $d_6$ which is traversed by point G, as the drum 38 is rotated to return point E to its original position of being spaced a distance $d_3$ from point D, is fixed, and, Td may be chosen to provide a suitable deceleration rate for the drum, preferably less than Ta. In addition, a reasonable settling time interval Ts is preferably added to obtain the overall cycling time Tct of the drum 38 to allow for damping any overshoot of the drum 38 before commencing the next drum cycle. For a typical maximum drum cycle time period Tct of 234 milliseconds and a maximum mailpiece transport rate of 61 inches per second, typical values for the acceleration, constant velocity, deceleration and settling time intervals are Ta=37 milliseconds, $T_c=124$ milliseconds, Td=24 milliseconds and Ts=234-185=49 milliseconds. Utilizing these values, the required acceleration and deceleration values for the drum 38 during the time intervals Ta and Td may be conventionally calculated. In addition, since the integral of the velocity versus time profile is equal to the distance traversed by the circumference of the drum 38 during a single revolution of the drum 38, the desired position of the drum 38 at the end of any sampling time period of T=1 millisecond may be calculated. For target velocities V1 which are less than the maximum throughput velocity, it is preferably assumed that integral of, and thus the area under, the velocity versus time profile remains constant, and equal to the area thereof at the maximum throughput velocity, to facilitate conventional calculation of the values of the time delay $t_d$, the time intervals Ta, Tc and Td, and the acceleration and deceleration values for each of such lesser velocities V1.

For computer implementation purposes, the computer 500 is programmed as hereinbefore discussed to continously poll the communication lines 60 and 62, from the sensing devices 56 and 58, respectively, each time interval $T_n$, and count the time intervals $T_n$ between arrivals of the mailpiece 16 at points A and B as evidenced by a transition signals on lines 60 or 62. Further, the computer 500 is programmed to calculate the current velocity of the mailpiece 16 in terms of the total number $N_t$ of the counted time intervals $T_n$, store the current velocity and, preferably, take an average of that velocity and at least the next previously calculated velocity (if any) to establish the target velocity V1. In addition, it is preferable that precalculated values for the time delay td, acceleration and deceleration corresponding to each of a plurality of target velocities be stored in the memory of the computer 500 for fetching as needed after calculation of the particular target velocity. In this connection it is noted that the velocity at any time "t" of the drum 38 may be expressed by adding to the original velocity $V_o$ each successive increment of the product of the acceleration and time during each time period of T=1 millisecond, each successive increment of constant velocity and each successive increment of the product of the deceleration and time during each time period T. Preferably, the acceleration and deceleration values are each stored in the form of an amount corresponding to a predetermined number of counts per millisecond square which are a function of the actual acceleration or deceleration value, as the case may be, and of the scale factor hereinafter discussed in connection with measuring the actual angular displacement of the motor drive shaft 122; whereby the computer 500 may timely calculate the desired angular displacement of the motor drive shaft 122 during any sampling time interval T. In this connection it is noted that the summation of all such counts is representative of the desired linear displacement of the circumference of the drum 38, and thus of the desired velocity versus time profile of drum rotation for timely accelerating the drum 38 to the target velocity V1, maintaining the drum velocity at V1 for feeding the particular mailpiece 16 and timely deccelerating the drum 38 to rest.

The postage meter 10 (FIG. 1) additionally includes a conventional, rotatably mounted, shaft 74 on which the drum 38 is fixedly mounted, and a conventional drive gear 76, which is fixedly attached to the shaft for rotation of the shaft 74.

According to the invention, the mailing machine 12 (FIG. 1) includes an idler shaft 80 which is conventionally journaled to the casing 19 for rotation, and, operably coupled to the shaft 80, a conventional home position encoder 82. The encoder 82 includes a conventional circularly-shaped disc 84, which is fixedly attached to the shaft 80 for rotation therewith, and an optical sensing device 86, which is operably coupled to the disc 84 for detecting an opening 88 formed therein and, upon such detection, signalling the computer 500. The machine 12, also includes an idler gear 90 which is fixedly attached to the shaft 80 for rotation therewith. Further, the machine 12 includes a D.C. motor 120, which is suitably attached to the casing 19 and has a drive shaft 122. The machine 12 also includes a pinion gear 124, which is fixedly attached to the drive shaft 122 for rotation by the shaft 122. The gear 124 is disposed in driving engagement with the idler gear 90. Accordingly, rotation of the motor drive shaft 122 in a given direction, results in the same direction of rotation of the drum drive shaft 76 and thus the drum 38. Preferably, the pinion gear 124 has one-fifth the number of teeth as the drum drive gear 76, whereas the idler gear 90 and drum drive gear 76 each have the same number of teeth. With this arrangement, five complete revolutions of the motor drive shaft 122 effectuate one complete revolution of the drum 38, whereas each revolution of the gear 90 results in one revolution of the gear 76. Since there is a one-to-one relationship between revolutions, and thus incremental angular displacements, of the drum shaft 74 and idler shaft 90, the encoder disc 84 may be mounted on the idler shaft 90 such that the disc's opening 88 is aligned with the sensing device 86 when the drum 38 is disposed in its home position to provide for detection of the home position of the drum shaft 74, and thus a position of the drum shaft 74 from which incremental angular displacements may be counted.

Figure 2:
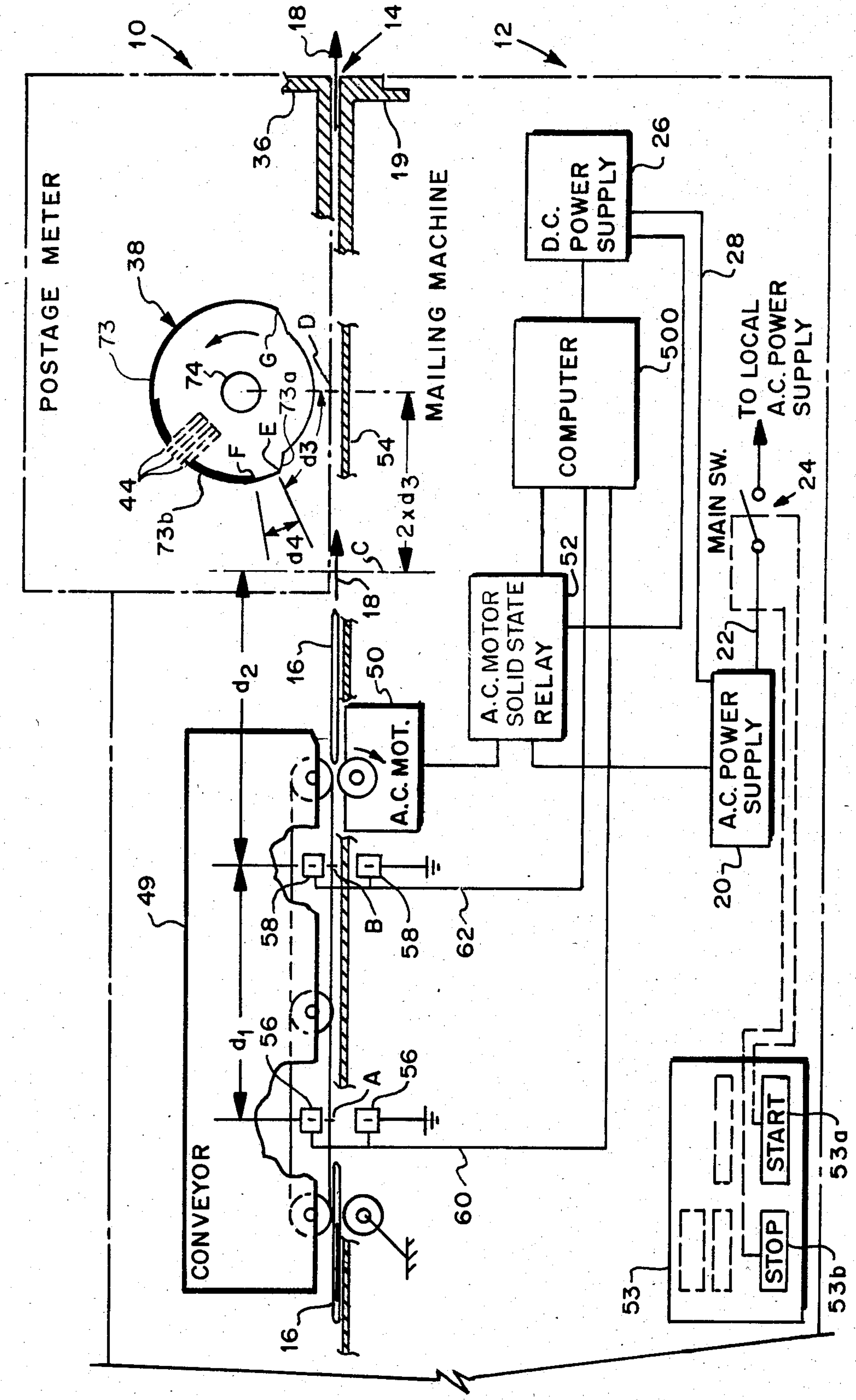
FIG. 2 is a schematic view of the mailing machine of FIG. 1, showing the location of the mailpiece sensors relative to the postage meter drum.
Figure 4:
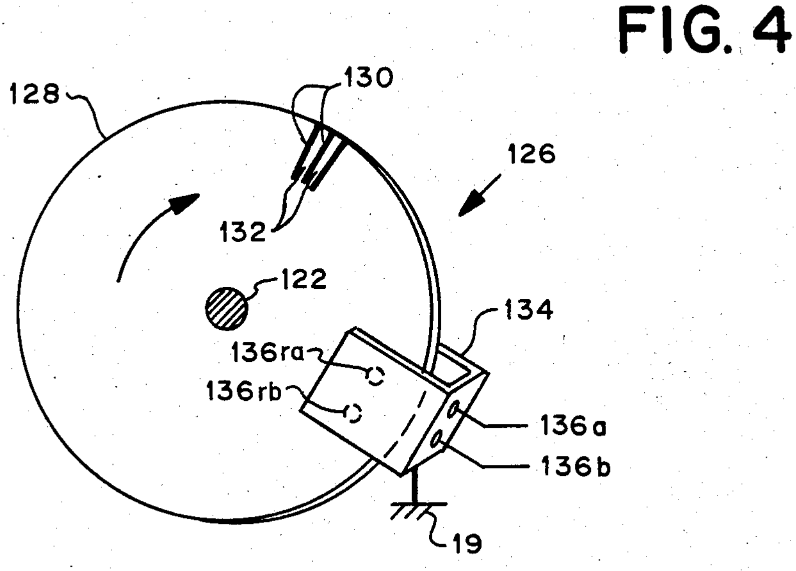
FIG. 4 is a perspective view of the quadrature encoder mounted on a D.C. motor drive shaft.
Figure 5:
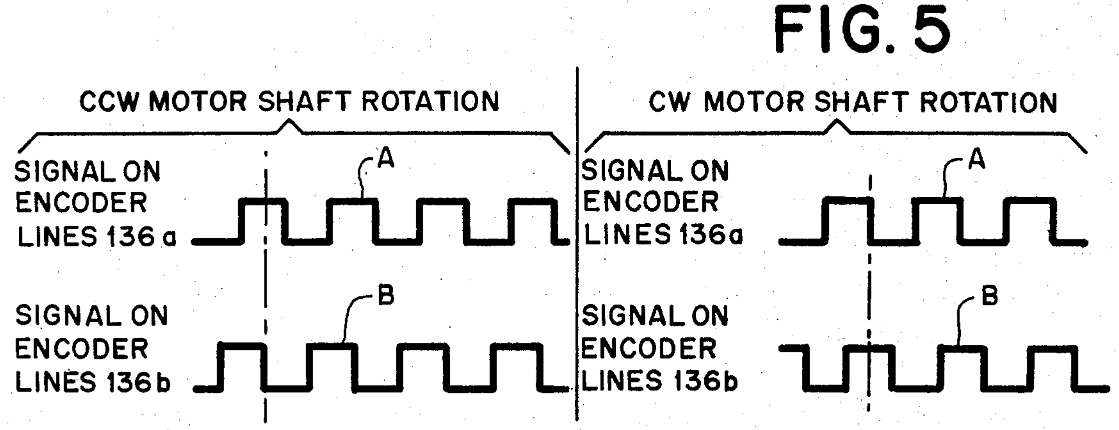
FIG. 5 shows the output signals from the quadrature encoder of FIG. 4 for clockwise and counter-clockwise rotation of the D.C. motor drive shaft.

For sensing actual incremental angular displacements of the motor drive shaft 122 (FIG. 1) from a home position, and thus incremental angular displacements of the drum 38 from its rest or home position as shown in FIG. 2, there is provided a quadrature encoder 126 (FIG. 1). The encoder 126 is preferably coupled to the motor drive shaft 122, rather than to the drum shaft 74, for providing higher mechanical stiffness between the armature of the d.c. motor 120 and the encoder 126 to avoid torsional resonance effects in the system. The encoder 126 includes a circularly-shaped disc 128, which is fixedly attached to the motor drive shaft 122 for operably connecting the encoder 126 to the motor 120. The disc 128 (FIG. 4) which is otherwise transparent to light, has a plurality of opague lines 130 which are formed on the disc 128 at predetermined, equidistantly angularlyspaced, intervals along at least one of the dics's opposed major surfaces. Preferably the disc 128 includes one hundred and ninety-two lines 130 separated by a like number of transparent spaces 132. In addition, the encoder 126 includes an optical sensing device 134, which is conventionally attached to the casing 19 and disposed in operating relationship with respect to the disc 128, for serially detecting the presence of the respective opaque lines 130 as they successively pass two reference positions, for example, positions **136*ra* and 136*rb*, and for responding to such detection by providing two output signals, one on each of communications lines 136*a* and 136*b*, such as signal A (FIG. 5) on line 136*a* and signal B on line 136*b*. Since the disc 128 (FIG. 4) includes 192 lines 130 and the gear ratio of the drum drive gear 76 (FIG. 1) to the motor pinion gear 124 is five-to-one, nine hundred and sixty signals A and B (FIG. 5) are provided on each of the communications lines 136*a* and 136*b* during five revolutions of the motor drive shaft 122, and thus, during each cycle of rotation of the drum 38. Since the angular distance between successive lines 130 (FIG. 4) is a constant, the time interval between successive leading edges (FIG. 5) of each signal A and B is inversely proportional to the actual velocity of rotation of the motor drive shaft (FIG. 1) and thus of the drum 38. The encoder 126 is conventionally constructed and arranged such that the respective reference positions 136***a* and 136*b* (FIG. 4) are located with respect to the spacing between line 130 to provide signals A and B (FIG. 5) which are 90 electrical degrees out of phase. Accordingly, if signal A lags signal B by 90° (FIG. 5) the D.C. motor shaft 122 (FIG. 1), and thus the drum 38, is rotating clockwise, whereas if signal A leads signal B by 90° (FIG. 5) the shaft 122 and drum 38 are both rotating counter-clockwise. Accordingly, the angular displacement in either direction of rotation of the drum 38 (FIG. 1) from its home position may be incrementally counted by counting the number of pulses A or B, (FIG. 5) as the case may be, and accounting for the lagging or leading relationship of pulse A (FIG. 5) with respect to pulse B.

Figure 6:
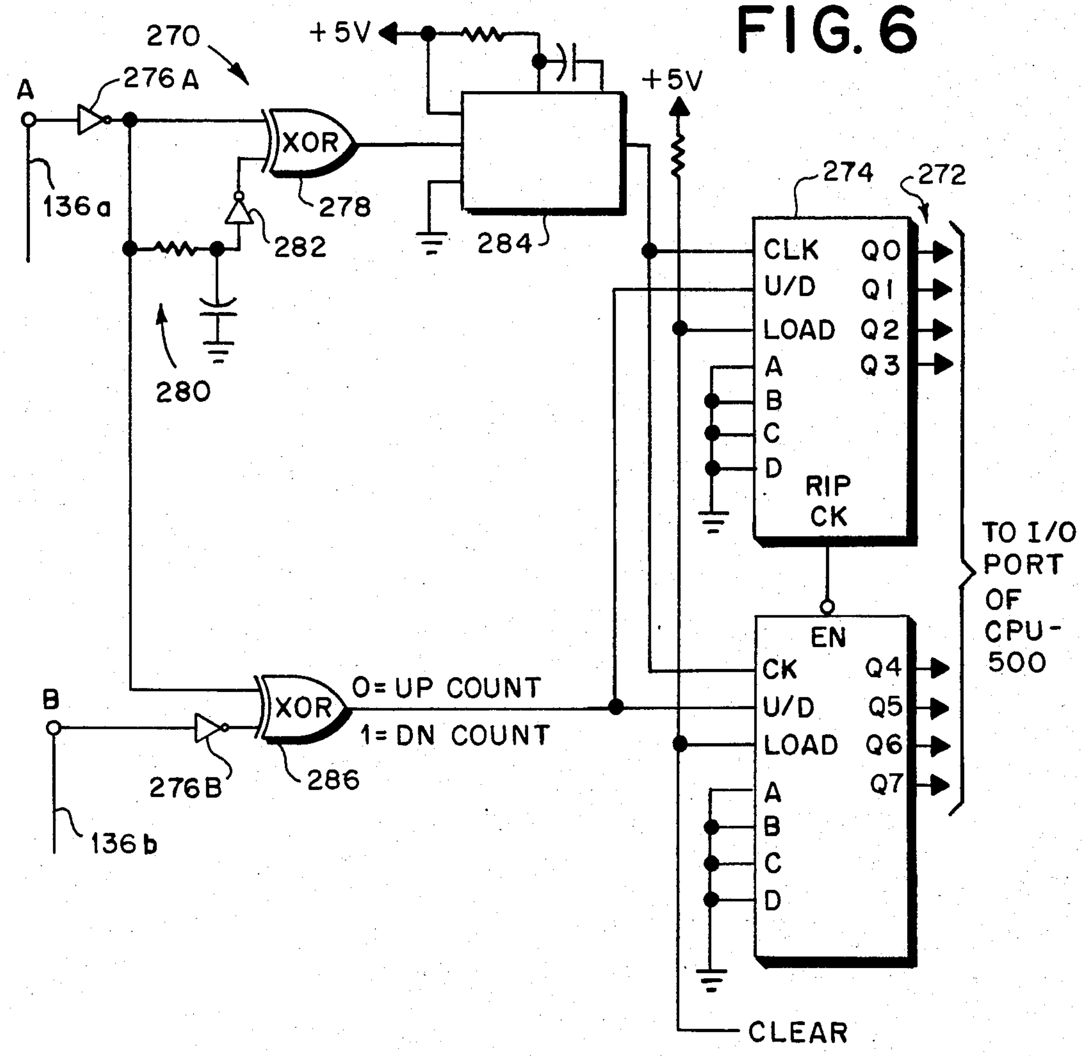
FIG. 6 is a schematic diagram of a preferred counting circuit for providing an eight bit wide digital signal for the computer which numerically represents the direction of rotation, and angular displacement, of the motor drive shaft, and thus the drum, from its home position.

The quadrature encoder communication lines, 136*a* and 136*b* (FIG. 1), may be connected either directly to the computer 500 for pulse counting thereby or to the computer 500 via a conventional counting circuit 270 (FIG. 6), depending on whether or not the internal counting circuitry of the computer 500 is or is not available for such counting purposes in consideration of other design demands of the system in which the computer 500 is being used. Assuming connection to the computer 500 via a counting circuit 270, the aforesaid communications lines, 136*a* and 136*b* are preferably connected via terminals A and B, to the counting circuit 270.

In general, the counting circuit 270 (FIG. 6) utilizes the pulses A (FIG. 5) to generate a clock signal and apply the same to a conventional binary counter 274 (FIG. 6), and to generate an up or down count depending on the lagging or leading relationship of pulse A (FIG. 5) relative to pulse B and apply the up or down count to the binary counter 274 (FIG. 6) for counting thereby. More particularly, the pulses A and B (FIG. 5) which are applied to the counting circuit terminals A and B (FIG. 6) are respectively fed to Schmidt trigger inverters 276A and 276B. The output from the inverter 276A is fed directly to one input of an XOR gate 278 and additionally via an R-C delay circuit 280 and an inverter 282 to the other input of the XOR gate 278. The output pulses from the XOR gate 278, which acts as a pulse frequency doubler, is fed to a conventional one-shot multivibrator 284 which detects the trailing edge of each pulse from the XOR gate 278 and outputs a clock pulse to the clock input CK of the binary counter 274 for each detected trailing edge. The output from the Schmidt trigger inverters 276A and 276B are respectively fed to a second XOR gate 286 which outputs a low logic level signal (zero), or up-count, to the up-down pins U/D of the binary counter 274 for each output pulse A (FIG. 5) which lags an output pulses B by 90 electrical degrees. On the other hand the XOR gate 286 (FIG. 6) outputs a high logic level (one) or down-count, to the up-down input pins of the binary counter 274 for each encoder output pulse A (FIG. 5) which leads an output pulse B by 90° electrical degrees. Accordingly, the XOR gate 286 (FIG. 6) provides an output signal for each increment of angular displacement of the encoded shaft 122 (FIG. 1) and identifies the direction, i.e., clockwise or counter-clockwise, of rotation of the encoded shaft 122. The binary counter 274 (FIG. 6) counts the up and down count signals from the XOR gate 286 whenever any clock signal is received from the multivibrator 284, and updates the binary output signal 272 to reflect the count.

Accordingly, the counting circuit 270 converts the digital signals A and B, which are representative of incremental angular displacements of the drive shaft 122 in either direction of rotation thereof, to an eight bit wide digital logic output signal 272 which corresponds to a summation count at any given time, of such displacements, multiplied by a factor of two, for use by the computer 500. Since the angular displacement of the shaft 122 from its home position is proportional to the angular displacement of the drum 38 from its home position, the output signal 272 is a count which is proportional to the actual linear displacement of the outermost periphery of the drum 38 at the end of a given time period of rotation of the drum 38 from its home position. For a typical postage meter drum 38, having a circumference, i.e., the arc described by the outermost periphery of the drum 38 in the course of revolution thereof, of 9.42 inches, which is connected to the motor drive shaft 122 via a mechanical transmission system having a 5:1 gear ratio between the motor 120 and drum 38, wherein the encoder disc 128 has 192 lines; the counting circuit 270 will provide an output of $2\times192\times384$ counts per revolution of the shaft 122, and $5\times384=1920$ counts per revolution of the drum 38 which corresponds to 203.82 counts per inch of linear displacement of the periphery of the drum. Accordingly, the maximum mailpiece transport velocity of $\mathbf{V1}=\mathbf{61}(10^{-3})$ inches per millisecond may be multiplied by a scale factor of 203.82 counts per inch to express the maximum transport velocity in terms of counts per millisecond, or, counts per sampling time period T where T=1 millisecond; i.e., $61(10^{-3})$ inches per millisecond times 203.82 counts per inch=12.43 counts per sampling time period T. Similarly, any other target velocity V1, or any acceleration or decceleration value, may be expressed in terms of counts per sampling time interval T, or counts per square millisecond, as the case may be, by utilization of the aforesaid scale factor.

For energizing the D.C. motor 120 (FIG. 1) there is provided a power amplifying circuit 300. The power amplifying circuit 300 (FIG. 7) is conventionally operably connected to the motor terminals 302 and 304 via power lines 306 and 308 respectively. The power amplifying circuit 300 preferably comprises a conventional, H-type, push-pull, control signal amplifier 301 having input leads A, B, C and D, a plurality of optical-electrical isolator circuits 303 which are connected on a one-for-one basis between the leads A-D and four output terminals of the computer 500 for coupling the control signals from the computer 500 to the input leads A, B, C, and D of the amplifier 301, and a plurality of conventional pull-up resistors 305 for coupling the respective leads A-D to the 5 volt source. The amplifier 301 includes four conventional darlington-type, pre-amplifier drive circuits including NPN transistors T1, T2, T3 and T4, and four, conventional, darlington-type power amplifier circuits including PNP transistors Q1, Q2, Q3 and Q4 which are respectively coupled on a one-for-one basis to the collectors of transistors T1, T2, T3 and T4 for driving thereby. The optical-electrical isolator circuits 303 each include a light emitting diode D1 and a photo-responsive transistor T5. The cathodes of D1 are each connected to the 5 volt source, the emitters of T5 are each connected to ground and the collectors of T5 are each coupled, on a one-for-one basis, to the base of one of the transistors T1, T2, T3 and T4. With respect to each of the opto-isolator circuits 303, when a low logic level signal is applied to the anode of D1, D1 conducts and illuminates the base of T5 thereby driving T5 into its conductive state; whereas when a high logic level signal is applied to the anode of D1, D1 is non-conductive, as a result of which T5 is in its non-conductive state. With respect to each of the combined amplifier circuits, T1 and Q1, T2 and Q2, T3 and Q3, and T4 and Q4, when the lead A, B, C or D, as the case may be, is not connected to ground via the collector-emitter circuit of the associated opto-isolator circuit's transistor T5, the base of T1, T2, T3 or T4, as the case may be, draws current from the 5 volt source via the associated pull-up resistor 305 to drive the transistor T1, T2, T3 or T4, as the case may be, into its conductive state. As a result, the base of transistor Q1, Q2, Q3 or Q4, as the case may be, is clamped to ground via the emitter-collector circuit of its associated driver transistor T1, T2, T3 or T4, thereby driving the transistor Q1, Q2, Q3 or Q4, as the case may be, into its conductive state. Contrariwise, the transistor pairs T1 and Q1, T2 and Q2, T3 and Q3, and T4 and Q4 are respectively biased to cut-off when lead A, B, C or D, as the case may be, is connected to ground via the collector-emitter circuit of the associated opto-isolator circuit's transistor T5. As shown in the truth table (FIG. 8) for clockwise motor rotation, Q1 and Q4 are turned on and Q2 and Q3 are turned off; whereas for counter-clockwise motor rotation, Q2 and Q3 are turned on and Q1 and Q4 are turned off. Accordingly, for clockwise motor rotation: terminal 302 (FIG. 7) of the motor 120 is connected to the 30 volt source via the emitter-collector circuit of Q1, which occurs when Q2 is turned off and the base of Q1 is grounded through the emitter-collector circuit of T1 due to the base of T1 drawing current from the 5 volt source in the presence of a high logic level control signal at input terminal A; and terminal 304 of the motor 120 is connected to ground via the emitter-collector circuit of Q4, which occurs when Q3 is turned off and the base of Q4 is grounded through the emitter-collector circuit of T4 due to the base of T4 drawing current from the 5 volt source in the presence of a high logic level signal at the input terminal D. On the other hand, for counter clockwise rotation of the motor 120: terminal 302 of the motor 120 is connected to ground via the emitter-collector circuit of Q2, which occurs when Q1 is turned off and the base of Q2 is grounded through the emitter-collector circuit of T2 due to the base of T2 drawing current from the 5 volt source in the presence of a high logic level control signal at the input terminal B; and terminal 304 of the motor 120 is connected to the 30 volt source via the emitter-collector circuit of Q3, which occurs when Q4 is turned off and the base of Q3 is grounded through the emitter-collector of T3 due to the base of T3 drawing current from the 5 volt source in the presence of a high logic level control signal at the input terminal C. For turning off the respective powers transistors Q1–Q4, on a two at a time basis, low level control signals are applied on a selective basis to the two terminals B and C, or A and D, as the case may be, to which high logic control level signals are not being applied; which occurs when the opto-isolator circuit's transistors T5 associated with the respective leads B and C or A and D are driven to their conductive states. When this occurs the bases of the transistors T2 and T3, or T1 and T4, as the case may be, are biased to open the emitter-collectors circuits of the transistors T2 and T3, or T1 and T4, as the case may be, as a result of which the bases of the transistors Q2 and Q3, or Q1 and Q4, as the case may be, are biased to open the emitter-collector circuits of transistors Q2 and Q3, or Q1 and Q4, as the case may be.

The velocity of the motor 120 (FIG. 7) is controlled by modulating the pulse width and thus the duty cycle of the high logic level, constant frequency, control signals, i.e., pulse width modulated (PWM) signals, which are timely applied on a selective basis to two of the leads A-D, while applying the low level logic signals to those of leads A-D which are not selected. For example, assuming PWM signals (FIG. 9) having a 50% duty cycle are applied to leads A and D (FIG. 7), and low level logic signals are applied to leads B and C, for clockwise rotation of the motor 120, the velocity of the motor 120 will be greater than it would be if high logic level PWM signals (FIG. 9) having a 25% duty cycle were similarly applied and will be less than it would be if high logic level PWM signals having a 75% duty cycle were similarly applied. Accordingly, assuming rotation of the motor 120 (FIG. 7) is commenced by utilizing high logic level PWM signals having a given duty cycle percentage, the velocity of the motor 120 may be decreased or increased, as the case may be, by respectively decreasing or increasing the duty cycle percentage of the applied high logic level PWM signals. Further, assuming the motor 120 is rotating clockwise due to PWM signals having a selected positive average value being applied to leads A and D, in combination with low level logic signals being applied to leads B and C, the motor 120 may be dynamically braked by temporarily applying high level PWM signals having a selected duty cycle corresponding to a given positive average value to leads B and C, in combination with low logic signals being applied to leads A and D. To avoid damage to the power transistors Q1, Q2, Q3 and Q4 which might otherwise result, for example, due to current spikes accompanying back emf surges which occur in the course of switching the circuit 301 from one mode of operation to the other, the emitter-collector circuits of the power transistors Q1, Q2, Q3 and Q4 are respectively shunted to the 30 volt source by appropriately poled diodes, D1, D2, D3 and D4 connected across the emitter-collector circuits of Q1, Q2, Q3 and Q4.

To control the motion of the drum 38 (FIG. 1) during each cycle of drum rotation, the D.C. motor 120 and its shaft encoder 126 are respectively connected to the computer 500 via the power amplifier circuit 300 and the counting circuit 270. And the computer 500 is programmed to calculate the duration of and timely apply PWM control signals to the power amplifier circuit 300 after each sampling time instant Tn, utilizing an algorithm based upon a digital compensator D(s) derived from analysis of the motor 120, motor load 38, 74, 76, 90 and 124 amplifying circuit 300, encoder 126, counting circuit 270, and the digital compensator D(s) in the closed-loop, sampled-data, servo-control system shown in FIG. 10.

Figure 10:
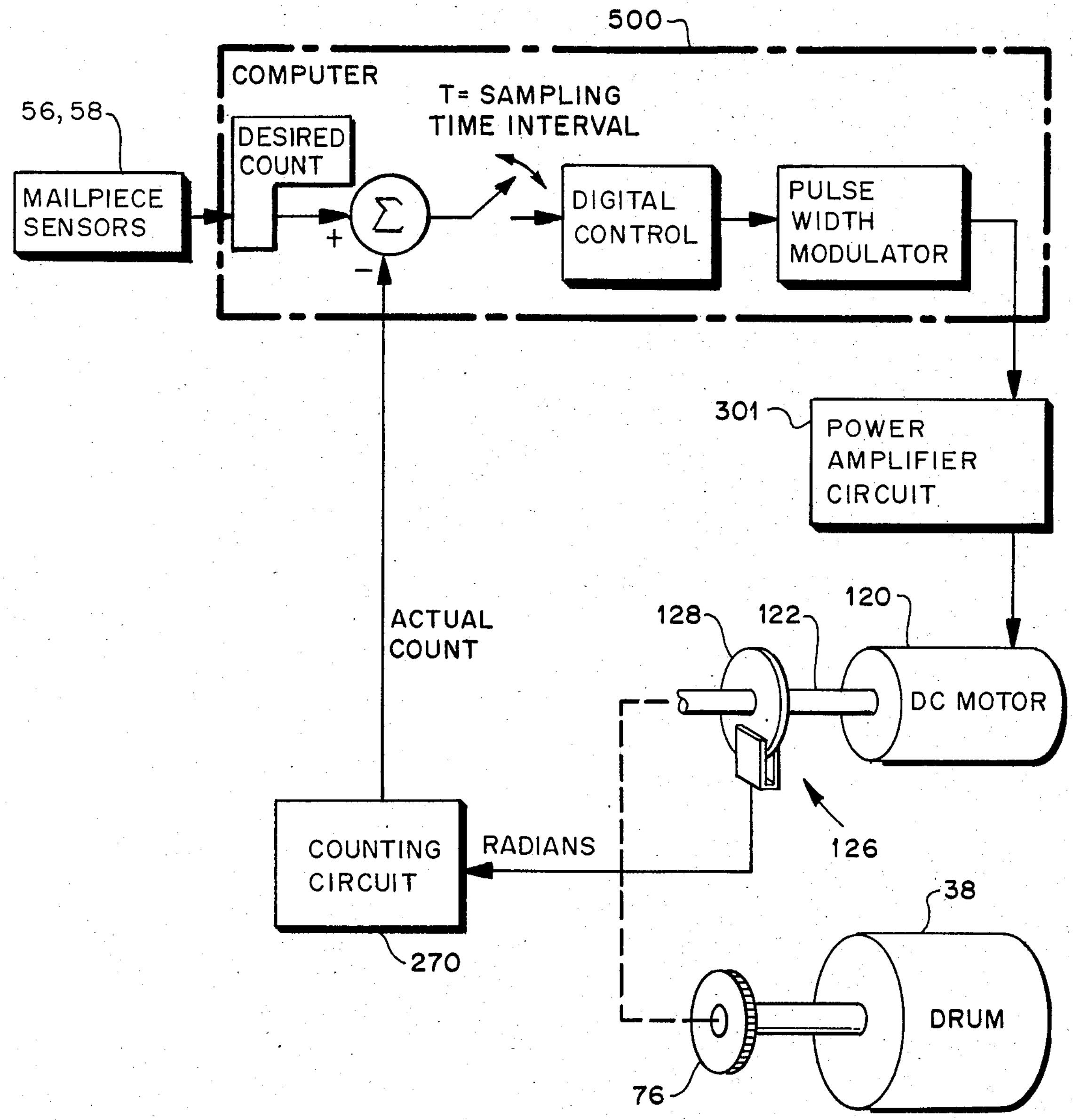
FIG. 10 shows a closed-loop servo system including the D.C. motor and computer.

With reference to FIG. 10, in general, at the end of each predetermined sampling time period of T=1 millisecond, the eight bit wide count representing the angular displacement of the motor drive shaft 122, and thus the drum 38, from its home position is sampled by the computer 500 at the time instant Tn. Under the control of the program of the computer 500 (FIG. 10), a summation is taken of the aforesaid actual count and the previously calculated count representing the desired position of the motor drive shaft 122, and thus the drum 38, at the end of the time period T, and, under control of the computer program implementation of the algorithm, a PWM control signal which is a function of the summation of the respective counts, or error, is applied to the power amplifier circuit 301 for rotating the motor drive shaft 122 such that the error tends to become zero at the end of the next sampling time period T.

Figure 11:
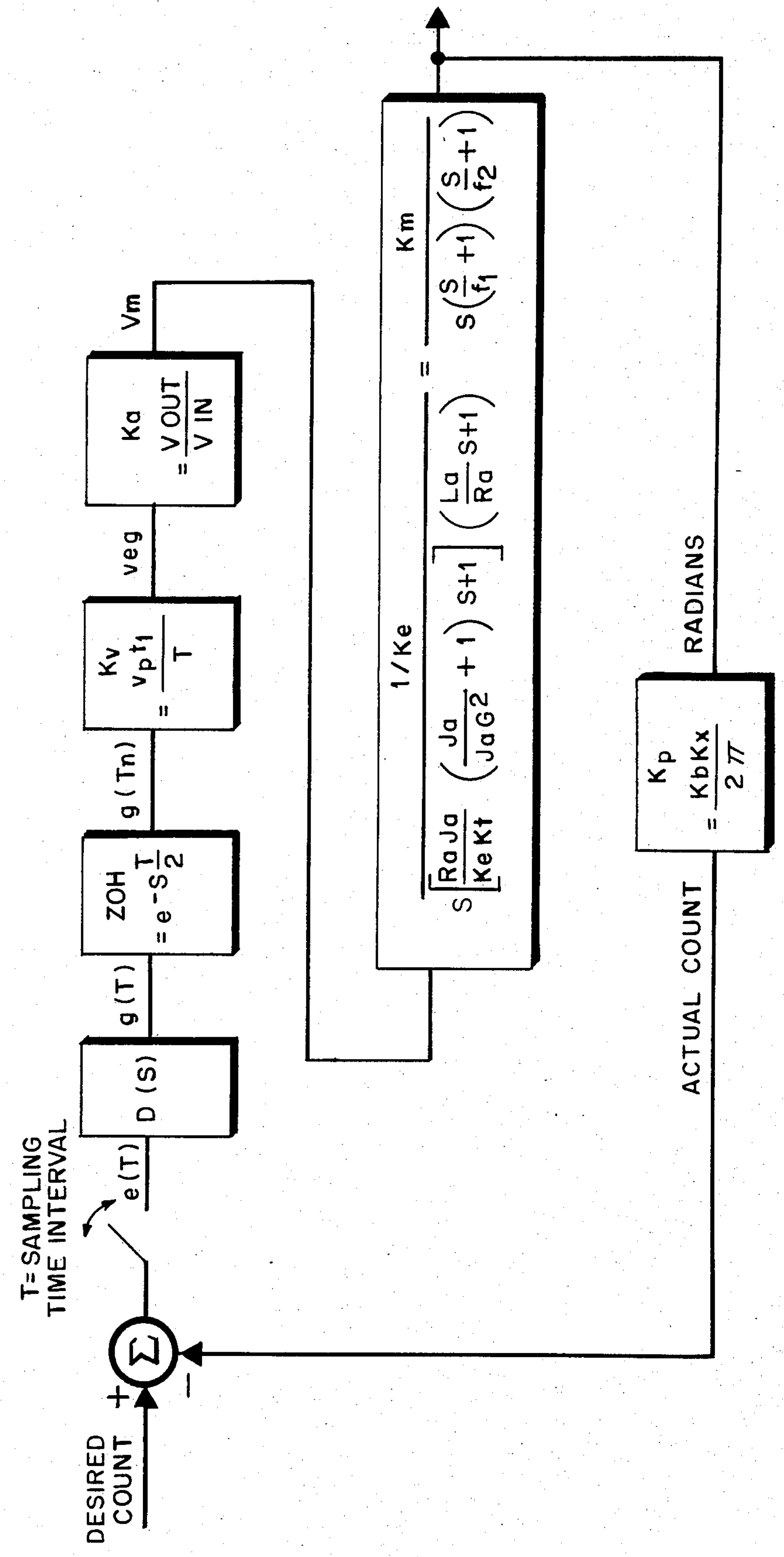
FIG. 11 is a block diagram portraying the laplace transform equations of the closed-loop servo system shown in FIG. 10.

To derive the algorithm, the servo-controlled system of FIG. 10 is preferably analyzed in consideration of its equivalent Laplace transformation equations shown in FIG. 11, which are expressed in terms of the following Table of Parameters and Table of Assumptions.

TABLE I

| Parameters | | |
|---|---|---|
| Parameter | Symbol | Value and/or Dimension |
| Zero-Order-Hold | ZOH | None |
| Laplace Operator | S | jw |
| Sampling Interval | T | Milliseconds |
| PWM D.C. Gain | $K_v$ | Volts |
| PWM Pulse Amplitude | $V_p$ | 5 Volts |
| PWM Pulse Width | $t_l$ | $10^{-6}$ Micro-seconds |
| Power Switching Circuit Gain | $K_a$ | None |
| Motor back e.m.f. Constant | $K_e$ | 0.63 Volts/radian/second |
| Motor Armature Resistance | $R_a$ | 1.65 Ohms |
| Motor Armature Moment of Inertia | $J_a$ | 2.12 ($10^{-5}$) Kilograms (meters$^2$) |
| Motor Torque Constant | $K_t$ | 0.063 Newton-Meters/amp |
| Drum Moment of Inertia | $J_l$ | 70.63 ($10^{-5}$) Kilograms (meter$^2$) |
| Gear Ratio, Motor to Load | G | 5:1, None |
| Motor Armature Inductance | $L_a$ | 2.76 Millihenrys |
| Motor Shaft Encoder Gain | $K_p$ | Counts/radian |
| Motor Shaft Encoder Constant | $K_b$ | 192 Lines/revolution |
| Counting Circuit Multiplier | $K_x$ | 2, None |
| Motor Gain | $K_m$ | 16, None |
| Poles in frequency domain | $f_1$;$f_2$ | 48;733 Radians/second |
| Starting Torque Gain | $K_c$ | None |
| System Overall Gain | $K_o$ | None |

TABLE II

| Assumptions | |
|---|---|
| ZOH: | Since the output and input are held constant during each sampling period a zero-order-hold is assumed to approximate the analog time function being sampled. |
| Veq.: | Since the integral of the voltage in time is assumed equal to the area under the PWM pulse, the output from the PWM is linear. |

With reference to FIG. 10, D(S) is the unknown transfer function of an open loop compensator in the frequency domain. Due to a key factor for providing acceptably fast motor response being the system's resonance between the motor and load, the derivation of the transfer function D(S) for stabilization of the system is preferably considered with a view to maximizing the range of frequencies within which the system will be responsive, i.e., maximizing the system's bandwidth, BW. For calculation purposes a sampling period of T=1 millisecond was chosen, due to having chosen a Model 8051 microprocessor, available from Intel Corporation, Palo Alto, Calif., for control purposes, and inasmuch as the Model 8051 microprocessor equipped with a 12 MHz crystal for providing a clock rate of 12 MHz, is able to conveniently implement a 1 KHz sampling rate and also implement application software routines, after control algorithm iterations, during the sampling period of T=1 millisecond. However, other sampling periods and other conventional microprocessors may be utilized without departing from the spirit and scope of the invention.

The open loop system gain $H_1(S)$ without compensation, of the servo-loop system of FIG. 10 is shown in FIG. 12(*a*). To tolerate inaccuracies in the transmission system between the motor and drum load, such as backlash, it was considered acceptable to maintain a steady-state count accuracy of plus or minus one count. To reflect this standard, the gain equation of FIG. 12(*a*) was adjusted to provide a corrective torque $C_t$ with a motor shaft movement, in radians per count, equivalent to the inverse expressed in radians per count, of the gain $K_p$ of the encoder counting circuit transform. Since the corrective torque $C_t$ is primarily the friction of the transmission system which has to be overcome by the motor at start-up, the value of $C_t$ may be assumed to be substantially equal to a maximum estimated numerical value based on actual measurements of the starting friction of the system, i.e., 35 ounce-inches, as a result of which a numerical value of the starting voltage $V_s$ may be calculated from the expression $V_s=(C_t)R_a/K_t$, i.e., $V_s=6.5$ volts, which, in turn, permits calculation of a numerical value for the minimum overall system gain $K_o$, at start-up, from the equation $K_o=V_s/K_p$, i.e., $K_o=397$ volts per radian, or for simplication purposes, 400 volts/radian. Accordingly, the open-loop uncompensated gain $H_1(S)$ may be rewritten as $H_2(S)$ as shown in FIG. 12(*b*), in which a gain factor of $K_c$ has been included, to account for the torque $C_t$ and the value of $K_o$ is substituted for the overall D.C. gain, i.e., $(K_v)(K_m)(K_p)(K_a)(K_c)=K_o$. Although the numerical value of $K_c$ may also be calculated, it is premature to do so, since it has not as yet been established that $K_o$, which has been adjusted by the value of $K_c$ to provide a minimum value of $K_o$, is acceptable for system stability and performance purposes. Otherwise stated, $K_o$ may not be the overall system gain which is needed for system compensation for maximizing the system bandwidth BW, as a result of which it is premature to conclude that $K_c$ will be equivalent to the D.C. gain of the system compensator D(S).

At this juncture, the Bode diagram shown in FIG. 13, may be constructed due to having calculated a minimum value for $K_o$. As shown in FIG. 13, the absolute value of $H_2(S)$, in decibels, has been plotted against the frequency W in radians per second, based on the calculated minimum value of $K_o$, the selected value of T and calculated values of the poles $f_1$ and $f_2$. From the Bode diagram, a numerical value of the crossover frequency $W_{cl}$ of the Bode plot of $H_2(S)$ may be determined, i.e., $W_{cl}$ was found to be substantially 135 radians per second. And, since the value of $W_{cl}$ is substantially equal to the bandwidth $BW_u$ of the uncompensated open-loop system $H_2(S)$, a calculation may be made of the phase margin $\theta_m$ of the uncompensated system from the expression $\phi_m=180°-\theta[H(S)]$ at $W_{cl}$, or, otherwise stated: $\phi_m=180°-\tan^{-1}(W_{cl})-\tan^{-1}(W_{cl}/f_1)-\tan^{-1}(W_{cl}/f_2)-\tan^{-1}(W_{cl}T/2)$. From this calculation, there was obtained a phase margin value which was much, much, less (i.e., 5°) than 45°, which, for the purposes of the calculations was taken to be a minimum desirable value for the phase margin $\phi_m$ in a position-type servo system. Accordingly, it was found that the uncompensated system $H_2(S)$ was unstable if not compensated. Since an increase in phase lead results in an increase in bandwidth BW, and the design criteria calls for maximizing the bandwidth BW and increasing the phase margin to at least 45°; phase lead compensation was utilized.

By definition, a phase lead compensator D(S) has the Laplace transform shown in FIG. 14, wherein $K_c$ is the phase lead D.C. gain, and $f_z$ and $f_p$ are respectively a zero frequency and a pole frequency. Adding the transfer function of the phase lead compensator D(S) to the Bode plot of the uncompensated system's transfer function $H_2(S)$, results in the Bode plot of the compensated system transfer function $H_3(S)$, if the zero frequeny $f_z$ of the phase lead compensator D(S) is chosen to be equivalent to $f_1$ in order to cancel the lag due to the mechanical time constant of the uncompensated transfer function $H_2S$. As shown in FIG. 13, the cross-over frequency $W_{c2}$ for the compensated system $H_3(S)$ may be read from the Bode diagram, i.e., $W_{c2}$ was found to be substantially equal to 400 radians per second. And, since by definition the crossover frequency $W_{c2}$ lies at the geometric mean of $f_p$ and $f_z$, the value of the $f_p$ may be established by doubling, from $f_z$, the linear distance between $W_{c2}$ and $f_z$, as measured along the logarithmic frequency axis, W, and reading the value of $f_p$ from the Bode diagram, i.e., $f_p$ was found to be substantially equal to 3,400 radians per second. Since numerical values may thus be assigned to both $W_{c2}$ and $f_p$ from the Bode diagram, the compensated phase margin $\phi_{mc}$, i.e., the phase margin for the phase lead compensated system $H_3(S)$ in which $f_z$ has been equated to $f_1$, may be found from the expression $\phi_{mc}=180°-90°-\tan^{-1}(W_{c2}/f_2)-\tan^{-1}(W_{c2}T/2)$. Upon calculating the compensated phase margin $\phi_{mc}$ it was found to be 50° and, therefore, greater than the minimum phase margin criteria of 45°. In addition, the value of $W_{c2}$ for the compensated system $H_3(S)$ was found to be substantially three times that of the uncompensated system $H_2(S)$, as a result of which the bandwidth BW of the system H(S) was increased by a factor of substantially three to $BW_c$.

At this juncture, the compensated system $H_3(S)$ is preferably analyzed with reference to the system's overshoot $O_s$ and settling time $t_s$ based on a calculation of the system damping factor $d_f$ and the assumption that the system will settle in five times constants, i.e., $t_s=5t_x$. The relevant values may be calculated or estimated, as the case may be, from the expressions, for $d_f$, $o_s$, $t_x$ and $t_s$ shown in FIG. 15. In connection with this analysis, reference is also made to the typical mailing machines hereinbefore described, wherein a maximum drum cycle time period $T_{ct}$ (FIG. 3) of 234 milliseconds and a maximum mailpiece transport speed (FIG. 2) of 61 inches per second are typical values. Assuming the velocity profile of FIG. 3, and, as previously discussed an acceleration time period of $T_a=37$ milliseconds, a constant velocity time period of $T_c=124$ milliseconds and decceleration time period of $T_d=24$ milliseconds, the longest permissible settling time for the system was calculated, i.e., $T_{ct}-(T_a+T_c+T_d)=234-185=49$ milliseconds. For analysis purposes a series of calculations of the aforesaid system characteristics and phase margin were performed, assuming incremental increases in the overall system gain $K_o$, while holding $f_z=f_1$. The results of such calculations are shown in the following Table III.

TABLE III

| | | $H_3$ (S) with $f_z = f_1$ | | |
|---|---|---|---|---|
| $K_o$ = system gain | $W_c$ = BW (rad./sec.) | $\theta_m$ = phase Margin (deg.) | $O_s$ = overshoot (percent) | $t_s$ = settling time (MS.) |
| 400 | 400 | 50 | 28 | 28.67 |
| 447 | 450 | 46 | 31 | 27.78 |
| 501 | 500 | 42 | 34 | 27.50 |
| 562 | 550 | 38 | 38 | 27.41 |

As shown in Table III, the system bandwidth BW may be maximized at 450 radians per second while maintaining a phase margin $\phi_m$ of at least 45° the two design criteria discussed above. Although this results in an increase in system overshoot $O_s$ accompanied by a negligible decrease in the settling time $t_s$, the settling time $t_s$ is well within the maximum allowable settling time, $T_s=49$ milliseconds. On the other hand, if a bandwidth of 400 radians per second is acceptable, it is desirable to reduce the percentage of overshoot $O_s$, and increase the phase margin to $\theta_{mc}=50$ to provide for greater system stability than would be available with a phase margin value (i.e., 46°) which is substantially equal to the design criteria minimum of 45°; in which instance it is preferable to choose the bandwidth of BW=400 radians per second, overshoot of $O_s=28\%$ and compensated phase margin of $\theta_{mc}=50°$. For the example given, a compensated Bandwidth of $BW_c=400$ radians per second is acceptable inasmuch as worst case load conditions were assumed. In this connection it is noted that the foregoing analysis is based on controlling a postage meter drum, which has a high moment of inertia, contributes high system friction, and calls for a cyclical start-stop mode of operation during which the load follows a predetermined displacement versus time trajectory to accommodate the maximum mailpiece transport speed in a typical mailing machine. Accordingly, the compensated system bandwidth $BW_c=400$ radians per second may be chosen, as a result of which the overall system gain $K_o$ may be fixed at $K_o=400$, and the value of $K_c$ may be calculated from the expression $K_c=K_o/(K_v)(K_a)(K_p)$. Since $f_z=f_1$, and $f_1$ and $f_p$ are also known, the Bode plot of the compensator D(S), FIG. 14, may be added to the Bode diagram (FIG. 13) wherein the system compensator D(S) is shown as a dashed line.

Since the analog compensator D(S) was derived in the frequency domain, D(S) was converted to its Z-transform equivalent D(Z) in the sampled data domain for realization in the form of a numerical algorithm for implementation by a computer. Of the numerous well-known techniques for transforming a function in the frequency domain to a function in the sampled-data domain, the bi-linear transformation may be chosen. For bi-linear transformation purposes the Laplace operator S is defined by the expression shown in FIG. 16. Using the values $K_c=13.64$, $f_z=f_1=48$, and $f_p=3{,}400$ in the expression for D(S) shown in FIG. 14, and substituting the bilinear transformation expression for S shown in FIG. 16 and the sampling interval T=1 millisecond, in the expression shown in FIG. 14 results in the expression for D(Z) shown in FIG. 17. As shown in FIG. 11, D(T)=output/input=g(T)/e(T), which, in the sampled data domain is expressed by the equation D(Z)=G(Z)/E(Z). Accordingly, the expression for D(Z) shown in FIG. 17 may be rewritten as shown in FIG. 18*a*. Cross-multiplying the equivalency of FIG.

18*a* results in the expression shown in FIG. 18*b*, which defines the output G(Z) in the sampled data domain of the system compensator D(S). Taking the inverse Z-transform of the expression shown in FIG. 18*b*, results in the expression shown in FIG. 19 which defines the output $G(T_n)$ in the time domain of the system compensator D(S), and is a numerical expression of the algorithm to be implemented by the computer for system compensation purposes. As shown by the expression in FIG. 19 and in the following Table IV the output of the digital compensator for any current sampling instant $T_n$ is a function of the position error at the then current sampling time instant $T_n$, is a function of the position error at the end of the next previous sampling time instant $T_{n-1}$ and is a function of the algorithm output at the end of the next previous sampling time instant $T_{n-1}$.

TABLE IV

| Function | Definition |
|---|---|
| $G(T_n)$ | Algorithm output for current sampling time instant $T_n$ |
| $E(T_n)$ | Position error for current sampling time instant $T_n$ |
| $G(T_{n-1})$ | Algorithm output for next previous sampling time instant $T_{n-1}$ |
| $E(T_{n-t})$ | Position error for next previous sampling time instant $T_{n-1}$ |
| $K_1$, $K_2$ & $K_3$ | Constants of the compensated system which are a function of the parameters of the motor load and system friction for a sampling time period of T = 1 millisecond. |

Accordingly, the algorithm which is to be implemented by the computer 500 for system compensation purposes is a function of a plurality of historical increments of sampled data for computing an input value for controlling a load to follow a predetermined position trajectory in a closed loop sampled-data servo-control system.

Figure 20:
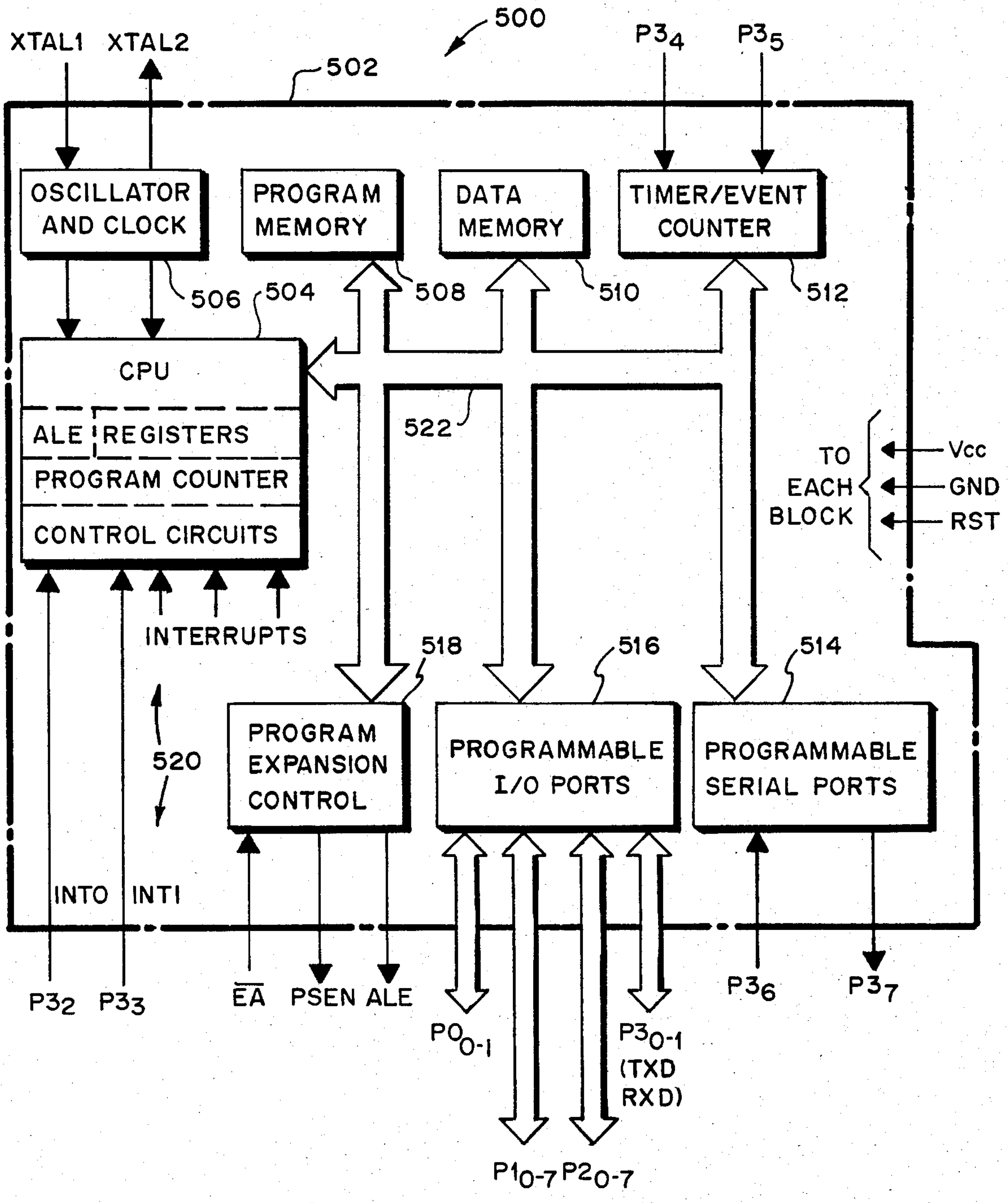
FIG. 20 is a block diagram of a preferred microprocessor for use in controlling the D.C. Motor.

As shown in FIG. 20 the computer 500 preferably includes a conventional, inexpensively commercially available, high speed microprocessor 502, such as the Model 8051 single chip microprocessor commercially available from Intel Corporation, 3065 Bowers Avenue, Santa Clara, Calif. 95051. The microprocessor 502, generally comprises a plurality of discrete circuits, including those of a control processor unit or CPU 504, an oscillator and clock 506, a program memory 508, a data memory 510, timer and event counters 512, programmable serial ports 514, programmable I/O ports 516 and control circuits 518, which are respectively constructed and arranged by well known means for executing instructions from the program memory 508 that pertain to internal data, data from the clock 506, data memory 510, timer and event counter 512, serial ports 514, I/O ports 514 interrupts 520 and/or bus 522 and providing appropriate outputs from the clock 506, serial ports 514, I/O ports 516 and timer 512. A more detailed discussion of the internal structural and functional characteristics and features of the Model 8051 microprocessor, including optional methods of programming port 3 for use as a conventional bidirectional port, may be found in the Intel Corporation publication entitled MCS-51 Family of Single Chip Microcomputers Users Manual, dated January 1981.

For implementing the sampling time period of T=1 millisecond, one of the microprocessor's timer and event counters 512 (FIG. 20) is conventionally programmed as a sampling time period clock source. To that end, a timer 512 is programmed for providing an interrupt signal each 250 microseconds, and each successive fourth interrupt signal is utilized as a clock signal for timing the commencement of successive sampling time periods of T=1 millisecond.

In general, as shown in FIG. 21, at the commencement of each sampling time period of T=1 millisecond, during the sampling instant $T_n$, a sample is taken of the count representative of the actual angular displacement of the motor drive shaft and, substantially immediately thereafter, the actual count is summed with the count representative of the desired angular displacement of the motor drive shaft which was calculated during the next preceeding time period T in order to obtain the then current error value $E(T_n)$ for calculating the then current compensation algorithm output value $G(T_n)$. Due to the recursive mathematical expression for $G(T_n)$ [FIG. 19] being a function of the then current error value $E(T_n)$, the next previous error value $E(T_{n-1})$ and the next previous compensation algorithm output value $G(T_{n-1})$, the expression for $G(T_n)$ is preferably separated into two components for calculation purposes, i.e., $G(T_n)=g_1+g_2$; wherein $g_1=K_1\times E(T_n)$, and wherein $g_2=-[K_2\times E(T_{n-1})+K_3\times G(T_{n-1})]$, to permit calculation of the value of $g_2$ in advance of the time period T when it is to be added to the value of $g_1$ for calculating the value of $G(T_n)$, thereby reducing to a negligible value (in view of the time period T) the time delay $T_{dy}$ before completion of sampling the actual displacement of the motor drive shaft at the instant $T_n$ and applying the PWM motor control signal to the output ports of the microprocessor. For example, when calculating the value of $G(T_n)$ based upon the first error value resulting from the summation of the counts representing the desired and actual angular displacements of the motor drive shaft, the value of $g_2$ is by definition equal to zero since the error signal $E(T_{n-1})$ is equal to zero, due to the desired and actual angular displacement values during the next previous sampling time period T having been equal to each other. Accordingly, upon obtaining the value of the first error signal $E_1(T_n)$, the value of $G_1(T_n)$ may be calculated as being equivalent to $g_1$, i.e., $G_1(T_n)=g_1=K_1\times E_1(T_n)$. And, upon calculating $G_1(T_n)$ the value of $g_2$ for use in calculating the next successive compensation algorithm output value $G(T_{n+1})$ may be calculated for subsequent use, since $g_2(T_{n+1})=-[K_2\times E_1(T_n)+K_3\times G_1(T_n)]$, and $K_2$, $K_3$, $E_1(T_n)$ and $G_1(T_n)$ are all known values. In addition, during any given time period T, a calculation may be made of the desired angular displacement of the motor drive shaft for the next subsequent time period T. Preferably, the microprocessor is programmed for implementation of the aforesaid calculation process to facilitate early utilization of the compensation algorithm output value $G(T_n)$ for driving the D.C. motor. Accordingly, the microprocessor is preferably programmed for: during the first sampling time period $T_1$, sampling the count representative of the actual angular displacement of the motor drive shaft at the time instant $T_n$, then taking the summation of that count and the previously calculated value of the desired angular displacement of the motor drive shaft to obtain the first error value $E_1(T_n)$, then calculating the first compensation algorithm output value $G_1(T_n)=K_1\times E_1(T_n)+g_2$, wherein $g_2=0$, and generating a PWM motor control signal representative of $G_1(T_n)$, then calculating the value of $g_2$ for the next sampling time period, i.e., $g_2=-[K_2\times E_1(T_n)+K_3\times G_1(T_n)]$, and then calculating the count representing the desired angular displacement of the motor drive shaft for use during the next sampling time period $T_2$; during the second sampling time period $T_2$, sampling the count representative of the actual angular displacement of the motor drive shaft and taking the summation of that count and the previously calculated desired count to obtain the error value $E_2(T_{n+1})$, calculating the compensation algorithm output value $G_2(T_{n+1})=K_1\times E_2(T_{n+1})+g_2=K_1\times E_2(T_{n+1})-K_2\times E_1(T_n)-K_3\times G_1(T_n)$, and generating a PWM motor control signal representative thereof, then calculating the value of $g_2$ for the next sampling time period $T_3$, i.e., $g_2-[K_2\times E_2(T_{n+1})+K_3\times G_2(T_{n+1})]$, and then calculating the count representative of the desired angular displacement of the motor drive shaft for use during the time period $T_3$; and so on, during each successive sampling time period.

Accordingly, as shown in FIG. 21, the microprocessor is programmed for immediately after calculating the then current compensation algorithm output value $G(T_n)$, and thus while the calculation of the value of $g_2$ for the next sampling time period is in progress, generating a motor control signal for energizing the power amplifier. For this purpose, the relative voltage levels of motor control signal are determined by the sign, i.e., plus or minus, of the compensation algorithm output value $G(T_n)$, and the duty cycle of the control signal is determined by the absolute value of the compensation algorithm output value $G(T_n)$. Preferably, for timing the duration of the motor control signal, the other timer and event counter 512, i.e., the timer 512 which was not used as a sampling time period clock source, is utilized for timing the duration of the duty cycle of the motor control signal. For example, by loading the absolute value of the $G(T_n)$ into the other timer 512, commencing the count, and timely invoking an interrupt for terminating the duty cycle of the control signal. As shown in FIG. 21(*c*), the time delay $T_{dy}$ from commencement of the time period T to updating the PWM motor control signal at the output ports of the microprocessor is substantially 55 microseconds, and the time interval allocated for calculating the value of $g_2$ and the count representative of the desired angular displacement of the motor drive shaft for use during the next time period is substantially 352 microseconds. As a result, substantially 593 microseconds of microprocessor calculation time is available during any given sampling time period T=1 millisecond for implementing non-motor control applications.

Figure 22A:
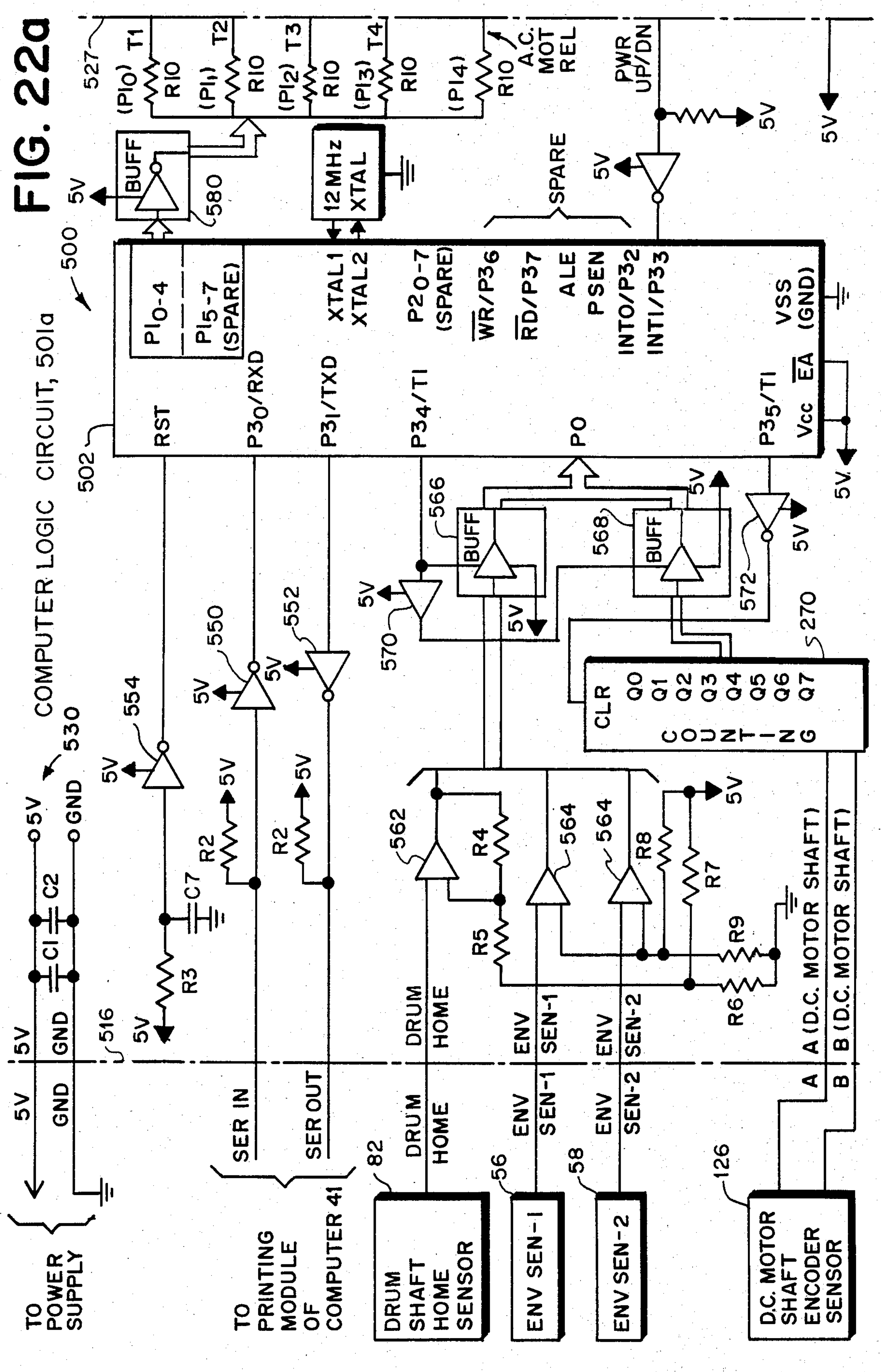
FIG. 22 (including FIGS. 22*a* and 22*b*) is a block diagram of the computer according to the invention.
Figure 22B:
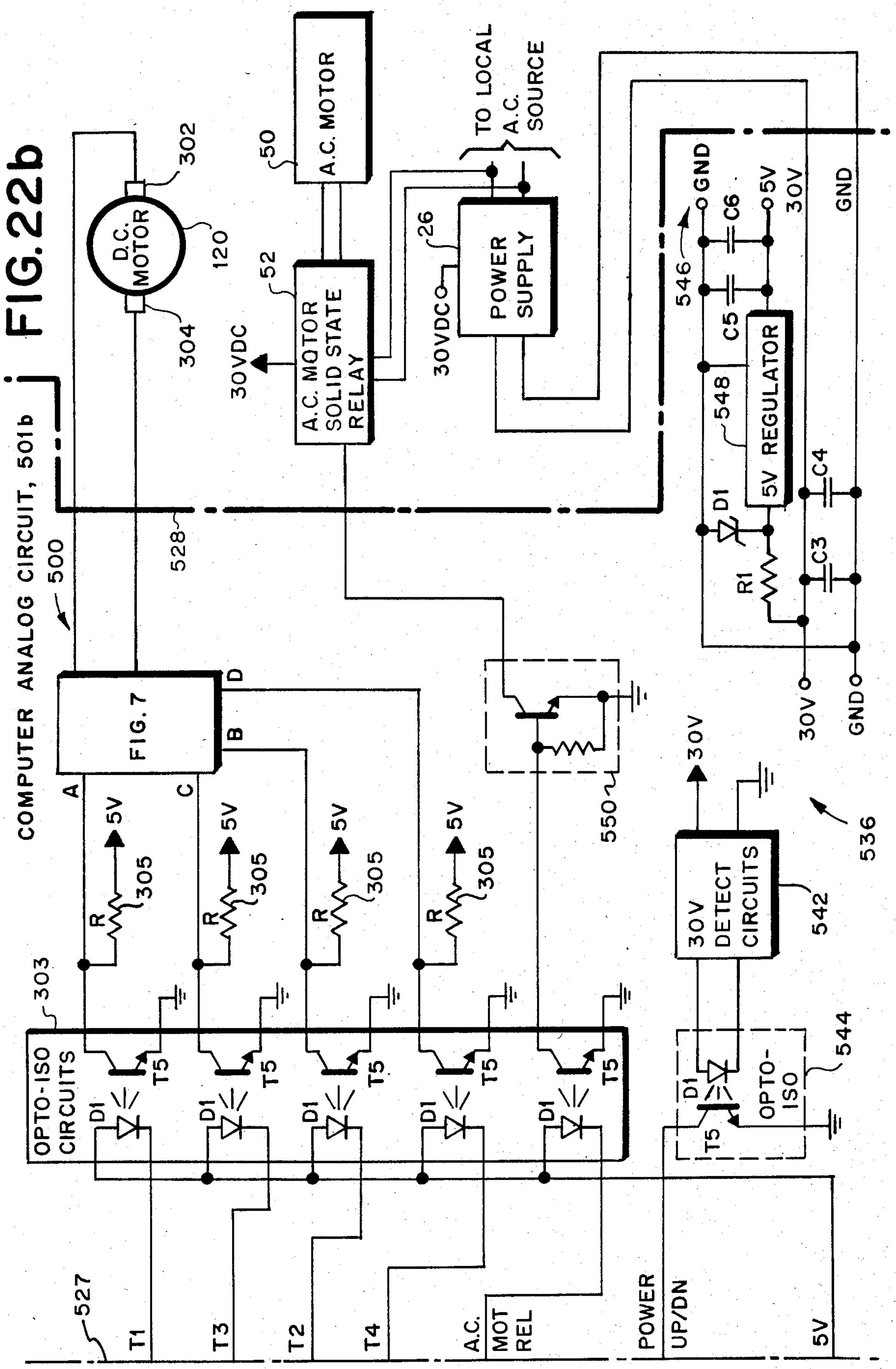

As shown in FIG. 22 the computer 500 is preferably modularly constructed for segregating the components of the logic circuit 501*a* and analog circuit 501*b* of the computer 500 from each other. To that end, the respective circuits 501*a* and 501*b* may be mounted on separate printed circuit boards which are electrically isolated from each other and adapted to be interconnected by means of connectors located along the respective dot-dash lines 516, 527 and 528. In any event, the components of the logic circuit 521*a* and analog circuit 521*b* are preferably electrically isolated from each other. To that end, the logic circuit 501*a* preferably includes 5V and ground leads from the mailing machine's power supply for providing the logic circuit 501*a* with a local 5 volt source 530 having 5V and GND leads shunted by filter capacitors C1 and C2. And the analog circuit 501*b* includes 30 volt and ground return leads from the mailing machine's power supply for providing the analog circuit 501*b* with a local 30 volt source 536 including 30 V and GND leads shunted by filter capacitors C3 and C4. In addition, the analog circuit 501*b* includes a conventional 30 volt detection circuit 542 having its input conventionally connected to the analog circuit's 30 volt source 536, and its output coupled to a power up/down lead from the analog circuit via a conventional optical-electrical isolator circuit 544. Further, to provide the analog circuit 501*b* with a local 5 volt source 546, the analog circuit 501*b* is equipt with a conventional regulated power supply having its input appropriately connected to the analog circuit's 30 volt source 536 via a series connected resistor R1 and a 5 volt, voltage regulator 548. A zener diode D1, having its cathode shunted to ground and having its anode connected to the input of the 5 V regulator 548 and also connected via the resistor R1 to the 30 volt terminal line, is provided for maintaining the input to the 5V regulator 548 at substantially a 5 volt level. In addition, a pair of capacitors C5 and C6 are provided across the output of the regulator 548 for filtration purposes.

To accommodate interfacing the postage meter's computer 41 (FIG. 1) with the computer 500, any two available ports of the computer 41 may be programmed for two-way serial communications purposes and coupled to the computer 500. For 3 example, the postage meter's printing module 41*a* may be conventionally modified to include an additional two-way serial communications channel for communication with the computer 500.

Assuming the latter arrangement, serial input communications to the computer 500 (FIG. 22) are received from the postage meter computer's printing module 41*c* via the serial input lead to the logic circuit 501*a* (FIG. 22), which is operably coupled to port $P3_0$ of the microprocessor 502 by means of a conventional inverting buffer circuit 550. Accordingly, port $P3_0$ is preferably programmed for serial input communications, and the input to the buffer circuit 550 is resistively coupled to the logic circuit's 5 volt source 530 via a conventional pull-up resistor R2. Serial output communications from the microprocessor 502 are transmitted from port $P3_1$. Accordingly, port $P3_1$ is preferably programmed for serial output communications, and is operably coupled to the input of a conventional inverting buffer 552, the output of which is resistively coupled to the logic circuit's 5V source 530 via a suitable pull-up resistor R2 and is additionally electrically connected to the serial output lead from the logic circuit 501*a*.

Since it is preferable that the microprocessor 502 be reset in response to energization of the logic circuit 501*a*, the logic circuit's 5V source 530 is connected in series with an R-C delay circuit and a conventional inverting buffer circuit 554 to the reset pin, RST, of the microprocessor 502. The R-C circuit includes a suitable resistor R3 which is connected in series with the logic circuit's local 5V source 530 and a suitable capacitor C7 which has one end connected between the resistor R3 and the input to the buffer circuit 554, and the other end connected to the logic circuit's ground return.

In addition to the VCC and (i.e., VSS) terminals of the microprocessor 502 being respectively conventionally connected to the logic circuit's 5 volt source and ground, since the microprocessor 502 does not utilize an external program memory, the $\overline{EA}$ terminal is connected to the logic circuit's 5V source. And, since no other external memory is used, the program storage enable and address latch enable terminals, PSEN and ALE are not used. In addition to the $\overline{EA}$ terminal being available for future expansion, ports $P1_5$–$P1_7$, ports $P2_0$–$P2_7$, the read and write terminals, $\overline{RD}$ and $\overline{WR}$, and one of the interupt terminals INTO/$P3_2$ are also available for future expansion.

In general, the microprocessor 502 is programmed for receiving input data from the postage meter drum's home position encoder 82 each of the envelope sensors 56, 58 and the D.C. motor shaft encoder 126, and, in response to a conventional communication from the postage meter's printing module 41*c*, timely energizing the D.C. motor under the control of the CPU of the microprocessor 502. Port P0 is programmed for receiving a transition signal representative of the disposition of the postage meter's drum 38 at its home position; transition signals from the envelope sensors 56 and 58 which represent detection of the leading edge of a mailpiece or other sheet 16 being fed to the drum 38 to permit calculation by the computer 500 of the velocity of the mailpiece and thus the desired angular displacement of the D.C. motor shaft 122 and thus the drum 38; and a count representative of the actual angular displacement of the D.C. motor shaft 122. Preferably, port P0 is multiplexed to alternately receive inputs from groups of the various sensors, under the control of an output signal from Port $P3_4$ of the microprocessor 502. The shaft encoder 82 which is utilized for sensing the home position of the postage meter drum 38 is coupled to the computer 500 via the drum home position lead of the logic circuit, which, in turn, is connected to one input of a differential amplifier 562, the output of which is connected to the other input of the differential amplifier 562 via a feedback resistor R4. The aforesaid other input to the amplifier 562 is also resistively coupled, by means of a resistor R5, to the midpoint of a voltage divider circuit including resistors R6 and R7. Resistors R6 and R7 are connected in series with each other and across the logic circuit's 5 V source and ground return leads. The LED sensors 56 and 58, which are utilized for successively sensing the leading edges of each envelope being fed by the letter transport, are separately coupled to the computer 500 via the envelope sensor-1 and envelope sensor-2 input leads of the logic circuit 501*a*. In the logic circuit 501*a*, the envelope sensor-1 and sensor-2 leads are connected on a one-for-one basis to one of the inputs of a pair of conventional amplifiers 564, the other inputs of which are connected together and to the mid-point of a voltage divider including resistors R8 and R9. Resistors R8 and R9 are connected in series with each other and across the logic circuit's 5V source and ground return leads. Further, the three output signals from the differential amplifier 562 and the two amplifiers 564 are connected on a one-for-one basis to the three input ports $P0_{0\text{-}2}$ of the microprocessor 502, each via a conventional tri-state buffer circuit 566, one of which is shown. The input signals A and B from the D.C. motor shaft encoder 126 are coupled to the logic circuit 501*a* by means of leads A and B, which are conventially electrically connected to the counting circuit 270 to provide the microprocessor 502 the the count representative of the actual angular displacement of the motor shaft 122 from its home position. The counting circuit's leads Q0–Q7 are electrically connected on a one-for-one basis to Ports $P0_0$–$P0_7$ of the microcomputer 502 via one of eight conventional tri-state buffer circuits 568, one of which is shown, having their respective control input leads connected to each other and to the output of a conventional inverting buffer circuit 570, which has its input conventionally connected port $P3_4$ of the microprocessor 502. Thus, either the three input signals, i.e., from the drum home position and the two envelope position sensors are operably electrically coupled to Ports $P0_0$–$P0_2$ of the microprocessor 502, or the eight input signals Q0–Q7 from the counter circuit 270 are operably electrically coupled to ports $P0_0$–$P0_7$ of the microprocessor 502, for scanning purposes, in response to an appropriate control signal being applied to the respective buffer circuits 566 and 568 from port $P3_4$ of the microprocessor 502. In operation, assuming a low logic level signal is required for activating either of the sets of buffers 566 or 568; when the microprocessor 502 applies such a signal to port $P3_4$, the buffer circuits 566 operate, whereas since the buffer circuit 570 inverts this signal to a high logic level signal before applying the same to the buffer circuit 568, the latter is inoperative. Conversely, a high logic level signal from port $P3_4$ will operate buffer circuits 568 and not operate the buffer circuits 566. Accordingly, depending upon the level, high or low, of the signal from port $P3_4$ of the microprocessor 502, the eight bit input to one or the other buffer circuits 566 or 568 will be made available to port PO for scanning purposes. Aside from the foregoing, to permit the microprocessor 502 to clear the counter 270 for any reason in the course of execution of the program, port $P3_5$ is connected to the clear pin CLR of the counter 270 via a conventional inverting buffer 572, and the microprocessor 502 is programmed for timely applying the appropriate signal to port $P3_5$ which, when inverted, causes the counting circuit 270 to be cleared.

Figure 7:
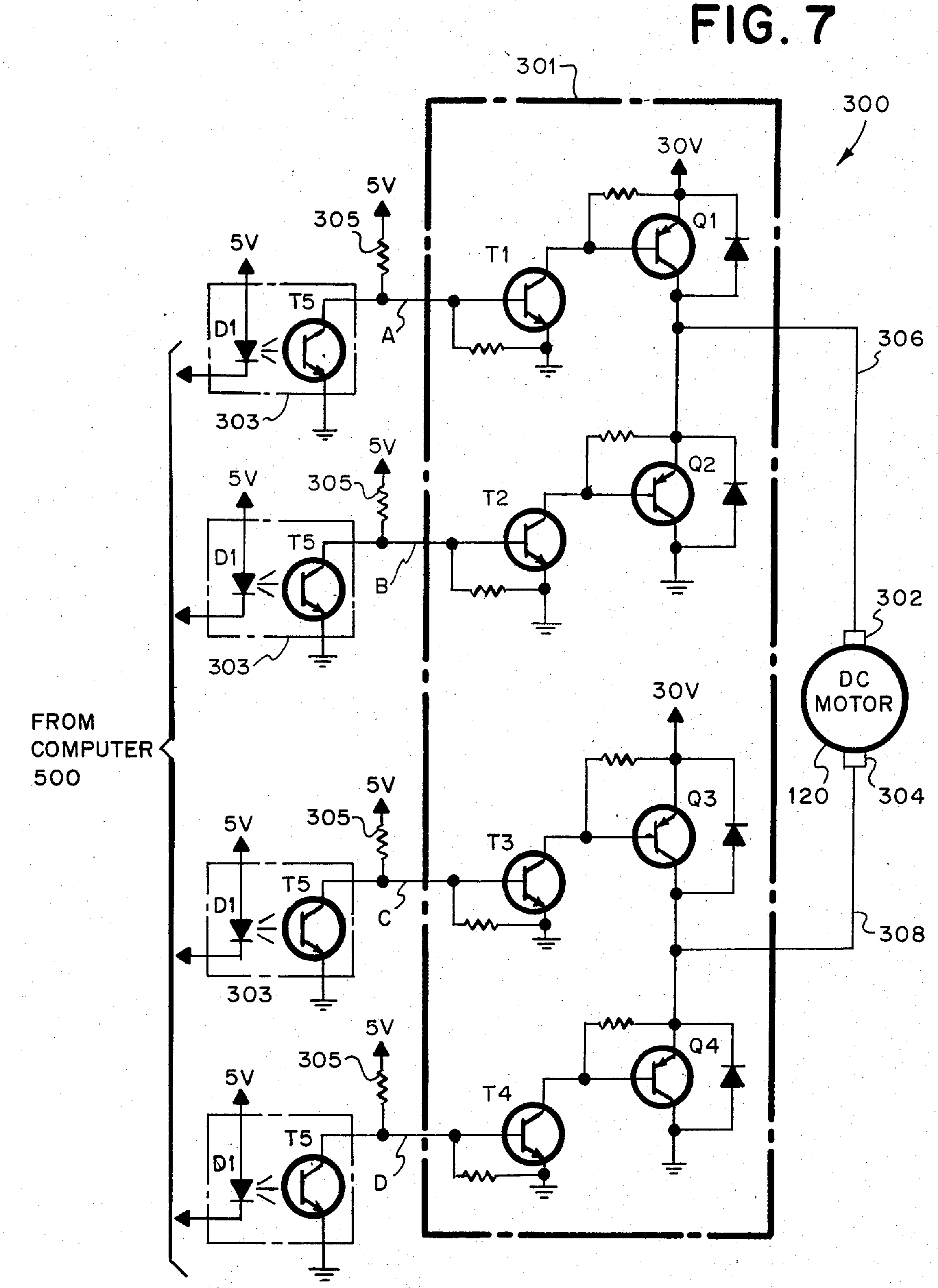
FIG. 7 shows a power amplifier circuit for coupling the computer to the D.C. motor.
Figures 8, 9:
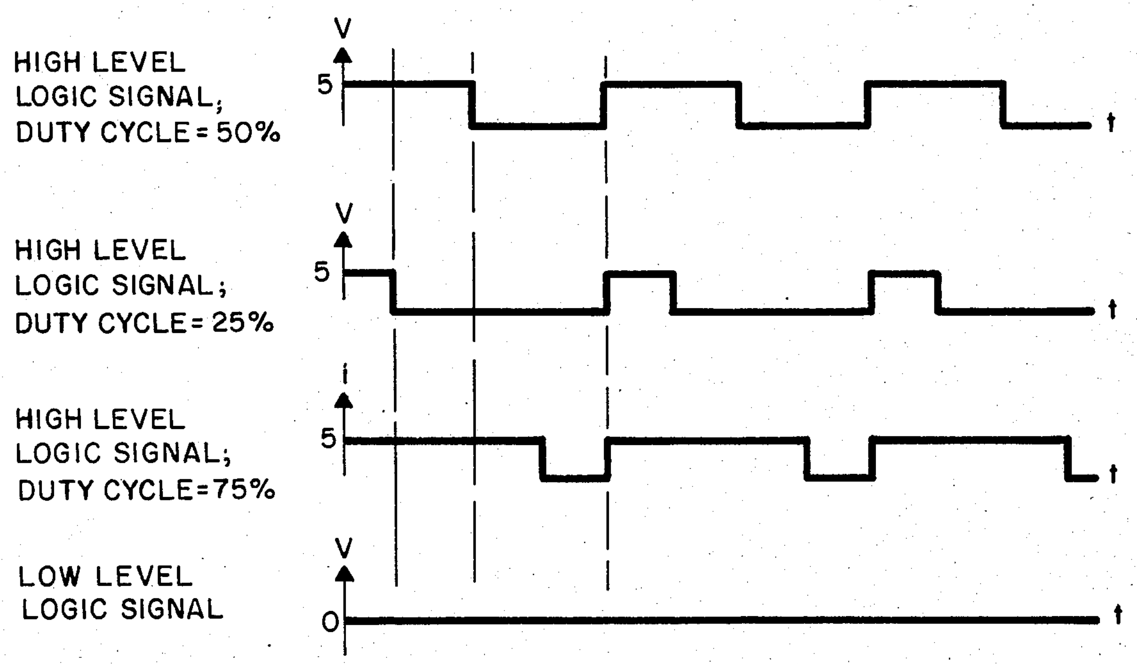
FIG. 8 is a truth table showing the status of the transistors in the power amplifying circuit for clockwise and counter-clockwise rotation of the D.C. motor.
FIG. 9 shows the relationship between the encoder output signals for various D.C. motor duty cycles.

In general, ports $P1_0$–$P1_3$ are utilized by the microprocessor 502 for providing pulse width modulated (PWM) motor control signals for controlling energization of the D.C. motor 120 and port $P1_4$ is utilized by the microprocessor 502 for controlling energization of the solid state, A.C. motor, relay 52 and thus operation of the mailpiece conveyor 49. To that end, ports $P1_0$–$P1_4$ of the microprocessor 502 are each conventionally electrically connected on a one-for-one basis to the input of a conventional inverting buffer circuit 580, one of which is shown. The outputs of each of the buffer circuits 580 are connected on a one-for-one basis, via a conventional resistor R10, to output leads from the logic circuit 501*b*, one of which is designated solid state, A.C. motor, relay, and four of which are respectively designated T1, T3, T2 and T4, since, as shown in FIG. 7, the four preamplifier stages of the power amplifier utilized for driving the D.C. motor 120 include the transistors T1–T4. Thus, the upper nibble of the signal from port P1 is utilized for controlling energization of the D.C. motor and one bit of the lower nibble is utilized for controlling energization of the solid state, A.C. motor, relay 52 and thus the A.C. motor 50. In the analog circuit 501*b*, each of the leads T1, T2, T3, T4 and solid state relay, from the logic circuit 501*a*, is electrically connected on a one-for-one basis to the anode of the light emitting diode D1 of five, conventional, phototransistor type, optical-electrical isolator circuits 303. Since the cathodes of the light emitting diodes D1 of the opto-isolator circuits 303 are connected to each other and to the 5 volt lead from the analog circuit 501*b* which extends to the 5 volt source of the logic circuit 501*a*, the motor control signals are isolated from the power system of the analog circuit 501*b* to avoid having spurious noise signals in the analog circuit 501*b* and its components interfere with the control signals generated by the microprocessor 502. The analog circuit **501*b* also includes a lead, designated power up/down, which extends from the analog circuit 501*b* to the logic circuit 501*a* and is connected to the microprocessor's interrupt INTI, port $P3_3$, to provide the microprocessor 502 with an appropriate input signal when the power is turned on, off or fails. In the analog circuit 501*b*, the power up/down lead from the logic circuit 501*a* is coupled to the thirty volt detect circuit 542 by means of a conventional opto-isolator 544, the power up/down lead being electrically connected to ground through collector-emitter circuit of the opto-isolator's photo-transistor when the light emitting diode D1** is lit in response to the D.C. supply voltage level matching the internal reference voltage level, e.g., 30 volts, of the 30 volt detection circuit.

In the analog circuit **501*b* each of the outputs from the photo-transistors of each of the opto-isolators 303 are resistively coupled to the analog circuits 5V source by means of a conventional pull-up resistor 305, and the emitters of the photo-transistors T5 are connected to the analog circuit's ground system. In addition, the collectors of the photodiodes of the opto-isolators 303, which are utilized for transmitting the motor control signals from ports $P1_0$–$P1_3$ of the microprocessor 502 are connected on a one-for-one basis to the appropriate input leads A, B, C and D of the power amplifiers shown in FIG. 7, the outputs of which are connected to the D.C. motor 120. Further, the collector of the photodiode of the opto-isolator 303 which is utilized for transmitting the A.C. relay control signals from port $P1_4$ of the microprocessor 502 is connected to the input lead of a conventional darlington-type power amplifier 550, the output of which is conventionally connected to the mailing machine's 30 volt D.C. source via a solid state, A.C. motor, relay 52, which is turn conventionally connected for energizing the A.C. motor 50** from the local A.C. source.

Figures 1, 23A:
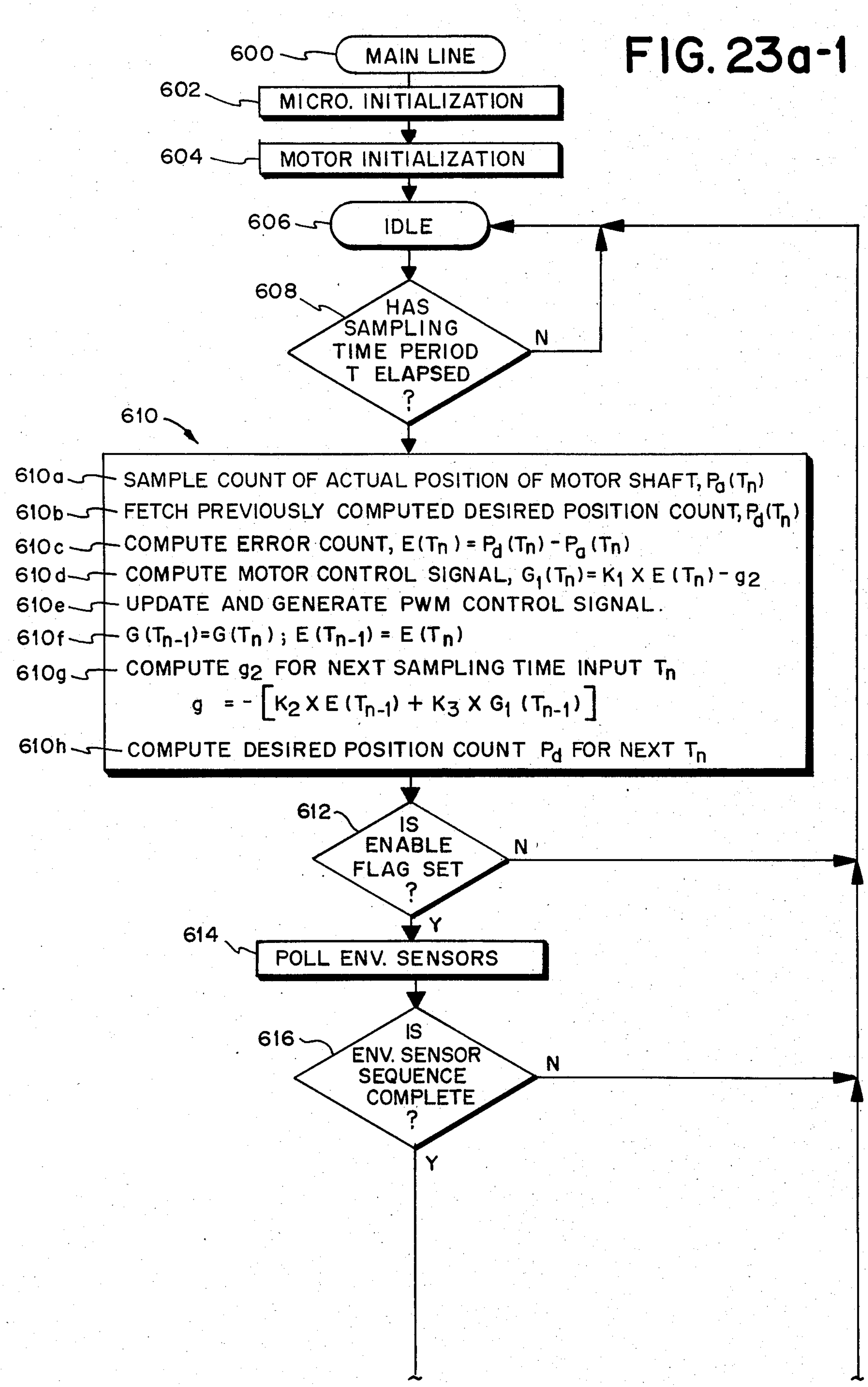
Figures 2, 23A:
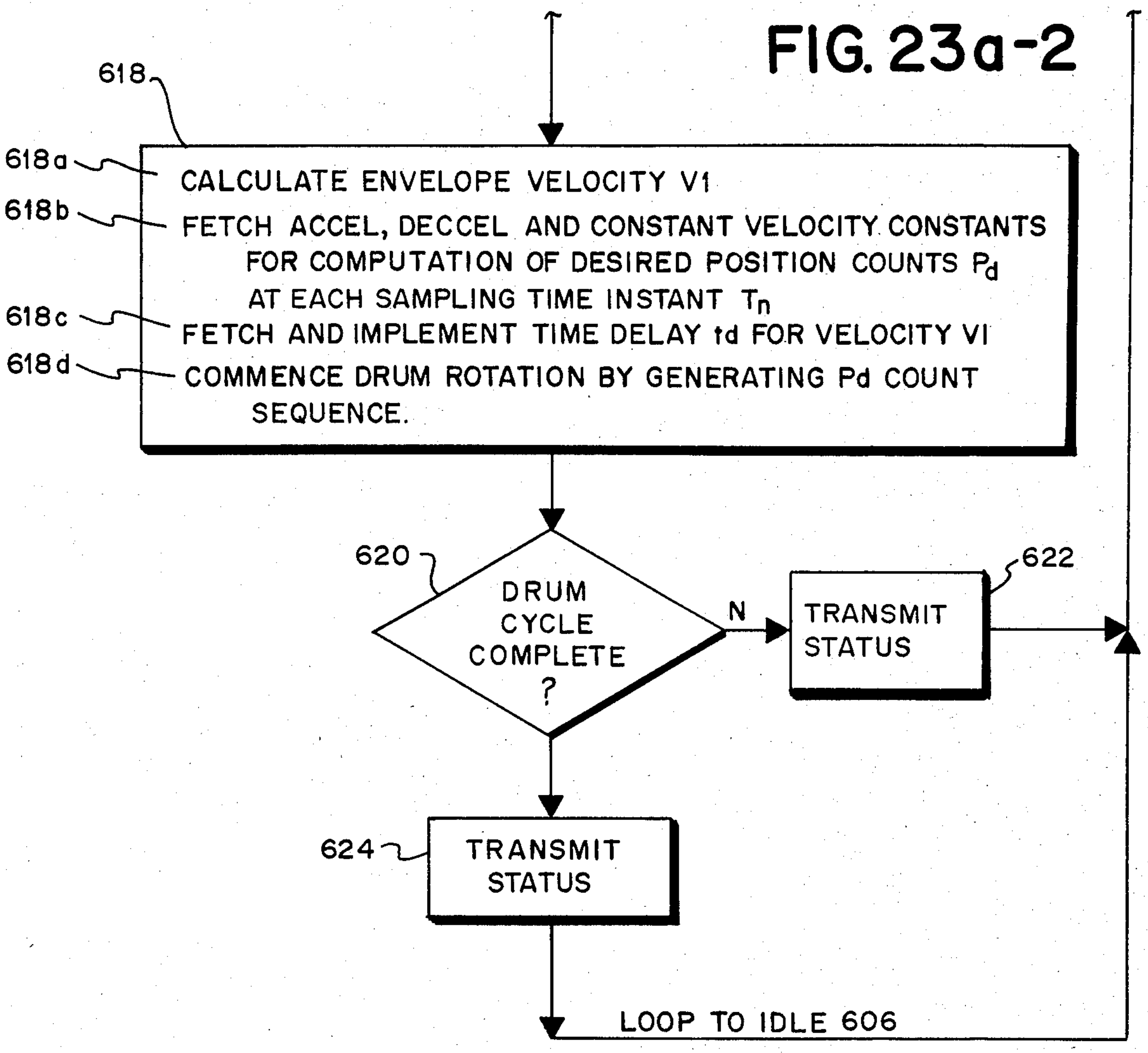

In general, the computer 500 includes three software programs, including a main line program FIG. 23, a transmit and receive program and a command execution program, respectively identified by the 600, 700 and 800 series of numbers. When the mailing machine 10 is energized by actuation of the main power switch 24, the resulting low level logic signal from D.C. supply is applied to the reset terminal RST of the computer's microprocessor 502, thereby enabling the microprocessor 502. Whereupon, as shown in FIG. 23, the microprocessor 502 commences execution of the main line program 600.

The main line program 600 (FIG. 23) commences with the step of conventionally initializing the microprocessor 602, which generally includes establishing the initial voltage levels at the microprocessor's ports, and interrupts, and setting the timers and counters. Thereafter, the D.C. motor drive unit is initialized 604. Step 604 entails scanning the motor home position sensor input port $P0_0$, to determine whether or not the D.C. motor 120 is located in its home position and, if it is not, driving the motor 120 to its home position. Assuming the D.C. motor 120 is in its home position, either before or after the initialization step 604, the program then enters an idle loop routine 606.

In the idle loop routine 606, a determination is initially made as to whether or not the sampling time period of T=1 millisecond has elapsed, step 608, it being noted that each successive sample is taken at the time instant $T_n$ immediately after and in response to the fourth 250 millisecond interrupt generated by the timer utilized for implementing the sampling time period T. Assuming the time period T has not elapsed, the program loops to idle 606. On the other hand, assuming the time period T has elapsed, the microprocessor 502 updates the servo-control system, step 610. For the purpose of explaining step 610 it will be assumed until otherwise stated that the desired location of the postage meter drum 38, and thus the motor drive shaft 122, is the home position. Step 610 includes the successive steps **610*a* and 610*b*, respectively, of sampling the count of the actual position Pa of the motor drive shaft 122 at the sampling time instant $T_n$, and fetching the previously computed count representing the desired position Pd of the shaft 122 at the same sampling time instant $T_n$. If for any reason the motor drive shaft 122 is not located in its home position when the value of the desired position count $Pd(T_n)$ is representative of the home position location, then the values of $Pa(T_n)$ and $Pd(T_n)$ will be different. On the other hand, if the motor drive shaft 122 is located in its home position when the desired position count $Pd(T_n)$ is representative of the home position location, then the values of $Pa(T_n)$ and $Pd(T_n)$ will be the same. Accordingly, computation of the error count, 610*c*, may or may not result in an error count value $E(T_n)$ of zero. Further, independently of the computed value of $E(T_n)$, the computed value $G(T_n)$ of the motor control signal, step 601*d*, may or may not result in a value of $G(T_n)$ of zero; it being noted that although step 610*c* results in a computed value of $E(T_n)=0$, the value of $g_2$ may not be equal to zero due to the computed value of the error for the next previous sampling time instant $E(T_{n-1})$ having resulted in a non-zero value, step 610*g*. Assuming steps 610*c* and 610*d* both result in zero value computations, then, upon updating and generating the PWM motor control signal, step 610*e*, no motor control signal will be generated. Under any other circumstances, step 610*e* will result in generating a PWM motor control signal for driving the D.C. motor 120, and thus the drum 38, to its home position. Thereafter, as shown in step 610*f***, the computed values of $E(T_n)$ and $G(T_n)$ are utilized as the values of $E(T_{n-1})$ and $G(T_{n-1})$ respectively for pre-calculating the value of $g_2$ for the next subsequent time instant $T_n$.

Accordingly, the computation made in the next step, **610*g*, to obtain the value of $g_2$ for the next sampling time instant $T_n$ is made by utilizing the replacement values $E(T_{n-1})$ and $G(T_{n-1})$. Thereafter, as shown in step 610*h*, the desired position count Pd for the next sampling time instant $T_n$ is made, which, as previously stated has been assumed to be representative of location of the motor drive shaft 122 in its home position. At this juncture it should be noted that the next step 612 in the program is to determine whether or not the enable flag is set, and, as hereinafter further discussed, this inquiry will be answered in the negative, causing the program to return to idle 606, unless a command has been received from the postage meter's computer 41 which results in feeding a mailpiece 16 to the postage meter drum 38. Accordingly, until a mailpiece 16 is fed to the postage meter drum 38, the main line program will continuously loop through steps 608, 610 and 612. As a result the motor drive shaft 122, and thus the drum 38, will be driven to the home position, against any force tending to move the drum 38 or shaft 122 out of the home position, until a mailpiece 16 is fed to the drum 38**.

At this juncture it will be assumed that the enable flag is set, as a result of which the inquiry of step 612 is answered affirmatively, or, as above stated, a mailpiece 16 is being fed to the drum 38. Accordingly, the microprocessor 502 commences polling the ports connected to the envelope sensors 56 and 58, step 614. Since polling occurs at one millisecond time intervals, the polling sequence is continuous. As shown by the following step 616, between successive time instants $T_n$, the program continuously loops to idle 606 and through steps 608–616 inclusive until the envelope sensing sequence for a given envelope is complete. Whereupon the microprocessor commences executing step 618, which includes the steps of calculating the envelope's velocity, 618*a;* then fetching from memory the corresponding acceleration, deceleration and constant velocity constants, 618*b,* for computation of the desired position counts Pd at each successive time instant $T_n$ in advance of sampling the actual position counts Pa as hereinbefore discussed in connection with step 610; then fetching and implementing the time delay $t_d$ for timely commencing acceleration of the drum 38 to the target velocity V1; and then commencing drum rotation by generating the desired position $P_d$ for the initial one millisecond sampling time instant of acceleration of the motor drive shaft 122 and storing the value for subsequent use in step 601*b*. Accordingly, the value of Pd will no longer be assumed to be the value representative of the home position.

Thereafter, the inquiry is made as to whether or not the drum cycle is complete, step 620. Assuming as stated above that only the initial desired value of Pd has been computed and stored, the inquiry of step 620 will be answered in the negative. Whereupon the microprocessor 502 transmits a status message, step 622, to the postage meter's computer 41 and the program loops to idle 606. Thereafter the microprocessor 502 continuously executes steps 608–620 until the entire Pd count sequence 618*d* for the trapazoidal-shaped velocity versus time profile for the target velocity V1 has been exhausted. In this connection it is noted that the drum cycle $T_{ct}$ is not complete until the settling time interval $T_s$ which is allowed for damping any overshoot of the motor drive shaft 122 is complete. During the settling time interval $T_s$ the value of Pd is a constant and representative of the home position of the shaft 122 and thus the drum 38. Assuming that the drum cycle is complete, the inquiry of step 620 will be answered affirmatively. Whereupon the microprocessor 502 transmits a status message, step 624, to the postage meter's computer 41 and the program loops to idle 606. Thereafter, the foregoing steps 606–622 of the main line, servo-control, idle loop are continuously executed by the microprocessor 502 in accordance with the above discussion until the main power switch 24 is opened by the operator.

The serial communications program 700 includes the transmit status routine 704. The latter routine 704 includes the steps of receiving and decoding any message, step 706, and invoking the execute command routine, step 708, both of which steps are self explanatory.

Assuming the execute command routine 800 has been invoked, step 708, the microprocessor 502 executes the routine 800 commencing with the step 802 of inquiring whether or not the decoded message is an enable command. Assuming the answer is yes, an enable status flag is set, step 804, to indicate that an envelope is to be fed to the drum 38. Whereupon the A.C. motor relay 52 is energized, step 806, for feeding the envelope to the drum 38, and the transmit status routine is invoked, step 808. On the other hand, assuming the decoded message is not an enable command, step 802, a enable status flag is cleared, step 810. Whereupon the A.C. relay is deenergized, step 812, and the status transmit routine is invoked 808.

Assuming the status transmit routine 702 has been invoked, step 806, the microprocessor 502 executes the routine 702 commencing with the step 710 of inquiring whether or not the drum cycle is complete. Assuming completion of the drum cycle, a drum cycle complete message is transmitted to the postage meter's computer 41, step 712. On the other hand, assuming the drum cycle is not complete, an inquiry is made as to whether or not the A.C. relay is energized, step 716, and, if it is, an A.C. relay energized message is transmitted to the postage meter's computer 41, step 718. If however the drum cycle is not complete, step 710, and the A.C. relay is not energized, step 716, then, an A.C. relay deenergized message is transmitted to the postage meter's computer 41, step 720. Upon transmitting any of the messages, drum cycle complete, step 710, A.C. relay energized, step 716, or A.C. relay deenergized, step 720, the microprocessor 502 returns to the idle 606 of the main line program 600.

The term postage meter as used herein includes any device for affixing a value or other indicia on a sheet or sheet like material for governmental or private carrier parcel, envelope or package delivery, or other purposes. For example, private parcel or freight services purchase and employ postage meters for providing unit value pricing on tape for application on individual parcels.

A more detailed description of the programs hereinbefore discussed is disclosed in the appended program listing which describes in greater detail the various routines incorporated in, and used in the operation of, the postage meter.

Although the invention disclosed herein has been described with reference to a simple embodiment thereof, variations and modifications may be made therein by persons skilled in the art without departing from the spirit and scope of the invention. Accordingly, it is intended that the following claims cover the disclosed invention and such variations and modifications thereof as fall within the true spirit and scope of the invention.

APPENDIX

```
     <<< ASSEMBLY COMMAND STRING >>>

MOTORC1.

     <<< end of assembly command string >>>
ER   LINE  ADDR  OBJECT        TYPE

        1                                $ABS
        2                                $NOGEN
        3                                $ERRORPRINT
```

```
          $INCLUDE(DECLARE.DMS)
          ;**********************************************
          ;        INTERNAL 8051 RAM's DECLARATION
          ;**********************************************
          ;*must have directly addressable bits.
          ;----------------------------------------
                           DSEG
                           ORG     20H
0020      FLAGS:           DS      5       ;*Mapped for flags.
0025      SAV_SENSR:       DS      1       ;*Sensors status register.
0026      STAT_HEADER:     DS      1       ;*System status communication header.
0027      MSG1_STAT:       DS      1       ;*System status first byte.
0028      MSG2_STAT:       DS      1       ;*System status second byte.
0029      MISTRIP_CTR:     DS      1       ;*Missed-trip counter (third status byte).
002A      ERR_CNT:         DS      1       ;*Error count register.
002B      K2H:             DS      1       ;*ABS(error) x COEFF2 (High) register.
002C      K2L:             DS      1       ; Low byte.
002D      CMMD_HEADER:     DS      1       ;Command-complete header.
002E      POSN_ACC:        DS      2       ;Desired position count accum (2-byte).
0030      BASE_INDEX:      DS      2       ;One cycle index accum (2-byte).
0032      RUN_SPEED:       DS      1       ;Computed velocity, counts/sample.
0033      VEL_OFFS:        DS      1       ;Velocity offset during deccel.
0034      GP_LATCH:        DS      1       ;Register for 'on-the-flyO latching.
0035      MARGIN:          DS      1       ;Print margin delay register.
0036      AUX_REG:         DS      1       ;Indirectly addressed register.
0037      ACCEL_CNT:       DS      2       ;Acceleration distance, counts (2-byte)
0039      DECCEL_INT:      DS      1       ;Decceleration time interval
003A      CYC_CTR:         DS      1       ;Cycle repeater counter
003B      TOTAL_CNT:       DS      2       ;Desired total distance (2-byte)
003D      ACCELK:          DS      1       ;Accel constant
003E      SLEWK:           DS      1       ;maximum speed constant.
003F      POFFS:           DS      2       ;METER_INDEX save area.
0041      DECCELK:         DS      1       ;Deccel constant
0042      PLIM_ERR:        DS      1       ;Positive error count limit.
0043      NLIM_ERR:        DS      1       ;Negative error count limit.
0044      PORTX_LATCH:     DS      1       ;Port X software latch.
0045      TRIP_CTR:        DS      2       ;Trip counter.
0047      SAV2_AREA:       DS      2       ;Last set bank no. and lir conv.
0049      DRUM_DECCEL:     DS      2       ;Drum deccel time constant reg.
004B      GP_PTR:          DS      2       ;General purpose pointer.
004D      START_OF_STACK:  DS      1
          ;**********************************
          ;        REGISTER BANK 0
          ;**********************************
          ;USED BY MAIN LINE ROUTINE.
          ;        R0 = general purpose; for indirect addressing modes.
          ;        R1 = general purpose; for indirect addressing modes.
          ;             local in Stepper Drive Loop.
          ;        R2 = 1ms-interval counter.
          ;        R3 = 256-ms interval counter
          ;        R4 = general purpose register.
0004      R4_RB0           EQU     04
          ;        R5 = accel/deccel timer high byte.
          ;        R6 = 1ms-increment time delay counter.
          ;        R7 = accel/deccel timer low byte.

          ;******************************
          ;        REGISTER BANK 1
          ;******************************
          ;R4 is exclusively used by Communication rtn.
          ;--------------------------------------------
                           DSEG
                           ORG     08
0008      R0_RB1:          DS      1
0009      R1_RB1:          DS      1
000A      R2_RB1:          DS      1
000B      R3_RB1:          DS      1
000C      R4_RB1:          DS      1
000D      R5_RB1:          DS      1
                           CSEG
0004      COMERR_CTR       EQU     R4
0008      GP1_SAVE         EQU     R0_RB1
0009      GP2_SAVE         EQU     R1_RB1
          ;*********************************
          ;        REGISTER BANK 2
          ;*********************************
          ;        R0 = trajectory computed count.
          ;        R1 = accum save location during int rtn.
          ;        R2 = control algorithm partial result storage (lbyte).
          ;        R3 = control algorithm partial result storage (hbyte).
          ;        R4 = scratchpad
          ;        R5 = scratchpad
          ;        R6 = 'on-the-fly' count latch
          ;        R7 = T1 timeout counter.
                           DSEG
                           ORG     10H
0010      COMP_CNT:        DS      1       ;Computed encoder count.
0011      TEMP:            DS      1       ;Accum temp storage.
0012      K1L:             DS      1       ;Partial control result lbyte.
0013      K1H:             DS      1       ;                       hbyte.
0014      R4_RB2:          DS      1
0015      R5_RB2:          DS      1
0016      SAVE_LATCH:      DS      1
0017      T1_CTR:          DS      1

          ;**********************************
          ;        REGISTER BANK 3
          ;**********************************
          ;RECEIVED MESSAGE ARRAY

0018      CMMD:            DS      5
001D      OLD_CMMD:        DS      1       ;Previous command.
          ;***********************************
          ;        FLAGS DECLARATION
          ;***********************************
          ;5 (20H-24H) BYTES WITH DIRECTLY-ADDRESSABLE BITS RESERVED
          ;Bit address 0 to 27H.
          ;-----------------------------------------------------
                           BSEG
                           ORG     00
```

```
0000                    COM_RSRV:         DBIT    5
0005                    BITMODE_FLG:      DBIT    1         ;Bit mode communication.
0006                    COMERR_FLG:       DBIT    1         ;Communication error flag.
0007                    DCMDIR_FLG:       DBIT    1         ;0 =DCmotor dir =CCW; 1=CW.
0008                    RUN_FLG:          DBIT    1         ;Slew mode flag.
0009                    ACCEL_FLG:        DBIT    1         ;Accel/deccel flag
000A                    PROF_FLG:         DBIT    1         ;0 =point-to-point; 1=velocity-position
000B                    INITZ_FLG:        DBIT    1         ;Initialization mode.
000C                    TR1_FLG:          DBIT    1         ;First mail detect.
000D                    TR2_FLG:          DBIT    1         ;Second mail detect.
000E                    QMSG_FLG:         DBIT    1         ;Message qued flag.
000F                    HOME_FLG:         DBIT    1         ;Load home indicator.
0010                    SMALL_FLG:        DBIT    1         ;5 counts or less flg.
0011                    CONT_FLG:         DBIT    1         ;Continuous mode flag.
0012                    SKIP_FLG:         DBIT    1         ;Flow skip flag.
0013                    CMMDSRC_FLG:      DBIT    1         ;Command source flag.
0014                    TEST_FLG:         DBIT    1         ;Test mode flag.
0015                    SAVE1_BIT:        DBIT    1         ;Bit temp storage.
0016                    RECVER_FLG:       DBIT    1         ;Transmission receiver.
0017                    DCMOVE_FLG:       DBIT    1         ;DC motor in active motion.
                        ;*************************************
                        ;        STATUS BITS EQUATES
                        ;        (REGISTERS MSG_STAT)
                        ;*************************************
                                          CSEG
0038                    WTCHDOG_FLG       EQU     MSG1_STAT.0     ;Program flow watchdog.
003A                    SYS_ENABLE        EQU     MSG1_STAT.2     ;Drive system enabled
003B                    STAT_FLG          EQU     MSG1_STAT.3     ;Status-change flag.
003C                    BADSENS_FLG       EQU     MSG1_STAT.4     ;Sensor stucked on.
003D                    TRIPEN_FLG        EQU     MSG1_STAT.5     ;Trip logic enable flag.
003E                    DCMBND_FLG        EQU     MSG1_STAT.6     ;DC motor bind

0040                    LO30VDC_FLG       EQU     MSG2_STAT.0     ;Low 30 VDC supply.
0041                    BADFEED_FLG       EQU     MSG2_STAT.1     ;Bad feed (paper jammed/shingle)
0042                    STRMF_FLG         EQU     MSG2_STAT.2     ;Streamfeed flag.
0045                    XPORT_FLG         EQU     MSG2_STAT.5     ;Transport path not clear
0046                    BADCOM_FLG        EQU     MSG2_STAT.6     ;Bad communication line.
0047                    INITZERR_FLG      EQU     MSG2_STAT.7     ;Initialization error.
                        ;***************************************
                        ;        CONSTANTS DECLARATION
                        ;***************************************
0000                    CHECK_SUM          EQU      0000  ;Checksum code.
03E8                    TC_SAMP            EQU      1000  ;Sampling interval= 1000us.
00FA                    TC_T1INT           EQU       250  ;T1 interrupt inerval = 250us.
000A                    TRIP_LTM           EQU        10  ;Trip limit pause.
1F40                    COMWTCHDOG         EQU      8000  ;Communication rtn watchdog interval.
0014                    LONG_TC            EQU        20  ;Long settling time interval.
0005                    SHORT_TC           EQU         5  ;Short.
0014                    TC3_SETTLE         EQU        20
000A                    TC1_STEP           EQU        10  ;Per step time interval.
0004                    TC2_STEP           EQU         4
0024                    HARD               EQU        36  ;Hard error count limit.
0030                    HARDER             EQU        48  ;Harder error.
003F                    HARDEST            EQU        63  ;Hardest error count limit.
0004                    SOFTERR            EQU         4  ;Soft (endstop) error limit.
0001                    INITZ_SPEED        EQU         1  ;Digit move speed during initz'n.
0059                    INITZ_ACCEL        EQU       59H  ;Accel constant with speed = INITZ_SPEED
0006                    SRCH_CNT           EQU         6  ;Search mode count constant.
0004                    ADJC               EQU         4  ;Backlash adjustment constant.
0168                    COEFF0             EQU       360  ;Algorithm coefficient 0
00FF                    COEFF1             EQU       255  ;Algorithm coefficient 1
0050                    COEFF2             EQU        60  ;Algorithm coefficient 2 (COEFF2/256)
0A00                    BASE_1REV          EQU     512*5  ;Base drv shaft 1 rotation distance.
0011                    RUMD               EQU        17         ;Drum velocity, cnt/sample.
001A                    BMAX_RUN           EQU        26         ;Base maximum velocity.
0079                    ACCD               EQU       79H         ;Drum accel rate, cnt/sample^2.
00AE                    DECCD              EQU      0AEH         ;Drum deccel rate.
0088                    BACCT              EQU       88H         ;Base maximum accel rate.
009A                    INTEN              EQU       9AH         ;Interrupt enable mask.
1000                    END_OF_PGM         EQU     1000H         ;End of program memory.
FA00                    MAX_CNT            EQU     BASE_1REV*25  ;Base maximum displacement.
                        $NOCOND
                        ;****************************************
                        ;        8155's MEMORY & I/O ADDRESS MAP
                        ;----------------------------------------
B800                    P8155              EQU      08800H  ;SDK emulation = 09800H
                                                            ;2732A eprom = 07800H.

                                           IF       HIGH(P8155) EQ 088H
B801                    PORTA              EQU      08801H  ;Port A address
B802                    PORTB              EQU      08802H  ;Port B address
B803                    PORTC              EQU      08803H  ;Port C address
9000                    PORTX              EQU       9000H  ;Port X address
1000                    EXRAM1             EQU       1000H  ;8155 start of RAM.

                        ;----------------------------------------
                        ;        SDK-51 AUXILIARY RTNS ENTRY
                        ;----------------------------------------
E00F                    CLRDSP             EQU      0E00FH  ;Clear SDK display.
E006                    DSPCHR             EQU      0E006H  ;Display an ASCII character.
E018                    DSP2BY             EQU      0E018H  ;Display 2-byte hex.
E015                    DSP1BY             EQU      0E015H  ;Dispaly 1-byte hex.
E01E                    DSPMSG             EQU      0E01EH  ;Display ASCII string.
E64C                    UPI_IN             EQU      0E64CH
E625                    UPI_CMD            EQU      0E625H
E3CB                    CSMERR             EQU      0E3CBH  ;Display checksum err msg.
C000                    KEYBD              EQU      0C000H
                                           ELSE
                                           ENDIF
                        $INCLUDE(INTVECTOR.DMS)
                        ;**************************************************
                        ;                  PROGRAM STARTS HERE
                        ;**************************************************
                                           ORG      00
0000                    BEGIN              EQU      $
0000  01 99     .C..                       AJMP     POWER_ON         ;Power-on initialization routine.

                        ;******************************************
                        ;                  LOOPS FOREVER
                        ;******************************************
                                           ORG      03
```

```
0003  02 00 03     ..C.                     LJMP    $                ;Loops forever if checksum error.
0006  00 00                 CHKSUM_CODE:    DW      CHECK_SUM
0008  C0 83        .D..     TOCONT:         PUSH    DPH
000A  32                                    RETI

                            ;*****************************************************************
                            ;                    T0 INTERRUPT SERVICE ROUTINE
                            ;*****************************************************************
                            ;Used to keep track of the PWM turn-on time interval.
                            ;Timer is reloaded and started in the T1_INT interrupt routine
                            ;       every sampling interval with computed servo output
                            ;       value ( =PWM turn-on time for the next sampling interval.)
                            ;Used by communication routine as watchdog.
                            ;Not used by servo control (output Xtors always OFF) when
                            ;       used by communication routine.
                            ;-----------------------------------------------------------------
                                            ORG     0BH
000B  43 90 03     .D..     T0_INT:         ORL     P1,#00000011B    ;Turn-off both source Xtors.
000E  10 06 01     .BR.                     JBC     COMERR_FLG,$+4   ;COMERR_FLG =1 when in comm rtn.
0011  32                                    RETI
0012  90 0A 8F     ..C.                     MOV     DPTR,#RADCOM     ;Force return to RADCOM but restore
0015  85 81        .D..                     MOV     SP,R6            ;SP for proper program continuation.
                            ;----------------------------------------
                            ;       SPECIFY RETURN ADDRESS
                            ;         FOR FORCED RETURN
                            ;----------------------------------------
0017  C0 82        .D..     FORCRET:        PUSH    DPL              ;Push to stack PC return address.
0019  80 ED        .R..                     SJMP    TOCONT
                            ;*****************************************************************
                            ;NAME:  TIMER1_INT
                            ;
                            ;ABSTRACT: Invokes by the sampling interval timeout; computes
                            ;       the desired duty cycle for the next sampling interval
                            ;       based on the sampled error count, last error count, and
                            ;       last output (pwm turn-on time).
                            ;
                            ;INPUTS:  SYS_WTCHDOG, K1L, K1H, ERR_CNT, DCMOVE_FLG, DPTR
                            ;
                            ;OUTPUTS;  SGN(PWM turn-on time) in K2H, K2L.
                            ;          ABS(PWM turn-on time) in Timer 0 and start Timer.
                            ;
                            ;VARIABLES MODIFIED: RB1 Registers, ERR_CNT, T0 Latches, TR0, P1
                            ;                K2H, K2L, Carry C, SYS_WTCHDOG
                            ;
                            ;RESTRICTIONS:
                            ;           For logic correctness and servo loop stability, this
                            ;           interrupt service rtn is position and time sensitive.
                            ;           Timer 1 interrupt must have WAIT_T1 loop of UPDTE_SERVO
                            ;           module as its only background routine to synchronize
                            ;           the system to the servo sampling interval. The time to
                            ;           compute the servo output must be insignificant relative
                            ;           to the sampling period, ie., time delay between sampling
                            ;           and outputting of PWM motor control must approach zero.
                            ;           Hence, DPTR, B register, and PSW are preset to PORT1,
                            ;           LOW(COEFF0), and Register Bank 2 respectively.
                            ;
                            ;SUBRTNS ACCESSED: None
                            ;*****************************************************************

                                            ORG     1BH
001B  D5 17 7A     .DR.     TIMER1_INT:     DJNZ    T1_CTR,T1_EXIT
001E  C2 8C        .B..                     CLR     TR0              ;Stop PWM timer.
0020  F9                                    MOV     R1,A             ;Save accum of background rtn.
                            ;----------------------------------
                            ;       COMPUTE ERROR COUNT
                            ;----------------------------------
0021  E0                                    MOVX    A,@DPTR          ;Sample actual position.
0022  FD                                    MOV     R5,A
0023  E0                                    MOVX    A,@DPTR
0024  B5 15 02     .DR.                     CJNE    A,R5_RB2,REREAD
0027  80 02        .R..                     SJMP    COMP_ERR
0029  E0                    REREAD:         MOVX    A,@DPTR
002A  FD                                    MOV     R5,A
002B  E8                    COMP_ERR:       MOV     A,R0                     ;Get desired position count.
002C  C3                                    CLR     C                        ;Acc =desired ;COMP_CNT =sampled.
002D  9D                                    SUBB    A,R5                     ;Error Count =desired count-Sampled
002E  F5 2A        .D..                     MOV     ERR_CNT,A                ;Save error count.
0030  20 E7 02     .BR.                     JB      ACC.7,$+5                ;Determine sign of error.
0033  80 02        .R..                     SJMP    CHK_IDLE_TOL             ;Bit =0 +; =1 -.
0035  F4                                    CPL     A                        ;Get absolute value of error if negat
0036  04                                    INC     A
0037  20 17 06     .BR.     CHK_IDLE_TOL:   JB      DCMOVE_FLG,COMP_PWM      ;Is mode still in active DC motor c
003A  B4 01 03     ..R.                     CJNE    A,#01,COMP_PWM           ;+/- 1 count tolerance if in idling
003D  E4                                    CLR     A                        ;ie, error count is made =0.
003E  F5 2A        .D..                     MOV     ERR_CNT,A

                            ;------------------------------------------------
                            ;                COMPUTE SERVO OUTPUT
                            ;------------------------------------------------
0040  FC                    COMP_PWM:       MOV     R4,A             ;Acc =ABS(err cnt) =R4.
0041  A4                                    MUL     AB               ;B =constant LOW(COEFF0).
0042  CC                                    XCH     A,R4
0043  25 F0        .D..                     ADD     A,B
0045  CA                                    XCH     A,R2             ;LOW( COEFF0 x err cnt )= R4; HIGH =R2.
0046  20 57 05     .BR.                     JB      ERR_CNT.7,MINUS
0049  2C                                    ADD     A,R4             ;R2(low),R3(high) registers hold the term
004A  CB                                    XCH     A,R3             ;[-COEFF1 x E(k-1)T - COEFF2 x G(k-1)T]
004B  3A                                    ADDC    A,R2             ;Output G(K)T is in R3=Lbyte, Acc=Hbyte.
004C  80 04        .R..                     SJMP    UPD_PWM
004E  C3                    MINUS:          CLR     C
004F  9C                                    SUBB    A,R4
0050  CB                                    XCH     A,R3
0051  9A                                    SUBB    A,R2

                            ;------------------------------------------------
                            ;                UPDATE PWM DRIVE
                            ;------------------------------------------------
0052  8B 2C        .D..     UPD_PWM:        MOV     K2L,R3
0054  20 5F 05     .BR.                     JB      K2H.7,$+8                ;Determine previous output sign bit.
0057  20 E7 07     .BR.                     JB      ACC.7,SIGNC_NEG          ;Output sign change from + to -.
005A  80 1F        .R..                     SJMP    SAME_POS                 ;No change + to +.
```

```
005C  30 E7 15  .RR.                    JNB    ACC.7,SIGNC_POS       ;Changed from - to +.
005F  80 07     .R..                    SJMP   SAME_NEG              ;No change - to -.
0061  43 90 0F  .D..      SIGNC_NEG:    ORL    P1,#00001111B    ;Turn off output Xtors if sign
0064  7C 08                             MOV    R4,#08           ;changed to avoid pwr supply short.
0066  DC FE     .R..                    DJNZ   R4,$             ;Turn-off delay time.
0068  F5 2B     .D..      SAME_NEG:     MOV    K2H,A            ;Save output.
006A  F5 8C     .D..                    MOV    TH0,A            ;Load timer registers.
006C  8B 8A     .D..                    MOV    TL0,R3
006E  00                                NOP
006F  53 90 F6  .D..      DIR_CW:       ANL    P1,#11110110B    ;Turn on Xtor CW pair.
0072  80 13     .R..                    SJMP   ON_TIMER         ;+err cnt =CCW; -err cnt =CW.
0074  43 90 0F  .D..      SIGNC_POS:    ORL    P1,#00001111B
0077  7C 08                             MOV    R4,#08
0079  DC FE     .R..                    DJNZ   R4,$
007B  F5 2B     .D..      SAME_POS:     MOV    K2H,A
007D  F4                                CPL    A                ;Get cpl of output if positive
007E  CB                                XCH    A,R3             ;because timer is upcount overflow.
007F  F4                                CPL    A
0080  F5 8A     .D..                    MOV    TL0,A
0082  53 90 F9  .D..      DIR_CCW:      ANL    P1,#11111001B    ;Turn on Xtor CCW pair.
0085  8B 8C     .D..                    MOV    TH0,R3
0087  D2 8C     .B..      ON_TIMER:     SETB   TR0              ;Start timer.

0089  E9                                MOV    A,R1             ;Restore accumulator.
008A  10 38 0B  .BR.                    JBC    WTCHDOG_FLG,T1_EXIT     ;Program in sync?
008D  D2 38     .B..                    SETB   WTCHDOG_FLG      ;Program went out of sync with servo
008F  D0 4B     .D..      IFATAL:       POP    GP_PTR           ;control sampling clock.
0091  D0 4C     .D..                    POP    GP_PTR+1         ;Save actual return address for later
0093  90 02 03  ..C.                    MOV    DPTR,#IFATAL     ;diagnostics before forcing a RETI to
0096  01 17     .C..                    AJMP   FORCRET          ;fatal error trap.
0098  32                  T1_EXIT:      RETI
                          $INCLUDE(POWERON.DMS)

                          ;*************************************************
                          ;*******      POWER-UP PROGRAM INITIALIZATION     ******
                          ;*************************************************

                          ;------------------------------------------------
                          ;                    COMPUTE PROGRAM CHECKSUM
                          ;------------------------------------------------
0099  30 B3 FD  .BR.      POWER_ON:     JNB    P3.3,$           ;Wait for 30 volts supply.
009C  90 00 00  ..C.                    MOV    DPTR,#BEGIN      ;Program memory 0 to 4K.
009F  7F 00                             MOV    R7,#00
00A1  E4                  CHKSUM_LOOP:  CLR    A
00A2  93                                MOVC   A,@A+DPTR
00A3  2F                                ADD    A,R7
00A4  FF                                MOV    R7,A
00A5  A3                                INC    DPTR
00A6  E5 83     .D..                    MOV    A,DPH
00A8  B4 10 F6  ..R.                    CJNE   A,#10H,CHKSUM_LOOP
00AB  EF                                MOV    A,R7
00AC  60 03     .R..                    JZ     INITZ_RTN
00AE  02 E3 CB            CHKSUM_ERR:   LJMP   CSMERR

                          ;---------------------------------------------
                          ;                    INITIALIZE I/O PORTS
                          ;---------------------------------------------
00B1  C2 B1     .B..      INITZ_RTN:    CLR    P3.1             ;Hold Transmit Line low.
00B3  12 E0 0F                          LCALL  CLRDSP           ;Clear SDK display.
00B6  74 0C                             MOV    A,#0CH           ;Set up 8155 command register.
00B8  90 88 00                          MOV    DPTR,#P8155      ;Configures Port C as output
00BB  F0                                MOVX   @DPTR,A          ;Ports A and B as inputs.
00BC  74 FF                             MOV    A,#0FFH          ;Write 1's to output ports:
00BE  F5 90     .D..                    MOV    P1,A             ;P1
00C0  75 82 03  .D..                    MOV    DPL,#03
00C3  F0                                MOVX   @DPTR,A          ;Port C
00C4  90 90 00                          MOV    DPTR,#9000H
00C7  F0                                MOVX   @DPTR,A          ;Port X
                          ;---------------------------------------------
                          ;                    CLEAR INTERNAL RAMS
                          ;           SET UP TIMERS, INTERRUPTS, STACK
                          ;---------------------------------------------
00C8  E4                                CLR    A
00C9  78 7F                             MOV    R0,#7FH                     ;Clear 8051 internal ram's.
00CB  F6                  CLR_8031:     MOV    @R0,A
00CC  D8 FD     .R..                    DJNZ   R0,CLR_8031
00CE  F5 88     .D..                    MOV    TCON,A                      ;Clear all interrupt flags.
00D0  F5 A8     .D..                    MOV    IE,A                        ;and interrupt enables.
00D2  F4                                CPL    A
00D3  F5 44     .D..                    MOV    PORTX_LATCH,A               ;Put FFH to Port X latch.
00D5  75 B8 02  .D..                    MOV    IP,#02                      ;T0 highest priority
00D8  75 89 21  .D..                    MOV    TMOD,#21H                   ;T1 =mode 2; T0 =mode 1.
00DB  75 8D 06  .D..                    MOV    TH1,#(-TC_T1INT)            ;Timer 1 interval constant.
00DE  75 81 4C  .DD.                    MOV    SP,#START_OF_STACK-1        ;First stack location.
00E1  43 A8 9A  .D..                    ORL    IE,#INTEN                   ;Enable interrupts except EX1.

                          ;---------------------------------------------
                          ;                COMPUTE CONSTANT PARAMETERS
                          ;---------------------------------------------
00E4  75 3D AE  .D..                    MOV    ACCELK,#DECCD    ;Given decel rate and running speed,
00E7  0F                  ITER00:       INC    R7                  ;compute decel distance and
00E8  12 09 42  ..C.                    LCALL  COMP_ACCEL          ;decel time interval.
00EB  25 4A     .D..                    ADD    A,DRUM_DECCEL+1
00ED  F5 4A     .D..                    MOV    DRUM_DECCEL+1,A
00EF  BC 11 F5  ..R.                    CJNE   R4,#RJMD,ITER00
00F2  8F 49     .D..                    MOV    DRUM_DECCEL,R7
00F4  75 35 46  .D..                    MOV    MARGIN,#70       ;Initialize MARGIN to 1/4 inch.
                          $INCLUDE(INITZLOAD.DMS)

                          ;*******************************************
                          ;******     INITIALIZE MECHANICAL BASE    *****
                          ;*******************************************
00F7  D2 3A     .B..      INITZ_LOAD:   SETB   SYS_ENABLE                  ;Enable system.
00F9  91 34     .C..                    ACALL  START_SERVO                 ;Start servo control.

                          ;---------------------------------
                          ;        CHECK OPTICAL SENSORS
                          ;---------------------------------
00FB  90 88 01                          MOV    DPTR,#PORTA                 ;Check for stucked sensrs.
00FE  E0                                MOVX   A,@DPTR
00FF  44 38                             ORL    A,#00111000B
0101  B4 FF 02  ..R.                    CJNE   A,#0FFH,STUCKED
```

```
0104  80 04      .R..                     SJMP   ENBLE_OPTO          ;Enable optics if all off.
0106  D2 3C      .R..   STUCKED:          SETB   BADSENS_FLG         ;Set status bit for 'sensr fail'.
0108  21 1F      .C..                     AJMP   FAIL_INITZ
010A  7C EF             ENBLE_OPTO:       MOV    R4,#11101111B       ;Enable system optical sensors.
010C  91 94      .C..                     ACALL  ON_BIT

                        ;----------------------------------------
                        ;       FIND MAIN DRIVE SHAFT HOME
                        ;----------------------------------------
010F  12 05 05   ..C.                     LCALL  HOME_CHK            ;Read base home sensr.
0111  60 06      .R..                     JZ     ALIGNED             ;Not home if not 0.
0113  12 04 ED   ..C.                     LCALL  HOME_SRCH           ;Initialize main drv shaft home.
0116  10 3B 06   .RR.                     JBC    STAT_FLG,FAIL_INITZ
0119  F5 30      .D..   ALIGNED:          MOV    BASE_INDEX,A        ;Reset base index regs.
011B  F5 31      .D..                     MOV    BASE_INDEX+1,A
011D  21 23      .C..                     AJMP   EX_INITZLOAD

                        ;-------------------------------------
                        ;       INITIALIZATION FAILURE
                        ;-------------------------------------
011F  D2 47      .R..   FAIL_INITZ:       SETB   INITZERR_FLG        ;Tell of initial'n failure.
0121  41 03      .C..                     AJMP   JFATAL              ;Proceed to Fatal Loop.
0123                    EX_INITZLOAD      EQU    $
                        $INCLUDE(MAINLINE,DMS)
                        ;*************************************
                        ;*****     IDLE CONTROL LOOP    *****
                        ;*************************************
                        ;The program loops here when not executing
                        ;any command; polls the control flags, the
                        ;communication line, the SDK keyboard, the
                        ;machine's optical sensors and switches.
                        ;True state triggers a task/ or a command.
                        ;One loop pass is equal to the servo sampling
                        ;interval, hence, steady-state dcmotor shaft
                        ;posn is always maintained.
                        ;R3 (RB0) is used as loop monitor for coarse,
                        ;long time durations, seconds, +/-.255sec, ie.,
                        ;timeout in waiting for an event to occur.
                        ;-------------------------------------------
0123  7B 00             IDLE_LOOP:        MOV    R3,#00       ;Clr 256ms-interval counter.
0125  C2 B4      .R..   MON_LOOP:         CLR    P3.4         ;Entry point for loop monitor.
0127  75 3A 01   .D..                     MOV    CYC_CTR,#01  ;Clr busy line and reset cmnd
                                                                ;repeater counter.
                        ;-------------------------------------------
                        ;       POLL CONTROL FLAGS AND INPUTS
                        ;-------------------------------------------
012A  10 3B 02   .RR.   CHK_STAT:         JBC    STAT_FLG,$+5   ;STAT_FLG =1 change of status occured;
012D  80 02      .R..                     SJMP   CHK_DMSG        ;transmit status registers to
012F  21 B6      .C..                     AJMP   JXMIT           ;main control module.
0131  10 0E 02   .RR.   CHK_DMSG:         JBC    DMSG_FLG,$+5   ;DMSG_FLG =1 message received while
0134  80 02      .R..                     SJMP   CHK_TMSG        ;executing the previous task;
0136  21 D5      .C..                     AJMP   GET_CMND        ;get message and execute command.
0138  91 60      .C..   CHK_TMSG:         ACALL  CHKIMSG         ;Check for incoming msg from channels.
013A  50 02      .R..                     JNC    CHK_TRIP        ;C =1 get msg and execute cmnd.
013C  21 A3      .C..                     AJMP   JRECVMSG
013E  20 0D 59   .RR.   CHK_TRIP:         JB     TR2_FLG,TRIP_RDY ;TR2_FLG =1 valid trip sequence
                                                                   ;detected while in last trip cycle.
                        ;-------------------------------------------------
                        ;       MAINTAIN SERVO STEADY-STATE POSITION
                        ;-------------------------------------------------
0141  12 08 02   ..C.   STEADY_STATE:     LCALL  UPDTE_SERVO      ;Updte srvo cntrl; track realtime eve
0144  20 3D 26   .RR.                     JB     TRIPEN_FLG,TRIP_ON    ;=1 trip logic is enabled.
                                                                       ;=0 trip logic is disabled.
                        ;-----------------------------------------
                        ;       TRIP LOGIC IS DISABLED
                        ;-----------------------------------------
0147  74 FF                               MOV    A,#0FFH          ;Keep stepper motor off.
0149  B1 14      .C..                     ACALL  OUT_STEP
014B  E5 18      .D..                     MOV    A,CMND           ;Check if cmnd = Seal-Only.
014D  B4 47 02   ..R.                     CJNE   A,#47H,NOTSEAL   ;If true, same logic as Trip-On
0150  80 18      .R..                     SJMP   TRIP_ON            ;but drum trip is ignored.
0152  70 05      .R..   NOTSEAL:          JNZ    IDLE_MODE        ;If cmnd = 00, wait 20sec for the cntrl
0154  BB 4E CF   ..R.                     CJNE   R3,#78,MON_LOOP  ;module to indicate its presence.
0157  41 03      .C..                     AJMP   JFATAL             ;Disable system if it timed out.
0159  74 02             IDLE_MODE:        MOV    A,#00000010B     ;Drive unit is idling; no task to do.
015B  91 8B      .C..                     ACALL  OFF_SOL          ;Insure inker solenoid is off.
015D  91 C4      .C..                     ACALL  PEEK_STAT        ;Monitor sensrs/swtchs for any change.
015F  BB 1B 04   ..R.                     CJNE   R3,#27,CHK_DRV   ;Check if there is power on motor.
0162  D2 3E      .R..                     SETB   DCMBND_FLG       ;There should be no restraining force
0164  41 03      .C..                     AJMP   JFATAL            ;on motor shaft, hence, servo output
0166  12 05 0F   ..C.   CHK_DRV:          CALL   CHKZDC            ;must be zero. Do not allow this condi-
0169  60 B8      .R..                     JZ     IDLE_LOOP         ;for a long period of time, else, con-
016B  21 25      .C..   JMONLOOP:         AJMP   MON_LOOP          ;sider condition a dc motor bind error.

                        ;----------------------------------------
                        ;       TRIP LOGIC IS ENABLED
                        ;----------------------------------------
016D  10 0D 2A   .RR.   TRIP_ON:          JBC    TR2_FLG,TRIP_RDY   ;=1 trip detect sequence OK; =0 false
0170  30 0C 05   .RR.                     JNB    TR1_FLG,CHK_PATH   ;=1 start trip detect; =0 false
0173  20 41 0F   .RR.                     JB     BADFEED_FLG,BAD_FEED  ;=1 bad feed detected; =0 false
0176  21 23      .C..                     AJMP   IDLE_LOOP
                                                                ;R4 holds sensrs reading from UPDTE.

019A  30 3D 07   .RR.   TRIP_RDY:         JNB    TRIPEN_FLG,IGNORE_TRIP  ;TRIPEN_FLG =1 rotate drum.
019D  41 4D      .C..                     AJMP   PRNT_MAIL

                        ;----------------------------------------------------
                        ;       EXTERNAL MESSAGE IS TO BE RECEIVED
                        ;----------------------------------------------------
01A3  D2 B4      .R..   JRECVMSG:         SETB   P3.4                ;Set busy signal.
01A5  12 0A 14   ..C.                     LCALL  RECV_MSG            ;Receive message from source.
01A8  10 3B 02   .RR.                     JBC    STAT_FLG,IGNORE_MSG ;Ignore msg if error, else
01AB  21 D5      .C..                     AJMP   GET_CMND            ;Get command.
01AD  30 3D 91   .RR.   IGNORE_MSG:       JNB    TRIPEN_FLG,STEADY_STATE ;Loop idle if trip not enabled;
01B0  C2 0D      .R..   DISABLE_TRIP:     CLR    TR2_FLG             ;Disable trip if enabled.
01B2  91 40      .C..                     ACALL  STOP_XPORT
01B4  21 23      .C..   EX_IGNORE:        AJMP   IDLE_LOOP

                        ;------------------------------------------------------------
                        ;       A CHANGE OF STATUS IS TO BE TRANSMITTED
                        ;------------------------------------------------------------
```

```
0186  91 48       .C..   JXMIT:         ACALL  CHK_RECV             ;Check for incoming msg before xmit.
0188  12 09 7C    ..C.                  LCALL  XMIT_STAT            ;Transmit status to Control module.
018B  30 3A 45    .BR.                  JNB    SYS_ENABLE,JFATAL    ;Check if status is fatal (syst. disabled)
01BE  21 23       .C..                  AJMP   IDLE_LOOP            ;If there is comm err, status will be
                                                                    ;retransmitted, ie., STAT_FLG still 1.
                         ;--------------------------------------------
                         ;      COMMAND EXECUTION IS COMPLETED
                         ;--------------------------------------------
01C0  20 3B 0D    .BR.   CMND_COMPLETE: JB     STAT_FLG,EXRET             ;Error?
01C3  91 48       .C..                  ACALL  CHK_RECV
01C5  20 0E 03    .BR.                  JB     DMSG_FLG,RETURN_IDLE       ;Repeat cmnd if no msg queued.
01C8  D5 3A 0F    .DR.                  DJNZ   CYC_CTR,REPEAT             ;Command to be repeated?
01CB  12 09 97    ..C.   RETURN_IDLE:   LCALL  XMIT_CMNDC                 ;Status will be omitted if comm err
01CE  C2 3B       .B..                  CLR    STAT_FLG
01D0  20 41 DD    .BR.   EXRET:         JB     BADFEED_FLG,DISABLE_TRIP ;Insure transport is stopped if true
01D3  21 23       .C..                  AJMP   IDLE_LOOP                  ;Else, terminate cmnd execution.
                         ;-------------------------------------------
                         ;      COMMAND VECTORS FROM MESSAGE
                         ;-------------------------------------------
01D5  A2 13       .B..   GET_CMND:      MOV    C,CMNDSRC_FLG              ;Indicate source of command.
01D7  92 16       .B..                  MOV    RECVFR_FLG,C
01D9  D2 B4       .B..   REPEAT:        SETB   P3.4                       ;Set busy signal.
01DB  E5 18       .D..                  MOV    A,CMND                     ;Get command.
01DD  90 01 E5    ..C.   EXEC_CMND:     MOV    DPTR,#CMND_TAB             ;Load start of table.
01E0  54 0F                             ANL    A,#0FH                     ;Mask upper nibble.
01E2  C3                                CLR    C
01E3  33                                RLC    A                          ;Multiply by 2.
01E4  73                                JMP    @A+DPTR     ;SDK-51 key    ;Look-up jump table.
01E5  21 B6       .C..   CMND_TAB:      AJMP   REQ_STAT         ;P        ;Status request.
01B6                     REQ_STAT       EQU    JXMIT
01E7  21 23       .C..                  AJMP   IDLE_LOOP        ;A
01E9  21 BD       .C..                  AJMP   DISABLE_TRIP     ;B        ;Disable trip logic.
01EB  41 3D       .C..                  AJMP   ENABLE_TRIP      ;C        ;Enable trip logic.
01ED  21 23       .C..                  AJMP   IDLE_LOOP        ;D
01EF  21 23       .C..                  AJMP   IDLE_LOOP        ;E
01F1  21 23       .C..                  AJMP   IDLE_LOOP        ;F
01F3  41 4B       .C..                  AJMP   SEAL             ;G        ;Turn on the AC motor only.
01F5  21 23       .C..                  AJMP   IDLE_LOOP        ;H
01F7  21 23       .C..                  AJMP   IDLE_LOOP        ;I
01F9  21 23       .C..                  AJMP   IDLE_LOOP        ;J
01FB  41 4D       .C..                  AJMP   PRNT_MAIL        ;K        ;Print on mail.
01FD  21 23       .C..                  AJMP   IDLE_LOOP        ;L
01FF  21 23       .C..                  AJMP   IDLE_LOOP        ;M
0201  21 23       .C..                  AJMP   IDLE_LOOP        ;N
0203                     JFATAL         EQU    $                ;O        ;Disable system.
                         ;---------------------------------------------
                         ;                  FATAL ERROR TRAP
                         ;---------------------------------------------
0203  C2 AB       .B..                  CLR    IE.3               ;Disable T1 interrupt.
0205  C2 3A       .B..                  CLR    SYS_ENABLE         ;Disable system.
0207  D2 A8       .B..                  SETB   IE.0               ;Insure EX0 is enabled.
0209  74 0F                             MOV    A,#0FH
020B  F5 90       .D..                  MOV    P1,A               ;Turn off dcmotors drive.
020D  91 8B       .C..                  ACALL  OFF_SOL            ;         : solenoids drive.
020F  12 E0 0F                          LCALL  CLRDSP                        ;System disable.
0212  7A 02       .C..                  MOV    R2,#HIGH(STRING)                 ;Display ERROR #status bytes.
0214  7B 39       .C..                  MOV    R3,#LOW(STRING)
0216  12 E0 1F                          LCALL  DSPMSG
0219  AA 28       .D..                  MOV    R2,MSG2_STAT
021B  AB 27       .D..                  MOV    R3,MSG1_STAT
021D  12 E0 18                          LCALL  DSP2BY
0220  B2 B4       .B..   FATAL_LOOP:    CPL    P3.4                          ;Toggle system status LED.
0222  20 46 0C    .BR.   LOOPIMS:       JB     BADCOM_FLG,JLOOP
0225  91 60       .C..                  ACALL  CHKIMSG
0227  50 08       .R..                  JNC    JLOOP
0229  12 0A 14    ..C.                  CALL   RECV_MSG
022C  DC FE       .R..                  DJNZ   R4,$
022E  12 09 7C    ..C.                  CALL   XMIT_STAT
0231  DC FE       .R..   JLOOP:         DJNZ   R4,$
0233  DC FE       .R..                  DJNZ   R4,$
0235  DA FB       .R..                  DJNZ   R2,LOOPIMS
0237  80 E7       .R..                  SJMP   FATAL_LOOP                    ;Loop forever.

0239  03 45 3D 20        STRING:        DB     3,'E= '
                         ;*******************************************************
                         ;*******                                        ; *******
                         ;*******************************************************
                         ;Status Registers is used to pass status information from
                         ;module-to-module (or sub-routines).
                         ;       STAT_FLG =0 if no change in status
                         ;                =1 if there is a change in status
                         ;       and corresponding change information bit(s).
                         ;Tasks which are required to transmit a Cmnd-Complete
                         ;to the meter module pass thru CMND_COMPLETE before
                         ;terminating, else, task terminates directly to IDLE_LOOP.
                         ;----------------------------------------------------------

                         ;****************************************************
                         ;                  ENABLE TRIP LOGIC
                         ;****************************************************
023D  43 27 28    .D..   ENABLE_TRIP:   ORL    MSG1_STAT,#00101000B   ;Tell trip logic is enabled.
0240  53 28 F9    .D..   RUN_XPORT:     ANL    MSG2_STAT,#11111001B
0243  74 FB                             MOV    A,#11111011B            ;Turn on AC motor.
0245  91 87       .C..                  ACALL  ON_SOL
0247  91 34       .C..                  ACALL  START_SERVO     ;Reset real-timekeeping registers.
0249  21 23       .C..   EX_ONXPORT:    AJMP   IDLE_LOOP


                         ;*******************************************************
                         ;                  PRINT_ON_MAIL CYCLE
                         ;*******************************************************
                         ;Compute time delay before start of drum print motion.
                         ;-------------------------------------------------------
0265  CC                                XCH    A,R4
0266  C3                                CLR    C
```

```
0267  9C                          SUBB   A,R4              ;Remainder =time delay before start
0268  60 12       .R..            JZ     DRV_DRUM          ;of drum print cycle.
026A  50 0D       .R..            JNC    LOAD_DELAY        ;C =0 positive valid letters gap.
026C  C2 0C       .B..            CLR    TRI_FLG           ;Streamfeed error!
026E  D2 42       .B..            SETB   STRMF_FLG         ;C =1 negative gap too close.
0270  05 29       .D..            INC    MISTRIP_CTR       ;Not enough time for complete cycle
0272  24 D2                       ADD    A,#210            ;2's cpl add'n.
0274  FE                          MOV    R6,A              ;Pad in delay to complete cycle.
0275  91 81       .C..            ACALL  DELAY_LOOP
0277  21 23       .C..  NO_PRINT:  AJMP   IDLE_LOOP         ;Skip print on passing mail.

0279  FE                LOAD_DELAY: MOV  R6,A
027A  91 81       .C..            ACALL  DELAY_LOOP
027C  51 80       .C..  DRV_DRUM:  ACALL  MOVE_DRUM         ;Print on mail.
027E  21 C0       .C..  EX_MAIL:   AJMP   CMMD_COMPLETE
                        $INCLUDE(MOTION.DAS)
                        ;         ***************************************************
                        ;         *******      MOTION CONTROL CALL ROUTINES      *********
                        ;         ***************************************************

                        ;************************************
                        ;       ROTATE PRINT DRUM
                        ;************************************
0280  C2 07       .B..  MOVE_DRUM: CLR    DCMOTR_FLG
0282  51 B6       .C..            ACALL  DRUM_MOVE
0284  20 3B 08    .BR.            JB     STAT_FLG,EX_DRUM
0287  05 45       .D..            INC    TRIP_CTR                    ;Count no. of drum trips.
0289  E5 45       .D..            MOV    A,TRIP_CTR
028B  70 02       .R..            JNZ    EX_DRUM
028D  05 46       .D..            INC    TRIP_CTR+1
028F  22                EX_DRUM:   RET

                        ;****************************************
                        ;       MOVE TO DRIVE HOME POSITION
                        ;****************************************
0290  90 05 00          BHOME_MOVE: MOV  DPTR,#BASE_1REV/2
0293  78 30       .D..            MOV    R0,#BASE_INDEX
0295  C3                          CLR    C                 ;Move load to absolute home posn.
0296  E5 82       .D..            MOV    A,DPL             ;Compute distance from current posn
0298  96                          SUBB   A,@R0                 ;to home posn.
0299  FC                          MOV    R4,A              ;Result is displacement
029A  E5 83       .D..            MOV    A,DPH                 ;to be travelled
029C  08                          INC    R0                    ;and direction of motion.
029D  96                          SUBB   A,@R0
029E  86 3C       .D..            MOV    TOTAL_CNT+1,@R0
02A0  18                          DEC    R0
02A1  86 3B       .D..            MOV    TOTAL_CNT,@R0
02A3  D2 07       .B..            SETB   DCMOTR_FLG
02A5  30 E7 0C    .BR.            JNB    ACC.7,EX_HOMOVE
02A8  CC                          XCH    A,R4
02A9  25 82       .D..            ADD    A,DPL
02AB  F5 3B       .D..            MOV    TOTAL_CNT,A
02AD  EC                          MOV    A,R4
02AE  35 83       .D..            ADDC   A,DPH
02B0  F5 3C       .D..            MOV    TOTAL_CNT+1,A
02B2  C2 07       .B..            CLR    DCMOTR_FLG
02B4  61 06       .C..  EX_HOMOVE: AJMP   BPOSN_MOVE
                        ;**********************************************************
                        ;                   MOTION PROFILE REQUIREMENTS
                        ;**********************************************************
                        ;The caller has to supply the following variables.
                        ;---------------------------------------------------
                        ;1. ACCELK = acceleration constant (counts/ms^2)
                        ;2. DECCELK =  decceleration constant (counts/ms^2)
                        ;3. SLEWK  = running velocity constant (counts/ms)
                        ;4. TOTAL_CNT = total distance to be traversed (counts)
                        ;5. CONT_FLG = incremental or continuous motion
                        ;6. PROF_FLG = profile or position-only (point-to-point) control.
                        ;7. LIM_ERR = max error count before calling a fault condition.
                        ;--------------------------------------------------------------------

02B6  75 3B 00    .D..  DRUM_MOVE: MOV    TOTAL_CNT,#LOW(BASE_1REV)  ;Specifies drum rotation
02B9  75 3C 0A    .D..            MOV    TOTAL_CNT+1,#HIGH(BASE_1REV) ;velocity profile and
02BC  75 3D 79    .D..            MOV    ACCELK,#ACCD                   ;type of control.
02BF  75 41 AE    .D..            MOV    DECCELK,#DECCD
02C2  75 3E 11    .D..            MOV    SLEWK,#RUND
02C5  85 49 39    .DD.            MOV    DECCEL_INT,DRUM_DECCEL
02C8  85 4A 37    .DD.            MOV    ACCEL_CNT,DRUM_DECCEL+1
02CB  75 38 00    .D..            MOV    ACCEL_CNT+1,#00
02CE  D2 0A       .B..            SETB   PROF_FLG
02D0  75 42 3F    .D..            MOV    PLIM_ERR,#HARDEST
02D3  75 43 C1    .D..            MOV    NLIM_ERR,#(-HARDEST)
02D6  61 14       .C..            AJMP   START_MOTION

02D8  E4                HUNT_MOVE: CLR    A                 ;Search for a home position signal.
02D9  F5 3C       .D..            MOV    TOTAL_CNT+1,A
02DB  F5 3A       .D..            MOV    CYC_CTR,A          ;Will stop in SRCH_CNT once home
02DD  75 3B 06    .D..            MOV    TOTAL_CNT,#SRCH_CNT  ;the home posn signal is seen.
02E0  D2 11       .B..            SETB   CONT_FLG                ;Run continuously
02E2  D2 0F       .B..            SETB   HOME_FLG                ;Tell sampling handler to
02E4  75 42 06    .D..            MOV    PLIM_ERR,#(SRCH_CNT)        ;look for the signal.
02E7  75 43 FA    .D..            MOV    NLIM_ERR,#(-SRCH_CNT)
02EA  80 0C       .R..            SJMP   HUNT2

02EC  75 3B FF    .D..  ENDSTOP_MOVE: MOV TOTAL_CNT,#0FFH    ;Move towards an endstop.
02EF  75 3C FF    .D..            MOV    TOTAL_CNT+1,#0FFH  ;Load max 16 bit count.

02F2  75 42 04    .D..  INITZ_MOVE: MOV   PLIM_ERR,#SOFTERR        ;Lowest error limit for
02F5  75 43 FC    .D..            MOV    NLIM_ERR,#(-SOFTERR)     ;soft collision at endstop.
02F8  75 3E 01    .D..  HUNT2:     MOV    SLEWK,#INITZ_SPEED       ;Slow speed= 1 cnt/sample.
02FB  75 3D 59    .D..            MOV    ACCELK,#INITZ_ACCEL
02FE  80 12       .R..            SJMP   TRAPZPROF
0300  75 3B 00    .D..  ONEREV_MOVE: MOV  TOTAL_CNT,#LOW(BASE_1REV)   ;One rotation move
0303  75 3C 0A    .D..            MOV    TOTAL_CNT+1,#HIGH(BASE_1REV) ;at base drv shaft.
0306  75 3D 88    .D..  BPOSN_MOVE: MOV   ACCELK,#BACCT       ;Base point-to-point drive.
0309  75 3E 1A    .D..            MOV    SLEWK,#BMAX_RUN
030C  75 42 30    .D..  BPOSN2:    MOV    PLIM_ERR,#HARDER    ;Load max. error count limit
030F  75 43 D0    .D..            MOV    NLIM_ERR,#(-HARDER) ;(harder stop).
```

```
                                ;---------------------------------------------
                                ;       INITIALIZE MOTION CONTROL LOOP
                                ;               HOUSEKEEPING
                                ;---------------------------------------------
0312  91 A2       .C..    TRAPZPROF:    ACALL  COMP_PROF       ;Compute a trapezoidal motion profile.
0314  E4                  START_MOTION: CLR    A
0315  FD                                MOV    R5,A
0316  F5 2E       .D..                  MOV    POSN_ACC,A      ;Clear position accumulator.
0318  F5 2F       .D..                  MOV    POSN_ACC+1,A
031A  04                                INC    A
031B  FF                                MOV    R7,A            ;Initialize accel/deccel/settl timer.
031C  74 05                             MOV    A,#05                ;Check for size of displacement.
031E  B5 3B 01    .DR.                  CJNE   A,TOTAL_CNT,$+4       ;5 counts or less= single step
0321  C3                                CLR    C                     ; by 1 count/sample.
0322  40 11       .R..                  JC     PROCEED               ;Else, proceed with trapz profile
0324  E4                                CLR    A
0325  B5 3C 0D    .DR.                  CJNE   A,TOTAL_CNT+1,PROCEED
0328  B5 3B 01    .DR.                  CJNE   A,TOTAL_CNT,LESS5     ;Check for non-zero displacement.
032B  22                                RET                          ;No motion required if zero.
032C  D2 10       .B..    LESS5:        SETB   SMALL_FLG
032E  C2 08       .B..                  CLR    RUN_FLG
0330  75 32 01    .D..                  MOV    RUN_SPEED,#01
0333  80 06       .R..                  SJMP   DCMLOOP
0335  D2 08       .B..    PROCEED:      SETB   RUN_FLG
0337  C2 10       .B..                  CLR    SMALL_FLG
0339  D2 17       .B..                  SETB   DCMOVE_FLG            ;Start of dcmotor motion.
                                ;*********************************************
                                ;*******   DC MOTOR MOTION CONTROL LOOP   *******
                                ;*********************************************
                                ;Loops here during dc motor servo control of a
                                ;desired motion profile.
                                ;RUN_FLG and ACCEL_FLG are modified to reflect
                                ;a trapezoidal motion profile.
                                ;Output decision is used at the next sampling
                                ;instant generation of the target trajectory.
                                ;---------------------------------------------
033B  12 08 02    ..C.    DCMLOOP:      LCALL  UPDTE_SERVO          ;Update servo control.
033E  E5 2A       .D..                  MOV    A,ERR_CNT
0340  20 E7 08    .BR.                  JB     ACC.7,CNT_NEG        ;ACC.7 =1 neg cnt;no 0=pos.
0343  B5 42 01    .DR.    CNT_POS:      CJNE   A,PLIM_ERR,$+4       ;Check if error count is within
0346  D3                                SETB   C                    ;allowable limit = abs(HARDERR)
0347  50 08       .R..                  JNC    FAULT
0349  61 79       .C..                  AJMP   COMP_TIMING
034B  B5 43 01    .DR.    CNT_NEG:      CJNE   A,NLIM_ERR,$+4
034E  C3                                CLR    C
034F  50 28       .R..                  JNC    COMP_TIMING

                                ;---------------------------------------------------------
                                ;                DC MOTOR CONTROL LOOP EXIT
                                ;---------------------------------------------------------
0351  30 0A 04    .BR.    FAULT:        JNB    PROF_FLG,SHUTOFF      ;Do not shut off if drum drv.
0354  D2 3B       .B..                  SETB   STAT_FLG              ;Just indicate fault to caller.
0356  80 21       .R..                  SJMP   COMP_TIMING           ;Proceed as usual.
0358  C2 3A       .B..    SHUTOFF:      CLR    SYS_ENABLE            ;DC motor move error.
035A  43 27 48    .D..                  ORL    MSG1_STAT,#01001000B  ;Set error flags and
035D  43 90 03    .D..                  ORL    P1,#00000011B         ;and turn off motor drive.
0360  75 32 00    .D..    END_OF_MOTION: MOV   RUN_SPEED,#00         ;Insure that before exit,
0363  C2 08       .B..                  CLR    RUN_FLG               ;motion is in constant vel
0365  C2 09       .B..                  CLR    ACCEL_FLG             ;mode with speed = 0 (stop).
0367  20 3B 0C    .BR.                  JB     STAT_FLG,EX_DCMLOOP
036A  20 97 07    .BR.                  JB     P1.7,LONG_SETTLE      ;Select settling time delay.
036D  20 0B 04    .BR.                  JB     INITZ_FLG,LONG_SETTLE  ;Longer Ts when in base
0370  91 6F       .C..                  ACALL  DEL05MS                ;drive and/or initz'n mode.
0372  80 02       .R..                  SJMP   EX_DCMLOOP
0374  91 73       .C..    LONG_SETTLE:  ACALL  DEL20MS
0376  C2 17       .B..    EX_DCMLOOP:   CLR    DCMOVE_FLG            ;End of dcmotor motion.
0378  22                                RET
                                ;*********************************************
                                ;       TRAPEZOIDAL MOTION PROFILE
                                ;               HOUSEKEEPING
                                ;*********************************************
                                ;Decides whether the motion is in accel phase,
                                ;constant velocity phase, deccel phase, or in
                                ;settling phase based on the motion specs and
                                ;control mode inputs.
                                ;Insure the motion stops at final position count.
                                ;Uses the following registers and control flags:
                                ;TOTAL_CNT  =desired total displacement count
                                ;POSN_ACC   =accumulated displacement count wrt time
                                ;ACCEL_CNT  =POSN_ACC value when in accel phase.
                                ;RUN_SPEED  =computed target speed last sampling instant
                                ;VEL_OFFS   =offset count to insure total displ. = desired.
                                ;ACCELK     =desired accel rate
                                ;SLEWK      =desired slew rate (running speed)
                                ;DECCELK    =desired deccel rate
                                ;CYC_CTR    =desired displacement multiplier.
                                ;RUN_FLG    =0 constant velocity phase; 1 accel/deccel
                                ;ACCEL_FLG  =0 accel phase; 1 deccel phase
                                ;PROF_FLG   =0 accel rate = deccel rate; 1 not equal
                                ;CONT_FLG   =0 start-stop mode; 1 continuous run mode
                                ;SMALL_FLG  =0 TOTAL_CNT > 5; 1 not > 5.
                                ;R7 and R5 (RB0) as a 16-bit register for
                                ;keeping track of accel/deccel time interval.
                                ;Modifies RUN_FLG, ACCEL_FLG ,R7, R5 for next sampling
                                ;instant generation of the target position count.
                                ;---------------------------------------------

0379  20 08 02    .BR.    COMP_TIMING:  JB     RUN_FLG,NOTCV         ;Examine last sampling
037C  61 B0       .C..                  AJMP   CONST_VEL             ;instant's motion phase,
037E  30 09 02    .BR.    NOTCV:        JNB    ACCEL_FLG,ACCEL_VEL   ;ie.,const velocity? accel?
0381  81 18       .C..                  AJMP   DECCEL_VEL            ;deccel phase?
                                ;---------------------------------------------
                                ;               ACCELERATION PHASE
                                ;---------------------------------------------
0383  20 0A 0B    .BR.    ACCEL_VEL:    JB     PROF_FLG,CHK_SPEEDLIM ;Motion in accel mode IF
0386  C3                                CLR    C                     ;POSN_ACC < TOTAL_CNT/4
0387  E5 2E       .D..                  MOV    A,POSN_ACC            ;OR RUN_SPEED < SLEWK
0389  95 37       .D..                  SUBB   A,ACCEL_CNT           ;ELSE motion in constant vel mode.
038B  E5 2F       .D..                  MOV    A,POSN_ACC+1
038D  95 38       .D..                  SUBB   A,ACCEL_CNT+1
038F  50 0E       .R..                  JNC    END_ACCEL             ;Check SGN( POSN-ACCEL ).
```

```
0391  E5 32      .D..   CHK_SPEEDLIM:  MOV   A,RUN_SPEED          ;If not end of accel, is com-
0393  B5 3E 02   .DR.                  CJNE  A,SUPAK,$+5          ;puted speed = target running
0396  80 07      .R..                  SJMP  END_ACCEL            ;speed? End of accel if it is.
0398  0F                               INC   R7                   ;Else, increment accel/deccel
0399  BF 00 01   ..R.                  CJNE  R7,#00,$+4           ;timekeeping regs R7, R5.
039C  0D                               INC   R5
039D  81 29      .C..                  AJMP  EXIT_TIMING
039F  30 0A 04   .BR.   END_ACCEL:     JNB   PROF_FLG,$+7         ;If end of accel, if accel not
03A2  AF 39      .D..                  MOV   R7,DECCEL_INT        ;= deccel (PROF_FLG set), preset
03A4  80 06      .R..                  SJMP  $+8                  ;R7 with deccel interval; else,
03A6  85 2E 37   .DD.                  MOV   ACCEL_CNT,POSN_ACC   ;save current posn cnt, ie.,
03A9  85 2F 38   .DD.                  MOV   ACCEL_CNT+1,POSN_ACC+1 ;accel displacement.
03AC  C2 08      .B..                  CLR   RUN_FLG              ;Indicate motion is in
03AE  81 29      .C..                  AJMP  EXIT_TIMING          ;'constant velocity phase'.
                                ;-----------------------------------------------------------
                                ;                   CONSTANT VELOCITY PHASE
                                ;-----------------------------------------------------------
03B0  C3                CONST_VEL:     CLR   C              ;Motion in constant vel mode IF
03B1  E5 3B      .D..                  MOV   A,TOTAL_CNT    ;TOTAL_CNT - POSN_ACC - ACCEL_CNT - RUN_SP
03B3  95 2E      .D..                  SUBB  A,POSN_ACC     ;result is > 0 OR CONT_FLG is set.
03B5  30 10 04   .BR.                  JNB   SMALL_FLG,GT5  ;ELSE motion in deccel mode.
03B8  60 30      .R..                  JZ    END_CONST      ;(When SMALL_FLG is set, ie., target
03BA  81 29      .C..                  AJMP  EXIT_TIMING    ;displacement <= 5 cnts, profile is
03BC  F5 F0      .D..   GT5:           MOV   B,A            ;always constant velocity.)
03BE  E5 3C      .D..                  MOV   A,TOTAL_CNT+1
03C0  95 2F      .D..                  SUBB  A,POSN_ACC+1
03C2  C5 F0      .D..                  XCH   A,B            ;Result (TOTAL-POSN) lo =A ; hi =B.
03C4  50 0A      .R..                  JNC   CNTINUE        ;If SGN(TOTAL-POSN) negative;
03C6  12 09 71   ..C.                  CALL  TWOS_CPL       ;displacement, must be in continuous
03C9  F5 2E      .D..                  MOV   POSN_ACC,A     ;mode. Get absolute count to correct
03CB  85 F0 2F   .DD.                  MOV   POSN_ACC+1,B   ;position registers.
03CF  81 29      .C..                  AJMP  EXIT_TIMING
03D0  95 37      .D..   CNTINUE:       SUBB  A,ACCEL_CNT    ;If SGN positive, result - ACCEL_CNT
03D2  F5 33      .D..                  MOV   VEL_OFFS,A     ;Save difference (= offset velocity if
03D4  E5 F0      .D..                  MOV   A,B            ;difference =< RUN_SPEED)
03D6  95 38      .D..                  SUBB  A,ACCEL_CNT+1
03D8  FC                               MOV   R4,A           ;Difference lo =VEL_OFFSET; hi =R4.
03D9  C3                               CLR   C
03DA  E5 33      .D..                  MOV   A,VEL_OFFS     ;Result = Difference - RUN_SPEED
03DC  95 32      .D..                  SUBB  A,RUN_SPEED    ;lo =R4 ; hi =Acc.
03DE  CC                               XCH   A,R4
03DF  94 00                            SUBB  A,#00
03E1  40 07      .R..                  JC    END_CONST      ;End of const vel phase if negative
03E3  C2 12      .B..                  CLR   SKIP_FLG       ;or zero result.
03E5  70 42      .R..                  JNZ   EXIT_TIMING
03E7  BC 00 3F   ..R.                  CJNE  R4,#00,EXIT_TIMING
                                ;-----------------------------------------------------
                                ;        CONTINUOUS RUN MODE OR START-STOP?
                                ;-----------------------------------------------------
03EA  30 11 1B   .BR.   END_CONST:     JNB   CONT_FLG,STOP_MOTION   ;CONT_FLG =0 start-stop mode,
03ED  20 12 0F   .BR.                  JB    SKIP_FLG,CHKSMALL      ;         =1 continuous run.
03F0  D2 12      .B..                  SETB  SKIP_FLG               ;0 to 1 transition of SKIP_FLG
03F2  91 BD      .C..                  ACALL CHKKBD                 ;indicates start of deccel phase.
03F4  40 03      .R..                  JC    RST_CYCTR              ;Motion to be stopped if in
03F6  D5 3A 05   .DR.                  DJNZ  CYC_CTR,CHKSMALL       ;continuous run mode?
03F9  75 3A 01   .D..   RST_CYCTR:     MOV   CYC_CTR,#01            ;Reset cycle counter.
03FC  80 0A      .R..                  SJMP  STOP_MOTION
03FE  30 10 28   .BR.   CHKSMALL:      JNB   SMALL_FLG,EXIT_TIMING
0401  E4                               CLR   A                      ;Reset POSN if in continuous
0402  F5 2E      .D..                  MOV   POSN_ACC,A             ;run mode and SMALL_FLG set,
0404  F5 2F      .D..                  MOV   POSN_ACC+1,A           ;ie., TOTAL <=5.
0406  81 29      .C..                  AJMP  EXIT_TIMING
0408  C2 11      .B..   STOP_MOTION:   CLR   CONT_FLG               ;Yes, motion is to be stopped.
040A  20 10 17   .BR.                  JB    SMALL_FLG,DECR         ;No deccel phase if SMALL_FLG
040D  D2 12      .B..                  SETB  SKIP_FLG               ;is set.
040F  D2 08      .B..                  SETB  RUN_FLG                ;Indicate deccel phase.
0411  D2 09      .B..                  SETB  ACCEL_FLG
0413  85 41 3D   .DD.                  MOV   ACCELK,DECCELK         ;Load deccel rate.
0416  81 29      .C..                  AJMP  EXIT_TIMING
                                ;-----------------------------------------------------
                                ;                 DECCELERATION PHASE
                                ;-----------------------------------------------------
0418  30 12 09   .BR.   DECCEL_VEL:    JNB   SKIP_FLG,DECR   ;Motion in deccel mode IF
041B  E5 33      .D..                  MOV   A,VEL_OFFS      ;R7 is > 0 ELSE motion is stopped.
041D  B5 32 04   .DR.                  CJNE  A,RUN_SPEED,DECR  ;Adjust with offset velocity to
0420  C2 12      .B..                  CLR   SKIP_FLG          ;arrive at exact target count
0422  80 05      .R..                  SJMP  EXIT_TIMING       ;displacement.
0424  1F                DECR:          DEC   R7              ;Decrement accel/deccel timekeeping
0425  BF FF 01   ..R.                  CJNE  R7,#0FFH,EXIT_TIMING  ;registers.
0428  1D                               DEC   R5
                                ;-----------------------------------------------
                                ;                 END OF MOTION?
                                ;-----------------------------------------------
0429  BF 00 05   ..R.   EXIT_TIMING:   CJNE  R7,#00,CHKFLG   ;R7 =R5 =0 end of cycle.
042C  BD 00 02   ..R.                  CJNE  R5,#00,CHKFLG
042F  61 60      .C..                  AJMP  END_OF_MOTION
0431  00                CHKFLG:        NOP
0432  61 3B      .C..                  AJMP  DCMLOOP
                        $INCLUDE(MAINSUB.DMS)
                        ;             ************************************************
                        ;             **********    MAIN CALL ROUTINES   ***********
                        ;             ************************************************

                        ;************************************************ .
                        ;        START DCMOTOR SERVO CONTROL
                        ;**********************************************
0434  75 8B 06   .D..   START_SERVO:   MOV   TL1,#(-TC_T1INT)        ;Initialize TL1 and
0437  75 17 01   .D..                  MOV   T1_CTR,#TC_SAMP/TC_T1INT    ;T1 int ctr.
043A  E4                               CLR   A                       ;Clear both 1ms- and
043B  FA                               MOV   R2,A                    ; 256ms-timeout ctrs.
043C  FB                               MOV   R3,A
043D  D2 8E      .B..                  SETB  TR1                     ;Start timer 1.
043F  22                               RET

                        ;****************************************************
                        ;                    STOP MAIL TRANSPORT
                        ;****************************************************
                        ;Turn off the AC motor.
                        ;Lock the shutter bar if Trip Logic is enabled.
                        ;----------------------------------------------------
0440  74 04             STOP_XPORT:    MOV   A,#00000100B            ;Turn off AC motor.
```

```
0442  91 8B     .C..                  ACALL   OFF_SOL
0444  75 18 62  .D..                  MOV     CMD,#62H
0447  22                              RET

                ;*********************************************
                ;       CHECK RECEIVE BEFORE TRANSMIT
                ;*********************************************
0448  10 05 14  .BR.   CHK_RECV:      JBC     BITMODE_FLG,EX_CHKRECV
044B  91 60     .C..                  ACALL   CHKINSG        ;Check for incoming msg.
044D  40 08     .R..                  JC      TURN_RECV      ;Receive msg if C =1.
044F  7E 0F                           MOV     R6,#0FH        ;Wait 30us to avoid contention.
0451  DE FE     .R..                  DJNZ    R6,$

                ;***********************************
                ;       RECEIVE QUED MESSAGE
                ;***********************************
0453  91 60     .C..   MSG_QUED:      ACALL   CHKINSG        ;Look again.
0455  50 08     .R..                  JNC     EX_CHKRECV
0457  12 0A 14  ..C.   TURN_RECV:     LCALL   RECV_MSG
045A  10 30 02  .BR.                  JBC     STAT_FLG,EX_CHKRECV ;Ignore msg if comm err.
045D  D2 0E     .B..                  SETB    QMSG_FLG       ;Inform mainline of queued msg.
045F  22               EX_CHKRECV:    RET

                ;****************************************
                ;       CHECK FOR INCOMING MESSAGE
                ;****************************************
0460  C1               CHKINSG:       CLR     C              ;C =1 incoming msg; C =0 none.
0461  30 B0 04  .BR.                  JNB     P3.0,CHK_KEY
0464  D3                              SETB    C
0465  C2 13     .B..                  CLR     CMDSRC_FLG     ;Command source is serial line.
0467  22                              RET
0468  91 BD     .C..   CHK_KEY:       ACALL   CHKKBD
046A  50 02     .R..                  JNC     EX_CHKINSG
046C  D2 13     .B..                  SETB    CMDSRC_FLG     ;Command source is keyboard.
046E  22               EX_CHKINSG:    RET

                ;**************************************************************
                ;                     DELAY LOOPS IN MILLISEC INCREMENT
                ;**************************************************************
046F  7E 05            DEL05MS:       MOV     R6,#SHORT_TC          ;Short settling time.
0471  80 0E     .R..                  SJMP    DELAY_LOOP
0473  7E 14            DEL20MS:       MOV     R6,#LONG_TC           ;Long settling time.
0475  80 0A     .R..                  SJMP    DELAY_LOOP
0477  7E 3C            DEL60MS:       MOV     R6,#60                ;60ms delay.
0479  80 06     .R..                  SJMP    DELAY_LOOP
047B  7E 78            DEL120MS:      MOV     R6,#120               ;120ms delay.
047D  80 02     .R..                  SJMP    DELAY_LOOP
047F  7E F0            DEL240MS:      MOV     R6,#240               ;240ms delay.

0481  12 08 02  ..C.   DELAY_LOOP:    LCALL   UPDTE_SERVO
0484  DE F8     .R..                  DJNZ    R6,DELAY_LOOP
0486  22                              RET
                ;*************************************************
                ;                     UPDATE AUXILLARY PORT X
                ;*************************************************
                ;Output solenoid drives on Port X.
                ;-------------------------------------------
0487  55 44     .D..   ON_SOL:        ANL     A,PORTX_LATCH
0489  80 02     .R..                  SJMP    SAVE_PORTX
048B  45 44     .D..   OFF_SOL:       ORL     A,PORTX_LATCH
048D  F5 44     .D..   SAVE_PORTX:    MOV     PORTX_LATCH,A
048F  90 90 00                        MOV     DPTR,#PORTX
0492  F0                              MOVX    @DPTR,A
0493  22                              RET

                ;****************************************************
                ;                     UPDATE PORT C 8155
                ;****************************************************
0494  90 B8 03         ON_BIT:        MOV     DPTR,#PORTC    ;PC4, PC5 = 0.
0497  E0                              MOVX    A,@DPTR
0498  5C                              ANL     A,R4
0499  F0                              MOVX    @DPTR,A
049A  22                              RET
049B  90 B8 03         OFF_BIT:       MOV     DPTR,#PORTC    ;PC4, PC5 = 1.
049E  E0                              MOVX    A,@DPTR
049F  4C                              ORL     A,R4
04A0  F0                              MOVX    @DPTR,A
04A1  22                              RET
                ;****************************************************
                ;                     POINT_TO_POINT PROFILE
                ;****************************************************
                ;Determines accel/deccel distances for a point-to-point
                ;trapezoidal velocity profile.
                ;----------------------------------------------------
04A2  85 3D 41  .DD.   COMP_PROF:     MOV     DECCELK,ACCELK
04A5  C2 0A     .B..                  CLR     PROF_FLG              ;Point-to-point motion.
04A7  7C 02                           MOV     R4,#02                ;Estimated accel distance equals
04A9  85 3C 38  .DD.                  MOV     ACCEL_CNT+1,TOTAL_CNT+1   ;total count / 4.
04AC  85 3B 37  .DD.                  MOV     ACCEL_CNT,TOTAL_CNT
04AF  E5 38     .D..   DIV_FOUR:      MOV     A,ACCEL_CNT+1         ;16 bits divided by 4.
04B1  C3                              CLR     C
04B2  13                              RRC     A
04B3  F5 38     .D..                  MOV     ACCEL_CNT+1,A
04B5  E5 37     .D..                  MOV     A,ACCEL_CNT
04B7  13                              RRC     A
04B8  F5 37     .D..                  MOV     ACCEL_CNT,A
04BA  DC F3     .R..                  DJNZ    R4,DIV_FOUR
04BC  22               EX_PACCEL:     RET

                ;*************************************
                ;       CHECK FOR KEY DEPRESSION
                ;*************************************
04BD  90 C0 00         CHKKBD:        MOV     DPTR,#KEYBD    ;Check for UPI Output Buffer
04C0  E0                              MOVX    A,@DPTR          ;Full signal.
04C1  A2 E1     .B..                  MOV     C,ACC.1
04C3  22                              RET
                ;****************************************************************
                ;       CHECK FOR ANY CHANGE IN STATUS WHEN TRIP LOGIC IS OFF
                ;****************************************************************
```

```
                              ;Returns to the main routine with:
                              ;       1. the corresponding status bit (in MSG_STAT) updated.
                              ;       2. STAT_FLG set if a status change occurs.
                              ;       3. STAT_FLG cleared if no change of status.
                              ;------------------------------------------------------------------
04C4  90 88 01                PEEK_STAT:     MOV    DPTR,#PORTA           ;Read sensors.
04C7  E0                                     MOVX   A,@DPTR
04C8  F5 25        .D..                      MOV    SAV_SENSR,A           ;Save reading.
04CA  20 2D 04     .BR.                      JB     SAV_SENSR.5,NOSET
04CD  D2 14        .B..                      SETB   TEST_FLG
04CF  80 02        .R..                      SJMP   CHK_MODSEL
04D1  C2 14        .B..       NOSET:         CLR    TEST_FLG
04D3  00                      CHK_MODSEL:    NOP
                              ;****************************************
                              ;       HOME SIGNAL SEARCH RTN
                              ;****************************************
04ED  75 3A 05     .D..       HOME_SRCH:     MOV    CYC_CTR,#5
04F0  D2 3A        .B..       SRCHRTRY:      SETB   SYS_ENABLE                ;Restore error flags.
04F2  53 27 B5     .D..                      ANL    MSG1_STAT,#10110101B
04F5  51 D8        .C..                      CALL   HOME_MOVE
04F7  20 3B 05     .BR.                      JB     STAT_FLG,HOME_RTRY
04FA  20 0F 02     .BR.                      JB     HOME_FLG,HOME_RTRY
04FD  E4                                     CLR    A
04FF  22                                     RET
04FF  D5 3A EE     .DR.       HOME_RTRY:     DJNZ   CYC_CTR,SRCHRTRY          ;No. of of retries.
0507  D2 3B        .B..                      SETB   STAT_FLG                  ;Give up if exceeded.
0504  22                                     RET
                              ;********************************
                              ;       READ HOME SIGNAL
                              ;********************************
0505  91 73        .C..       HOME_CHK:      CALL   DEL2048
0507  90 88 01                               MOV    DPTR,#PORTA               ;Read in home signal input.
050A  E0                                     MOVX   A,@DPTR
050B  54 04                                  ANL    A,#4
050D  22                                     RET
                              ;****************************************
                              ;       CHECK FOR ZERO DUTY CYCLE
                              ;****************************************
050E  E5 2C        .D..       CHK2DC:        MOV    A,K2L
0510  70 02        .R..                      JNZ    EX_CHKZDC
0512  65 2B        .D..                      XRL    A,K2H          ;Returns 0 in acc if dc =0.
0514  22                      EX_CHKZDC:     RET
0514                          OUT_STEP       EQU    EX_CHKZDC
                              $INCLUDE(UPDSERVO.DNS)
                              ;********************************************
                              ;*****   UPDATE SERVO CONTROL ELEMENTS   *****
                              ;********************************************
                                             ORG    800H
0800  C3                      DUMMY_CALL:    CLR    C              ;For dummy call when SDK-51
0801  22                                     RET                   ;is not in used.
                              ;******************************************
                              ;       COMPUTE MOTION TRAJECTORY
                              ;******************************************
0802  53 D0 E7     .D..       UPDTE_SERVO:   ANL    PSW,#11100111B        ;Insure Reg bank is 0!!
0805  30 08 04     .BR.                      JNB    RUN_FLG,CONST_SPEED   ;0= constant speed mode,
0808  31 42        .C..                      ACALL  COMP_ACCEL            ;1= accel/decel (time varying) mode
080A  F5 32        .D..                      MOV    RUN_SPEED,A           ;Save speed result.
080C  85 32 36     .DD.       CONST_SPEED:   MOV    AUX_REG,RUN_SPEED     ;Convert result to double precisio
080F  75 F0 00     .D..                      MOV    B,#00                 ;Integrate speed to get distance;
0812  78 2E        .D..                      MOV    R0,#POSN_ACC             ;Target trajectory (in abs posn)
0814  31 10        .C..                      ACALL  INTEGRATE                ;in POSN_ACC register.
                              ;******************************************
                              ;       UPDATE ABSOLUTE POSITIONS
                              ;******************************************
0816  30 07 08     .BR.                      JNB    DCMDIR_FLG,INCR_INDEX ;Sign convention of speed
0819  E5 36        .D..                      MOV    A,AUX_REG             ;for CC= or C= rotation
081B  60 07        .R..                      JZ     INCR_INDEX            ;needed for absolute posn
081D  F4                                     CPL    A                     ;bookkeeping and desired
081E  04                                     INC    A                     ;signed encoder count reading
081F  F5 36        .D..                      MOV    AUX_REG,A             ;CC==0=pos cnting; C==1=neg.
0821  75 F0 FF     .D..                      MOV    B,#0FFH
0824  00                      INCR_INDEX:    NOP
0825  11 E2        .C..                      ACALL  TRACK_BASE                ;Compute absolute position.
0827  78 10        .D..                      MOV    R0,#COMP_CNT
0829  31 10        .C..                      ACALL  INTEGRATE
                              ;********************************************
                              ;       COMPUTE ALGORITHM VARIABLES
                              ;        FOR NEXT SAMPLING INSTANT
                              ;********************************************
082B  D2 D4        .B..       COMP_K1K2:     SETB   PSW.4          ;Select register bank 2.
082D  90 00 FF                               MOV    DPTR,#COEFF1   ;K1 =-[COEFF1 x signed last error cnt]
0830  E5 2A        .D..                      MOV    A,ERR_CNT        ;Get last sampling instant's err cnt.
0832  30 E7 06     .BR.                      JNB    ACC.7,POS_ERR    ;Get absolute value if negative.
0835  F4                      NEG_ERR:       CPL    A
0836  04                                     INC    A
0837  31 57        .C..                      ACALL  XRTN
0839  80 04        .R..                      SJMP   SAV_K1           ;Result is +, ie., -(-K1).
083B  31 57        .C..       POS_ERR:       ACALL  XRTN
083D  31 71        .C..                      ACALL  TWOS_CPL         ;Result is -, ie., -(+K1).
083F  FA                      SAV_K1:        MOV    R2,A           ;Save result.
0840  AB F0        .D..                      MOV    R3,B
                                                                   ;K2 =-[COEFF2/256 x signed last output]
0842  20 5F 0C     .BR.       CMPTK2:        JB     K2H.7,NEG_DC     ;Get abs value of last sampling
0845  85 2B 83     .DD.       POS_DC:        MOV    DPH,K2H          ;instant's algorithm output if (-).
0848  85 2C 82     .DD.                      MOV    DPL,K2L
084B  31 2D        .C..                      ACALL  COMP_K2          ;Multiply with COEFF2 constant.
084D  31 71        .C..                      ACALL  TWOS_CPL           ;Result is (-), ie., -K2.
084F  80 0E        .R..                      SJMP   PARTIAL
0851  E5 2C        .D..       NEG_DC:        MOV    A,K2L
0853  85 2B F0     .DD.                      MOV    B,K2H
0856  31 71        .C..                      ACALL  TWOS_CPL
0858  F5 82        .D..                      MOV    DPL,A
085A  85 F0 83     .DD.                      MOV    DPH,B
085D  31 2D        .C..                      ACALL  COMP_K2              ;Result is (+), ie., -(-K2).
085F  2A                      PARTIAL:       ADD    A,R2           ;Compute algorithm partial result,
0860  FA                                     MOV    R2,A             ;K1 regs =K1 + K2.
```

```
0861  E5 F0      .D..                       MOV    A,B
0863  38                                    ADDC   A,P3
0864  FB                                    MOV    R3,A
                          ;*********************************************
                          ;       WAIT FOR SAMPLING PERIOD TIMEOUT
                          ;*********************************************
0865  90 B8 03            WAIT_1MS:         MOV    DPTR,#PORTC      ;Enable encoder buffer.
0868  E0                                    MOVX   A,@DPTR
0869  B2 E5      .B..                       CPL    ACC.5
086B  F0                                    MOVX   @DPTR,A
086C  B2 B5      .B..                       CPL    P3.5             ;Trigger by hardware watchdog.
086E  15 82      .D..                       DEC    DPL              ;Preset DPTR and B.
0870  75 F0 6B   .D..                       MOV    B,#LOW(CDEFFD)
0873  D2 38      .B..                       SETB   WTCHDOG_FLG      ;Must be set when T1 interrupts to
0875  30 38 19   .BR.     WAIT_T1:          JNB    WTCHDOG_FLG,T1_DONE ;indicate pgm is in sync with
0878  30 0F FA   .BR.                       JNB    HOME_FLG,WAIT_T1        ;servo sampling clock.
087B  C2 AF      .B..                       CLR    EA               ;Prevent interrupt because DPTR
087D  15 82      .D..                       DEC    DPL              ;is changed to PORTA; wait until
087F  E0                                    MOVX   A,@DPTR          ;portA is read and DPTR is restored.
0880  A3                                    INC    DPTR             ;Bump DPTR to PORTB.
0881  D2 AF      .B..                       SETB   EA
0883  54 04                                 ANL    A,#04
0885  70 EE      .R..                       JNZ    WAIT_T1          ;Home was seen if not zero.
0887  31 1D      .C..                       ACALL  READ1_YCTR
0889  FE                                    MOV    R6,A             ;Store reading to SAVE_LATCH.
088A  C2 0F      .B..                       CLR    HOME_FLG         ;Tell caller home count is latched.
088C  75 3A 01   .D..                       MOV    CYC_CTR,#01      ;Tell motion timing housekeeper to stop
088F  80 E4      .R..                       SJMP   WAIT_T1          ;motion.

0891  A3                  T1_DONE:          INC    DPTR             ;Disable encoders buffer.
0892  E0                                    MOVX   A,@DPTR
0893  B2 E5      .B..                       CPL    ACC.5
0895  F0                                    MOVX   @DPTR,A
0896  B2 B5      .B..                       CPL    P3.5             ;Re-arm watchdog.
0898  7F 04                                 MOV    R7,#TC_SAMP/TC_T1INT    ;Reload T1 timeout counter.
089A  C2 D4      .B..                       CLR    PSW.4            ;Restore to RB0.
089C  31 27      .C..                       ACALL  TRACKTIME        ;Update realtime-keeping.
089E  20 B3 05   .BR.     CHK30VOLT:        JB     P3.3,EX_UPDTE    ;=0 30VDC dips down beyond tolerance.
08A1  D2 40      .B..                       SETB   LO30VDC_FLG
08A3  02 00 8F   ..C.                       JMP    IFATAL           ;Force return to fatal error trap.
08A6  20 3D 01   .BR.     EX_UPDTE:         JB     TRIPEN_FLG,CHK_FEED
08A9  22                                    RET
                          ;****************************************************************
                          ;                 CHECK MAIL FEED WHEN IN PRINT CYCLE
                          ;****************************************************************
                          ;Detects trips at the transport path to give the ff. info:
                          ;        1. time when next mail is detected at TRIP1 for its speed
                          ;           calculation in next cycle.
                          ;
                          ;
                          ;
                          ;
                          ;Returns to main routine with:
                          ;        1. TRIP sensors status updated.
                          ;        2. TR1_FLG set if TRIP1 sensor is tripped (0 to 1 transition).
                          ;        3. TR2_FLG set if TRIP2 sensor is tripped.
                          ;        4. No change in flags' state if no trip is detected.
                          ;----------------------------------------------------------------
08AA  90 B8 01            CHK_FEED:         MOV    DPTR,#PORTA              ;Read sensors.
08AD  E0                                    MOVX   A,@DPTR
08AE  FC                                    MOV    R4,A                     ;Save reading.
08AF  20 0C 13   .BR.                       JB     TR1_FLG,CHK_TR2          ;TR1_FLG =1 TRIP1 tripped; so not
08B2  20 E6 02   .BR.     CHK_TR1:          JB     ACC.6,$+5                ;Check for 0 to 1 xition at TRIP1
08B5  80 1E      .R..                       SJMP   UPD_TRIP                 ;no trip.
08B7  30 2E 02   .BR.                       JNB    SAV_SENSR.6,TR1_TRIPPED  ;Tripped if previous status is 0.
08BA  80 19      .R..                       SJMP   UPD_TRIP
08D5  8C 25      .D..     UPD_TRIP:         MOV    SAV_SENSR,R4             ;Update TRIP status.
08D7  30 0C 07   .BR.                       JNB    TR1_FLG,EX_CHKFEED
08DA  BA 3C 04   ..R.                       CJNE   R2,#3C,EX_CHKFEED        ;Check TRIP2 watchdog.
                          ;*********************************************
                          ;       CONVERT RELATIVE TO ABSOLUTE
                          ;            LOAD POSITION COUNT
                          ;*********************************************
08E2  78 30      .D..     TRACK_BASE:       MOV    R0,#BASE_INDEX           ;Pointer to base index reg.
08E4  31 10      .C..                       ACALL  INTEGRATE                ;Integrate computed velocity.
08E6  90 0A 00                              MOV    DPTR,#BASE_1REV          ;DPTR = base drv 1 rev count.
08E9  E6                  COMP_ABS:         MOV    A,@R0
08EA  30 E7 09   .BR.                       JNB    ACC.7,ABS1       ;Convert index to a positive value
08ED  18                                    DEC    R0               ;relative to the home position count.
08EE  C6                                    XCH    A,@R0              ;IF SGN(index) is negative
08EF  25 82      .D..                       ADD    A,DPL                ;THEN index =index + 1 rev count
08F1  C6                                    XCH    A,@R0                ;ELSE
08F2  35 83      .D..                       ADDC   A,DPH
08F4  08                                    INC    R0
08F5  F6                                    MOV    @R0,A               ;Endif.
08F6  18                  ABS1:             DEC    R0               ;Convert positive index value to an
08F7  C3                                    CLR    C                ;absolute position count starting from
08F8  E5 82      .D..                       MOV    A,DPL            ;home (zero) count.
08FA  96                                    SUBB   A,@R0              ;temp =1 rev count - index
08FB  FC                                    MOV    R4,A
08FC  E5 83      .D..                       MOV    A,DPH
08FE  08                                    INC    R0
08FF  96                                    SUBB   A,@R0
0900  30 E7 0C   .BR.                       JNB    ACC.7,EX_ABS       ;IF SGN(temp) is negative
0903  CC                                    XCH    A,R4                  ;THEN index = (-temp)
0904  F4                                    CPL    A                     ;ELSE
0905  24 01                                 ADD    A,#01
0907  18                                    DEC    R0
0908  F6                                    MOV    @R0,A
0909  CC                                    XCH    A,R4
090A  F4                                    CPL    A
090B  34 00                                 ADDC   A,#00
090D  08                                    INC    R0
090E  F6                                    MOV    @R0,A
090F  22                  EX_ABS:           RET                        ;Endif.
                          ;***************************************
                          ;       INTEGRATE VELOCITY COUNT
                          ;***************************************
0910  E6                  INTEGRATE:        MOV    A,@R0            ;R0 holds index address lobyte.
0911  25 36      .D..                       ADD    A,AUX_REG        ;AUX_REG =signed velocity count
0913  F6                                    MOV    @R0,A              ;in counts/sample.
```

```
0914  08                      INC     R0
0915  E5 F0     .D..          MOV     A,B
0917  36                      ADDC    A,@R0
0918  F6                      MOV     @R0,A
0919  22                      RET

                  ;********************************************
                  ;      READ EXTERNAL COUNTER BUFFER
                  ;********************************************
091A  90 88 02       READ_XCTR:     MOV     DPTR,#PORTB
091D  E0             READ1_XCTR:    MOVX    A,@DPTR          ;Read buffer.
091E  F5 36     .D..                MOV     AUX_REG,A
0920  E0                            MOVX    A,@DPTR
0921  B5 36 01  .DR.                CJNE    A,AUX_REG,RE_READ
0924  22                            RET
0925  E0             RE_READ:       MOVX    A,@DPTR          ;Best of 3 readings.
0926  22             EX_READXCTR:   RET

                  ;********************************************
                  ;      UPDATE SYSTEM REAL-TIMEKEEPING
                  ;********************************************
0927  0A             TRACKTIME:     INC     R2                         ;R2 counts 1ms-interval.
0928  BA 00 01  ..R.                CJNE    R2,#00,EX_TRACKT           ;R3 counts 256ms-interval.
092B  0B                            INC     R3                         ;Must be in Ram.
092C  22             EX_TRACKT:     RET
                  ;**********************************************
                  ;      COMPUTE SERVO ALGORITHM VARIABLE
                  ;          (K2 =LAST OUTPUT x COEFF2)
                  ;**********************************************
                  ;DPTR =ABS(output) at last sampling instant.
                  ;--------------------------------------------
092D  C3             COMP_K2:       CLR     C                          ;Limit to maximum absolute
092E  74 E8                         MOV     A,#LOW(TC_SAMP)            ;output value, ie., equals
0930  95 82     .D..                SUBB    A,DPL                      ;sampling period interval.
0932  74 03                         MOV     A,#HIGH(TC_SAMP)
0934  95 83     .D..                SUBB    A,DPH
0936  50 06     .R..                JNC     XK2
0938  75 83 03  .D..                MOV     DPH,#HIGH(TC_SAMP)
093B  75 82 E8  .D..                MOV     DPL,#LOW(TC_SAMP)
093E  74 50          XK2:           MOV     A,#COEFF2                  ;Multiply output by COEFF2
0940  80 06     .R..                SJMP    BINFRAC                    ;algorithm constant.

                  ;****************************************
                  ;      COMPUTE POSITION COUNT IN
                  ;          ACCELERATION PHASE
                  ;****************************************
                  ;Accel posn =accel rate x time displacement
                  ;----------------------------------------
0942  8F 82     .D..  COMP_ACCEL:   MOV     DPL,R7           ;DPTR =motion real-timekeeping regs,
0944  8D 83     .D..                MOV     DPH,R5           ;ie., time displacement in millisec.
0946  E5 3D     .D..                MOV     A,ACCELK         ;Get accel rate, counts/ms^2.

                  ;****************************************
                  ;      FIXED-POINT BINARY-INTEGER
                  ;          MULTIPLICATION
                  ;****************************************
                  ;DPTR =integer ;ACC =binary fraction (N/256)
                  ;----------------------------------------
0948  31 57     .C..  BINFRAC:      ACALL   XRTN         ;Do an integer multiply, integer x N.
094A  A2 E7     .B..  DIV256:       MOV     C,ACC.7      ;Divide result by 256.
094C  E5 F0     .D..                MOV     A,B               ;Shift 1 byte to left R4, B, ACC.
094E  34 00                         ADDC    A,#00             ;Round off to nearest integer.
0950  CC                            XCH     A,R4              ;Result low byte = ACC.
0951  34 00                         ADDC    A,#00             ;Result high byte = B.
0953  F5 F0     .D..                MOV     B,A
0955  EC                            MOV     A,R4
0956  22                            RET
                  ;****************************************
                  ;      DOUBLE-PRECISION INTEGER
                  ;          MULTIPLICATION
                  ;****************************************
                  ;Multiplier (positive 8 bits) =ACC
                  ;Multiplicand (positive 16 bits) =DPTR
                  ;Product result in R4 (msd), B, ACC (lsd).
                  ;----------------------------------------
0957  FC             XRTN:          MOV     R4,A         ;Compute product low byte.
0958  85 82 F0  .DD.                MOV     B,DPL             ;Load multiplicand low byte
095B  A4                            MUL     AB                ;Multiplier saved to R4.
095C  C0 E0     .D..                PUSH    ACC               ;Save product low byte.
095E  C0 F0     .D..                PUSH    B                 ;Save partial product high byte.
0960  EC                            MOV     A,R4         ;Compute product high byte.
0961  85 83 F0  .DD.                MOV     B,DPH             ;Load multiplicand high byte.
0964  A4                            MUL     AB
0965  D0 83     .D..                POP     DPH               ;Get intermediate prod high byte.
0967  25 83     .D..                ADD     A,DPH             ;Sum is final prod high byte.
0969  C5 F0     .D..                XCH     A,B               ;Prod 2nd byte = B.
096B  34 00                         ADDC    A,#00
096D  FC                            MOV     R4,A              ;Prod 3rd byte(MSB) = R4.
096E  D0 E0     .D..                POP     ACC               ;Prod 1st byte(LSB) = ACC
0970  22                            RET                       ;Return to caller.

                  ;********************************
                  ;      DOUBLE-PRECISION
                  ;      TWOS COMPLEMENT
                  ;********************************
0971  F4             TWOS_CPL:      CPL     A                ;ACC =lo byte.
0972  24 01                         ADD     A,#01            ;B =hi byte.
0974  C5 F0     .D..                XCH     A,B
0976  F4                            CPL     A
0977  34 00                         ADDC    A,#00
0979  C5 F0     .D..                XCH     A,B
097B  22                            RET
                  $INCLUDE(NEWCOMMT.4.DMS)
                  ;****************************************
                  ;      COMMUNICATION ROUTINES
                  ;      TIME DELAY DECLARATIONS
                  ;****************************************
                  ;Transmitter echoplex protocol time
                  ;constants in microsecond.
                  ;----------------------------------
0068                  BITTX         EQU     104              ;Bit-to-bit xmit/echo-sample time.
```

```
00AA                           SBTX        EQU     170                 ;CTS detect to Start bit time.
0154                           NEPTX       EQU     340                 ;No-Error-Pulse width.
046F                           BYTETX      EQU     1135                ;Byte-to-byte xmit time.
005C                           DELAY1      EQU     (BITTX-12)          ;Delay before xmitting 1st data bit.
0055                           DELAY2      EQU     (BITTX-19)          ;Delay before xmitting next data bit.
005C                           DELAY3      EQU     (BITTX-12)          ;Delay before sampling EOM/EOB.
005B                           DELAY4      EQU     (BYTETX-(BITTX*10)-4)   ;Delay before next byte xmit.
                               ;----------------------------------------------
                               ;Receiver echoplex protocol time constants.
                               ;----------------------------------------------
0064                           CTSRX       EQU     100                 ;RTS detect to CTS xmit time.
002A                           SBRX        EQU     42                  ;SB detect to SB echo time.
0078                           BIT1RX      EQU     120                 ;SB detect to 1st bit sample time.
008C                           ECH1RX      EQU     140                 ;SB detect to 1st data bit echo time.
006A                           BITRX       EQU     106                 ;Bit-to-bit sample/xmit-echo time.
04A4                           NEPRX       EQU     1188                ;SB detect to NEP sample time.
0610                           BYTERX      EQU     1552                ;Time until next receiver activity.
0050                           DELAY5      EQU     (CTSRX-20)          ;Delay before xmitting CTS.
004B                           DELAY6      EQU     (BIT1RX-SBRX-3) ;Delay before sampling 1st data bit.
0012                           DELAY7      EQU     (ECH1RX-BIT1RX-2) ;Delay before echoing recv'd bit.
0050                           DELAY8      EQU     (BITRX-DELAY7-8)  ;Delay before sampling next data bit.
008E                           DELAY9      EQU     (BYTETX-(BIT1RX+BITRX*8)-25) ;Delay before next byte recv.
00C3                           DELAY10     EQU     (NEPRX-BYTETX+DELAY9)   ;Delay before sampling NEP.
016C                           DELAY11     EQU     (BYTERX-NEPRX)          ;Delay before recv rtn exit.

                               ;*******************************************
                               ;       MACRO TO GENERATE CODE FOR
                               ;               TIME DELAYS
                               ;*******************************************
                               TIME        MACRO   DVND
                                           IF      (DVND MOD 2) EQ 0
                                           MOV     R2,#((DVND-2)/2)
                                           DJNZ    R2,$
                                           NOP
                                           ELSE
                                           MOV     R2,#(DVND/2)
                                           DJNZ    R2,$
                                           ENDIF
                                           ENDM
                               ;*****************************************
                               ;       TRANSMIT MESSAGE TO SOURCE
                               ;*****************************************
                               ;RECVER_FLG =0 xmit thru serial line; =1 thru display.
                               ;------------------------------------------------------
097C  E4                       XMIT_STAT:      CLR     A
097D  51 D1        .C..                        ACALL   XCOMPREP            ;Transmit system status.
097F  30 16 0C     .BR.                        JNB     RECVER_FLG,STAT_SERIAL
0982  12 E0 0F                                 LCALL   CLRDSP
0985  AA 28        .D..                        MOV     R2,MSG2_STAT
0987  AB 27        .D..                        MOV     R3,MSG1_STAT
0989  12 E0 18                                 LCALL   DSP2BY
098C  41 12        .C..                        AJMP    END_OF_XMIT
098E  79 26        .D..        STAT_SERIAL:    MOV     R1,#STAT_HEADER
0990  7D 03                                    MOV     R5,#03
0992  75 26 80     .D..                        MOV     STAT_HEADER,#80H
0995  21 AF        .C..                        AJMP    XMIT_RTN
0997  74 02                    XMIT_CMMDC:     MOV     A,#02
0999  51 D1        .C..                        ACALL   XCOMPREP        ;Transmit command-execution-complete.
099B  30 16 0A     .BR.                        JNB     RECVER_FLG,CMMDC_SERIAL
099E  12 E0 0F                                 LCALL   CLRDSP
09A1  AA 46        .D..                        MOV     R2,TRIP_CTR+1
09A3  12 E0 15                                 LCALL   DSP1BY
09A6  41 12        .C..                        AJMP    END_OF_XMIT
09A8  79 2D        .D..        CMMDC_SERIAL:   MOV     R1,#CMMD_HEADER
09AA  7D 02                                    MOV     R5,#02
09AC  75 2D 83     .D..                        MOV     CMMD_HEADER,#83H

                               ;*********************************************
                               ;       TRANSMISSION ECHOPLEX ROUTINE
                               ;               ( 12 MHZ CLOCK )
                               ;*********************************************
                               ;CAUTION: Instruction code, sequence, and loops
                               ;       are critical to time delay computations.
                               ;R0 =pointer to time constant watchdog.
                               ;R1 =start addrs of xmitting buffer.
                               ;R2 =timer delay constants register.
                               ;R3 =save area for byte to be xmitted.
                               ;R4 =communication failure counter.
                               ;R5 =no. of bytes to be xmitted.
                               ;R6 =stack pointer save area for wtchdg timeout.
                               ;R7 =save area for no. of data bits per byte.
                               ;-----------------------------------------------
09AF  D2 B1        .B..        XMIT_RTN:       SETB    P3.1            ;Xmit RTS.
09B1  30 B0 FD     .BR.                        JNB     P3.0,$          ;Wait CTS until wtchdog times out.
09B4                                           TIME    SBTX            ;Delay before xmitting Start Bit.
09B9  C2 B1        .B..        START_XMIT:     CLR     P3.1            ;Xmit Start Bit.
09BB  7F 08                                    MOV     R7,#08          ;Load no. of data bits per byte.
09BD  C3                                       CLR     C
09BE  92 15        .B..                        MOV     SAVE1_BIT,C     ;First N-1 bit is Start bit, ie., 0.
09C0  E7                                       MOV     A,@R1           ;Get byte to be xmitted.
09C1  FB                                       MOV     R3,A            ;Save to work area.
09C2  09                                       INC     R1              ;Points to next byte.
09C3                                           TIME    DELAY1          ;Delay before xmitting first data bit.
09C8  EB                       BITOUT:         MOV     A,R3
09C9  13                                       RRC     A               ;Place bit into C.
09CA  FB                                       MOV     R3,A
09CB  92 B1        .B..                        MOV     P3.1,C          ;Transmit Nth bit (C).
09CD  51 FC        .C..                        ACALL   CHK_ECHO        ;Check echo of N-1 bit.
09CF  30 06 38     .BR.                        JNB     COMERR_FLG,XMITERR      ;Echo error if set.
09D2  92 15        .B..                        MOV     SAVE1_BIT,C     ;Save N bit, ie., N-1 bit = N.
09D4                                           TIME    DELAY2          ;Delay before xmitting next data bit.
09D8  DF EE        .R..                        DJNZ    R7,BITOUT       ;All data bits xmitted?
09DA  00                                       NOP                     ;NOP to balance bit-to-bit delay.
09DB  DD 18        .R..                        DJNZ    R5,XMIT_EOB     ;End-of-msg if zero, else, End-of-byte.
09DD  C2 B1        .B..        XMIT_EOM:       CLR     P3.1            ;Xmit EOM.
09DF  51 FC        .C..                        ACALL   CHK_ECHO        ;Check echo of last data bit.
09E1  30 06 26     .BR.                        JNB     COMERR_FLG,XMITERR
09E4                                           TIME    DELAY3          ;Delay before reading EOM/EOB echo.
09E9  20 B0 1F     .BR.                        JB      P3.0,XMITERR    ;Check EOM echo.
09EC  D2 B1        .B..                        SETB    P3.1            ;Everything is OK; xmit NEP.
09EE                                           TIME    NEPTX           ;Delay for NEP width.
```

```
        09F3   80 1D       .R..                       SJMP    END_OF_XMIT         ;End of xmission.
        09F5   D2 B1       .B..   XMIT_EOB:           SETB    P3.1                ;Xmit EOB.
        09F7   51 FC       .C..                       ACALL   CHK_ECHO            ;Check echo of last data bit.
        09F9   30 06 0F    .BR.                       JNB     COMERR_FLG,XMITERR
        09FC                                          TIME    DELAY3
        0A01   30 B0 06    .BR.                       JNB     P3.0,XMITERR        ;Check EOM echo.
        0A04                                          TIME    DELAY4              ;Delay before start of next byte xmit.
        0A08   21 A9       .C..                       AJMP    START_XMIT          ;Start xmitting next byte.
        0A0A   C2 06       .B..   XMITERR:            CLR     COMERR_FLG          ;Indicate communication error.
        0A0C   C2 B1       .B..                       CLR     P3.1                ;Drop Xmit line.
        0A0E   DA FE       .R..                       DJNZ    R2,$                ;Force an EOM error.
        0A10   DA FE       .R..                       DJNZ    R2,$
        0A12   41 BC       .C..   END_OF_XMIT:        AJMP    CHK_COMERR          ;Check for xmit error.

                                  ;*****************************************
                                  ;       RECEIVE MESSAGE FROM SOURCE
                                  ;*****************************************
        0A14   85 18 1D    .DD.   RECV_MSG:           MOV     OLD_CMMD,CMMD       ;Save current command.
        0A17   75 09 18    .DD.                       MOV     R1_RB1,#CMMD
        0A1A   51 2B       .C..                       ACALL   RECV_RTN
        0A1C   30 38 03    .BR.                       JNB     STAT_FLG,EX_RECVRTN
        0A1F   85 1D 18    .DD.                       MOV     CMMD,OLD_CMMD
        0A22   22                 EX_RECVRTN:         RET

        0A23   75 09 36    .DD.   RECV_KCODE:         MOV     R1_RB1,#AUX_REG
        0A26   51 2B       .C..                       ACALL   RECV_RTN
        0A28   E5 36       .D..                       MOV     A,AUX_REG
        0A2A   22                                     RET

        0A2B   74 04              RECV_RTN:           MOV     A,#04
        0A2D   51 D1       .C..                       ACALL   XCOMPREP
        0A2F   30 13 0D    .BR.                       JNB     CMMDSRC_FLG,STRT_RECV
        0A32   12 E6 4C           GETKCODE:           CALL    UPI_IN              ;Use SDK-51 tool.
        0A35   C2 E7       .B..                       CLR     ACC.7
        0A37   F7                                     MOV     @R1,A               ;Save keycode.
        0A38   7A 00                                  MOV     R2,#00
        0A3A   12 E6 25                               CALL    UPI_CMD             ;Reset UPI.
        0A3D   41 BC       .C..                       AJMP    END_OF_RECV

                                  ;*************************************
                                  ;       RECEIVE ECHOPLEX ROUTINE
                                  ;          ( 12 MHZ CLOCK )
                                  ;*************************************
                                  ;CAUTION:  Instruction code, sequence, and
                                  ;loops are critical to time delay computations.
                                  ;R1 =start addrs of msg recv buffer.
                                  ;R3 =byte-building register.
                                  ;-------------------------------------
        0A3F                      STRT_RECV:          TIME    DELAY5              ;Delay before xmitting CTS.
        0A44   D2 B1       .B..                       SETB    P3.1                ;Transmit CTS.
        0A46   20 B0 FD    .BR.   WAIT_STARTB:        JB      P3.0,$              ;Wait Start Bit until wtchdog times out.
        0A49                                          TIME    SBRX                ;Delay before echoing Start Bit.
        0A4E   C2 B1       .B..                       CLR     P3.1                ;Echo Start Bit.
        0A50   7F 08                                  MOV     R7,#08              ;Reset no. of data bits /byte.
        0A52                                          TIME    DELAY6              ;Delay before sampling first data bit.
        0A56   A2 B0       .B..   RECV_BIT:           MOV     C,P3.0              ;Get bit from recv line.
        0A58                                          TIME    DELAY7              ;Delay before echoing recv'd data bit.
        0A5D   92 B1       .B..                       MOV     P3.1,C              ;Echo received bit.
        0A5F   EB                                     MOV     A,R3                ;Get byte-building register.
        0A60   13                                     RRC     A                   ;Move recv'd bit to register.
        0A61   FB                                     MOV     R3,A
        0A62                                          TIME    DELAY8              ;Delay before sampling next data bit.
        0A67   DF ED       .R..                       DJNZ    R7,RECV_BIT
        0A69   A2 B0       .B..   BYTE_COMPLETE:      MOV     C,P3.0              ;Sample EOB/EOM.
        0A6B                                          TIME    DELAY7
        0A70   92 B1       .B..                       MOV     P3.1,C              ;Echo EOB/EOM.
        0A72   A7 0B       .D..                       MOV     @R1,R3_RB1          ;Move byte to msg recv buffer.
        0A74   09                                     INC     R1                  ;Points to next byte buffer.
        0A75   50 07       .R..                       JNC     EOM_RECVD           ;What was it, EOB or EOM?
        0A77                      EOB_RECVD:          TIME    DELAY9              ;Delay before receiving next byte.
        0A7C   41 46       .C..                       AJMP    WAIT_STARTB
        0A7E                      EOM_RECVD:          TIME    DELAY10             ;Delay before sampling NEP.
        0A82   20 B0 02    .BR.                       JB      P3.0,NO_ERROR       ;No error in received msg if set.
        0A85   C2 06       .B..                       CLR     COMERR_FLG          ;Else, indicate communication error.
        0A87                      NO_ERROR:           TIME    DELAY11             ;Delay before rtn becomes ready for next msg
        0A8C                      END_OF_RECV         EQU     $

                                  ;*****************************************
                                  ;       COMMUNICATION RTN EXIT
                                  ;*****************************************
        0A8C   10 06 0D    .BR.   CHK_COMERR:         JBC     COMERR_FLG,GOODCOM
        0A8F   D2 3B       .B..   BADCOM:             SETB    STAT_FLG            ;Communication error is a soft error.
        0A91   BC FF 05    ..R.                       CJNE    COMERR_CTR,#255,INCOMERR
        0A94   D2 46       .B..                       SETB    BADCOM_FLG          ;Indicate bad comm line error.
        0A96   02 02 03    ..C.                       JMP     JFATAL
        0A99   0C                 INCOMERR:           INC     COMERR_CTR
        0A9A   80 02       .R..                       SJMP    COMRETRY
        0A9C   7C 00              GOODCOM:            MOV     COMERR_CTR,#00  ;Reset retry ctr
        0A9E   C2 8C       .B..   COMRETRY:           CLR     TR0                 ;Stop watchdog timer.
        0AA0   C2 B1       .B..                       CLR     P3.1                ;Drop TX line low.
        0AA2   C2 D3       .B..                       CLR     PSW.3               ;Return to RB0.
        0AA4   C3                                     CLR     C                   ;Adjust mainline real-timekeeping,
        0AA5   E5 8A       .D..                       MOV     A,TL0               ;ie., compensate for time spent in
        0AA7   25 82       .D..                       ADD     A,DPL               ;echoplex communication
        0AA9   FC                                     MOV     R4,A                     ;because servo clock was
        0AAA   E5 8C       .D..                       MOV     A,TH0                    ;turned off.
        0AAC   35 83       .D..                       ADDC    A,DPH
        0AAE   CC                 TIERADJ:            XCH     A,R4                     ;Determine no. of sampling period
        0AAF   C3                                     CLR     C                          ;that had passed while in
        0AB0   94 EB                                  SUBB    A,#LOW(TC_SAMP)              ;communication.
        0AB2   CC                                     XCH     A,R4
        0AB3   94 03                                  SUBB    A,#HIGH(TC_SAMP)
        0AB5   40 04       .R..                       JC      ADJRMDR
        0AB7   31 27       .C..                       ACALL   TRACKTIME                ;Adjust timekeeping registers.
        0AB9   80 F3       .R..                       SJMP    TIERADJ
        0ABB   CC                 ADJRMDR:            XCH     A,R4                     ;Round off within one sampling
        0ABC   8C F0       .D..                       MOV     B,R4                       ;period.
        0ABE   31 71       .C..                       ACALL   TWOS_CPL
        0AC0   C3                                     CLR     C
        0AC1   94 F4                                  SUBB    A,#LOW(TC_SAMP/2)
```

```
0AC3  E5 F0      .D..                 MOV    A,B
0AC5  94 01                           SUBB   A,#HIGH(TC_SAMP/2)
0AC7  40 02      .R..                 JC     ADJDONE
0AC9  31 27      .C..                 ACALL  TRACKTIME
0ACB  75 8B 06   .D..  ADJDONE:       MOV    TL1,#(-TC_TIINT)
0ACE  D2 8E      .B..                 SETB   TR1                ;Re-start servo control.
0AD0  22                              RET                       ;Return to caller.

                       ;*******************************************
                       ;      SET UP COMMUNICATION WATCHDOG
                       ;*******************************************
0AD1  C2 8E      .B..  XCOMPREP:      CLR    TR1                ;Stop servo.
0AD3  C2 8C      .B..                 CLR    TR0                ;Stop PWM timer.
0AD5  43 90 03   .D..                 ORL    P1,#00000011B      ;Insure no drive to motors.
0AD8  D2 D3      .B..                 SETB   PSW,3              ;Select register bank 3.
0ADA  90 0A F6   ..C.                 MOV    DPTR,#WTCHDG_TAB
0ADD  93                              MOVC   A,@A+DPTR
0ADE  FE                              MOV    R6,A
0ADF  A3                              INC    DPTR
0AE0  93                              MOVC   A,@A+DPTR
0AE1  F5 82      .D..                 MOV    DPL,A              ;Save watchdog time interval.
0AE3  F4                              CPL    A
0AE4  F5 8A      .D..                 MOV    TL0,A              ;Load watchdog timer.
0AE6  EE                              MOV    A,R6
0AE7  F5 83      .D..                 MOV    DPH,A
0AE9  F4                              CPL    A
0AEA  F5 8C      .D..                 MOV    TH0,A
0AEC  D2 06      .B..                 SETB   COMERR_FLG         ;Enable communication error flag.
0AEE  D2 8C      .B..                 SETB   TR0                ;Start watchdog timer.
0AF0  E5 81      .D..                 MOV    A,SP               ;Set-up stack pointer for
0AF2  14                              DEC    A                  ;forced-return if wtchdog
0AF3  14                              DEC    A                  ;times out.
0AF4  FE                              MOV    R6,A               ;Save to R6 (RB1).
0AF5  22                              RET
0AF6  0F A0            WTCHDG_TAB:    DW     4000               ;4ms interval.
0AF8  13 88                           DW     5000               ;5ms interval.
0AFA  1F 40                           DW     8000               ;8ms interval.

                       ;*******************************************
                       ;      CHECK XMITTED DATA BIT ECHO
                       ;*******************************************
0AFC  20 B0 04   .BR.  CHK_ECHO:      JB     P3.0,ECH_IS_ONE
0AFF  20 15 04   .BR.  ECH_IS_ZERO:   JB     SAVE1_BIT,ECHOERR    ;Echo error if not the same.
0B02  22                              RET
0B03  20 15 02   .BR.  ECH_IS_ONE:    JB     SAVE1_BIT,$+5
0B06  C2 06      .B..  ECHOERR:       CLR    COMERR_FLG           ;Indicate communication error.
0B08  22                              RET
0B09                                  END
M51 assembly errors =     0
```

END

What is claimed is:

1. In combination with a postage meter including a rotary drum having a periphery adapted for feeding a sheet in a path of travel, an improvement comprising:

(a) first means for sensing a time interval during which a sheet is linearly displaced a predetermined distance in the path of travel;

(b) a d.c. motor coupled to the drum for rotation thereof;

(c) second means for sensing angular displacement of the drum; and, (d) computer means coupled to the first and second sensing means and to the d.c. motor, the computer means comprising:

(i) means responsive to the first sensing means for providing respective amounts representative of desired angular displacements of the drum during successive sampling time periods, (ii) means responsive to the second sensing means for providing respective amounts representative of actual angular displacements of the drum during successive sampling time periods, and (iii) means for compensating for the difference between desired and actual angular displacements and generating a d.c. motor control signal for controlling rotation of the motor to cause the linear displacement of the periphery of the drum to substantially match the linear displacement of the sheet during respective sampling time periods.

2. The improvement according to claim 1, wherein the first sensing means comprises first and second sensing devices spaced apart from each other a predetermined distance for sensing successive arrivals of a sheet at two spaced apart locations in the path of travel.

3. The improvement according to claim 2, wherein the first sensing means comprises a mailing machine including said first and second sensing devices.

4. The improvement according to claim 1, wherein the motor has an output shaft, and the second sensing means comprises quadrature encoder means coupled to the output shaft.

5. The improvement according to claim 4 including counting means for coupling the quadrature encoder means to the computer means.

6. The improvement according to claim 5, wherein the counting means comprises means for providing an output signal for the computer means which is representative of the angular displacement and direction of rotation of the motor drive shaft.

7. The improvement according to claim 1, wherein the computer means includes means for comparing amounts representative of the desired and actual angular displacements and generating an error signal representative of the differences therebetween, the compensation means responsive to said error signal for generating the motor control signal, and the motor control signal compensating for the difference between said desired and actual angular displacements.

8. The improvement according to claim 7, wherein the motor control signal comprises a pulse width modulated control signal.

9. The improvement according to claim 7, wherein the motor control signal comprises a function of a regressive mathematical expression.

10. The improvement according to claim 7, wherein the motor control signal comprises a function of the error signal and a prior error signal.

11. The improvement according to claim 7, wherein the motor control signal comprises a function of the error signal and a prior motor control signal.

12. The improvement according to claim 11, wherein the prior motor control signal comprises a function of a prior error signal.

13. The improvement according to claim 1, including power amplifier means for coupling the computer means to the d.c. motor.

14. The improvement according to claim 1, wherein the drum has a cycle of rotation, and the motor control signal accelerating the periphery of the drum to the linear velocity of the sheet substantially coincident with the periphery of the drum engaging the leading edge of the sheet.

15. The improvement according to claim 14 including the motor control signal decelerating the drum from said velocity thereof to rest subsequent to disengagement of the drum and sheet.

16. In combination with a postage meter including a rotary drum, wherein the drum includes a periphery adapted for feeding a sheet in a path of travel, a process for controlling rotation of the drum as a function of the velocity of the sheet, the process comprising:

(a) sensing a time interval during which a sheet is linearly displaced a predetermined distance in the path of travel and in response thereto providing amounts representative of respective desired angular displacements of the drum during successive sampling time periods;

(b) providing a d.c. motor for rotating the drum;

(c) sensing angular displacement of the drum and in response thereto providing amounts representative of respective actual angular displacements of the drum during successive sampling time periods; and (d) digitally compensating for the difference between desired and actual angular displacements and generating a motor control signal for controlling rotation of the drum to cause the linear displacement of the periphery of the drum to substantially match the linear displacement of the sheet during respective sampling time periods.

17. The process according to claim 16, wherein step (a) includes the step of sensing successive arrivals of a sheet at two spaced apart locations in the path of travel.

18. The process according to claim 16, wherein step (c) includes the step of sensing the direction of angular displacement of the d.c. motor.

19. The process according to claim 16, wherein step (d) includes the steps of:

1. comparing amounts representative of respective desired and actual angular displacements,
2. generating an error signal representative of the difference between respective desired and actual angular displacements and in response thereto generating a motor control signal which compensates for the difference between said desired and actual angular displacements.

20. The process according to claim 16, wherein step (c) includes the step of accelerating the periphery of the drum to the velocity of the sheet substantially coincident with engagement of the drum and sheet.

21. The process according to claim 16, wherein step (d) includes the step of calculating the motor control signal from a function of a regressive mathematical expression.

22. The process according to claim 16, wherein step (a) includes the step of generating respective counts representative of desired angular displacements of the drum.

23. The process according to claim 16, wherein step (c) includes the step of generating respective counts representative of actual angular displacements of the drum.

24. The process according to claim 16, wherein step (d) includes the steps of:

1. generating a pulse width modulated motor control signal,
2. amplifying said pulse width modulated control signal, and
3. applying the amplified pulse width modulated control signal to said d.c. motor.

25. The process according to claim 20, wherein step (c) includes the step of decelerating the periphery of the drum to rest subsequent to disengagement of the drum and sheet.

* * * * *